(12) United States Patent
Scott et al.

(10) Patent No.: US 7,484,625 B2
(45) Date of Patent: Feb. 3, 2009

(54) SHALE SHAKERS AND SCREENS WITH IDENTIFICATION APPARATUSES

(75) Inventors: Eric Scott, Conroe, TX (US); Leon D. Ellison, Huffman, TX (US); Reinhold Kammann, Wienhausen (DE); Clive Chemo Lam, Tomball, TX (US); Manfred H. Worms, Nienhagen (DE); Guy L. McClung, III, Spring, TX (US)

(73) Assignee: Varco I/P, Inc., Houston, TX (US)

( * ) Notice: Subject to any disclaimer, the term of this patent is extended or adjusted under 35 U.S.C. 154(b) by 290 days.

(21) Appl. No.: 11/255,160

(22) Filed: Oct. 20, 2005

(65) Prior Publication Data

US 2006/0108113 A1    May 25, 2006

Related U.S. Application Data

(63) Continuation-in-part of application No. 11/059,584, filed on Feb. 16, 2005, now Pat. No. 7,159,654, which is a continuation-in-part of application No. 10/825,590, filed on Apr. 15, 2004, now abandoned, and a continuation-in-part of application No. 10/512,372, filed as application No. PCT/IB03/01031 on Mar. 13, 2003.

(51) Int. Cl.
*B07B 1/49* (2006.01)

(52) U.S. Cl. ............... 209/404; 209/405; 340/853.1; 340/572.7; 340/572.8

(58) Field of Classification Search ............ 166/255.1; 209/404
See application file for complete search history.

(56) References Cited

U.S. PATENT DOCUMENTS

| | | |
|---|---|---|
| 3,893,488 A | 7/1975 | Rogers et al. ............ 138/141 |
| 3,893,525 A | 7/1975 | Dower et al. ............ 175/24 |
| 3,928,189 A | 12/1975 | Lower et al. ............ 209/405 |
| 4,061,967 A | 12/1977 | Hall ............ 324/260 |
| 4,196,418 A | 4/1980 | Kip et al. ............ 340/152 T |
| 4,202,490 A | 5/1980 | Gunkel et al. ............ 235/449 |
| 4,468,959 A | 9/1984 | Roberts ............ 73/151 |
| 4,497,029 A | 1/1985 | Kiyokawa ............ 364/474 |
| 4,533,823 A | 8/1985 | Vittorio ............ 235/375 |
| 4,578,991 A | 4/1986 | Nowlin ............ 73/151 |

(Continued)

FOREIGN PATENT DOCUMENTS

EP    0 169 698    1/1986

(Continued)

OTHER PUBLICATIONS

PCT/GB/2006/050331; Int'l Search Report 3 pp.; mailed Dec. 2, 2007.

(Continued)

*Primary Examiner*—Patrick H Mackey
*Assistant Examiner*—Kalyanavenkateshware Kumar
(74) *Attorney, Agent, or Firm*—Guy McClung

(57) ABSTRACT

A screen apparatus, which in certain aspects is a screen apparatus having a support, screening material on the support, and energizable identification apparatus on (exteriorly, interiorly, and/or within) the support for identifying the screen apparatus; a vibratory separator with such a screen apparatus; and a vibratory separator or shaker with energizable identification apparatus.

10 Claims, 34 Drawing Sheets

U.S. PATENT DOCUMENTS

| | | | |
|---|---|---|---|
| 4,698,631 A | 10/1987 | Kelly, Jr. et al. | 340/853 |
| 4,701,869 A | 10/1987 | Callegari, Sr. et al. | 364/562 |
| 4,720,626 A | 1/1988 | Nishikawa et al. | 235/449 |
| 4,728,422 A | 3/1988 | Bailey | 210/314 |
| 4,735,712 A | 4/1988 | Herren et al. | 209/403 |
| 4,742,470 A | 5/1988 | Juengel | 364/474 |
| 4,780,599 A | 10/1988 | Baus | 235/383 |
| 4,818,855 A | 4/1989 | Mongeon et al. | 235/440 |
| 4,850,009 A | 7/1989 | Zook et al. | 379/96 |
| 5,006,228 A | 4/1991 | Anderson et al. | 209/365.3 |
| 5,099,227 A | 3/1992 | Geiszler et al. | 340/572 |
| 5,099,437 A | 3/1992 | Weber | 364/550 |
| 5,107,705 A | 4/1992 | Wraight et al. | 73/151.5 |
| 5,142,128 A * | 8/1992 | Perkin et al. | 235/375 |
| 5,157,687 A | 10/1992 | Tymes | 375/1 |
| 5,202,680 A | 4/1993 | Savage | 340/853.1 |
| 5,221,831 A | 6/1993 | Geiszler | 235/440 |
| 5,225,996 A | 7/1993 | Weber | 364/550 |
| 5,360,967 A | 11/1994 | Perkin et al. | 235/375 |
| 5,385,669 A | 1/1995 | Leone | 210/488 |
| 5,491,637 A | 2/1996 | Kraemer et al. | 700/115 |
| 5,536,264 A | 7/1996 | Hsueh et al. | 604/368 |
| 5,551,575 A | 9/1996 | Leone | 209/273 |
| 5,566,919 A | 10/1996 | Shephard | 248/604 |
| 5,608,199 A | 3/1997 | Clouse, III et al. | 235/435 |
| 5,621,647 A | 4/1997 | Kraemer et al. | 364/468.22 |
| 5,685,982 A | 11/1997 | Foster | 210/488 |
| 5,698,631 A | 12/1997 | Sigworth et al. | 525/122 |
| 5,851,686 A | 12/1998 | Aghajanian et al. | 428/614 |
| 5,855,955 A | 1/1999 | Claar et al. | 427/248.1 |
| 5,924,261 A | 7/1999 | Fricke | 52/720.1 |
| 5,938,936 A | 8/1999 | Hodges et al. | 210/705 |
| 5,956,658 A | 9/1999 | McMahon | 702/83 |
| 5,973,599 A | 10/1999 | Nicholson et al. | 340/572.8 |
| 6,019,228 A | 2/2000 | Duggan | 209/408 |
| 6,100,804 A * | 8/2000 | Brady et al. | 340/572.7 |
| 6,152,307 A | 11/2000 | Adams et al. | 209/403 |
| 6,155,428 A | 12/2000 | Bailey et al. | 209/315 |
| 6,186,337 B1 | 2/2001 | Adams et al. | 209/401 |
| 6,194,481 B1 | 2/2001 | Furman et al. | 522/77 |
| 6,267,247 B1 | 7/2001 | Seyffert et al. | 209/403 |
| 6,269,953 B1 | 8/2001 | Seyffert et al. | 209/399 |
| 6,290,068 B1 | 9/2001 | Adams et al. | 209/401 |
| 6,302,276 B1 | 10/2001 | Seyffert et al. | 209/412 |
| 6,324,833 B1 | 12/2001 | Singer et al. | 60/271 |
| 6,325,216 B1 | 12/2001 | Seyffert et al. | 209/408 |
| 6,331,028 B1 | 12/2001 | O'Neill et al. | 296/100 |
| 6,333,700 B1 * | 12/2001 | Thomeer et al. | 340/854.8 |
| 6,339,047 B1 | 1/2002 | Christopherson et al. | 505/410 |
| 6,346,319 B1 | 2/2002 | Cochran | 428/295.1 |
| 6,346,325 B1 | 2/2002 | Edwards et al. | 428/401 |
| 6,347,292 B1 | 2/2002 | Denny et al. | 702/188 |
| 6,352,779 B1 | 3/2002 | Edwards et al. | 428/412 |
| 6,353,038 B1 | 3/2002 | Aho et al. | 523/105 |
| 6,355,206 B1 | 3/2002 | Hanzawa et al. | 266/239 |
| 6,355,358 B1 | 3/2002 | Boer et al. | 428/474.4 |
| 6,358,603 B1 | 3/2002 | Bache | 428/323 |
| 6,361,860 B1 | 3/2002 | Koch | 428/364 |
| 6,371,302 B1 | 4/2002 | Adams et al. | 209/412 |
| 6,392,317 B1 | 5/2002 | Hall et al. | 307/90 |
| 6,413,478 B1 | 7/2002 | Mabry et al. | 422/187 |
| 6,480,811 B2 | 11/2002 | Denny et al. | 702/188 |
| 6,604,063 B2 | 8/2003 | Denny et al. | 702/188 |
| 6,641,434 B2 * | 11/2003 | Boyle et al. | 439/577 |
| 6,670,880 B1 | 12/2003 | Hall et al. | 336/132 |
| 6,688,396 B2 | 2/2004 | Floerke et al. | 166/380 |
| 6,722,504 B2 | 4/2004 | Schulte et al. | 209/359 |
| 6,759,968 B2 | 7/2004 | Zierolf | 340/854.8 |
| 6,820,314 B2 | 11/2004 | Ferguson et al. | 29/25.42 |
| 6,825,754 B1 | 11/2004 | Rolin | 340/10.34 |
| 6,892,052 B2 | 5/2005 | Kotola et al. | 455/41.2 |
| 6,923,572 B2 | 8/2005 | Kano | 374/129 |
| 6,944,547 B2 | 9/2005 | Womer et al. | 702/7 |
| 7,000,777 B2 | 2/2006 | Adams et al. | 209/399 |
| 7,303,079 B2 * | 12/2007 | Reid-Robertson et al. | 209/405 |
| 2002/0014966 A1 * | 2/2002 | Strassner et al. | 340/572.1 |
| 2002/0035448 A1 * | 3/2002 | Denny et al. | 702/188 |
| 2002/0158120 A1 | 10/2002 | Zierolf | |
| 2003/0090390 A1 | 5/2003 | Snider et al. | |
| 2003/0156033 A1 * | 8/2003 | Savage et al. | 340/572.8 |
| 2004/0088129 A1 * | 5/2004 | Satola | 702/113 |
| 2006/0108465 A1 | 5/2006 | Barscevicius et al. | 241/261.2 |
| 2006/0131453 A1 | 6/2006 | Barscevicius et al. | 241/56 |
| 2006/0243839 A9 | 11/2006 | Barscevicius et al. | 241/261.2 |

FOREIGN PATENT DOCUMENTS

| | | |
|---|---|---|
| EP | 0 238 455 | 9/1987 |
| EP | 1052030 | 4/2000 |
| GB | 2 085 744 A | 5/1982 |
| GB | 2 089 403 A | 6/1982 |
| WO | WO 93/15561 | 1/1993 |
| WO | WO 02/06632 | 1/2002 |
| WO | WO 02/092245 | 11/2002 |

OTHER PUBLICATIONS

Roblon, Roblon Als, 2001.
TK Liner System, Tuboscope, Feb. 2001.
TK 21 Liner System, Tuboscope, Feb. 2001.
TK 33 Liner System, Tuboscope, Feb. 2001.
TK 34 Liner System, Tuboscope, Feb. 2001.
TK 34 XT Liner System, Tuboscope, Feb. 2001.
TK 69 Liner System, Tuboscope, Feb. 2001.
TK 70 Liner System, Tuboscope, Feb. 2001.
TK 99 Liner System, Tuboscope, Feb. 2001.
Our coating services enhance your tubulars' performance and your bottom line, Tuboscope, 2002.
Int'l Search Report, PCT/IB03/01031 w/ form PCT/ISA/210.
Drillstring Identification To Reduce Drillstring Failures, IADC/SPE 17210, Twilhaar et al, pp. 297-300, 1988.
Electronic Identification of Drillstem and Other Components Useed in Harsh Environments Proves Successful, SPE/IADC 25774, Shepard et al. pp. 915-926, 1993.
MBBS Launches RFID THrough Metal at Expo in Europe, Andrews, 2001.

* cited by examiner

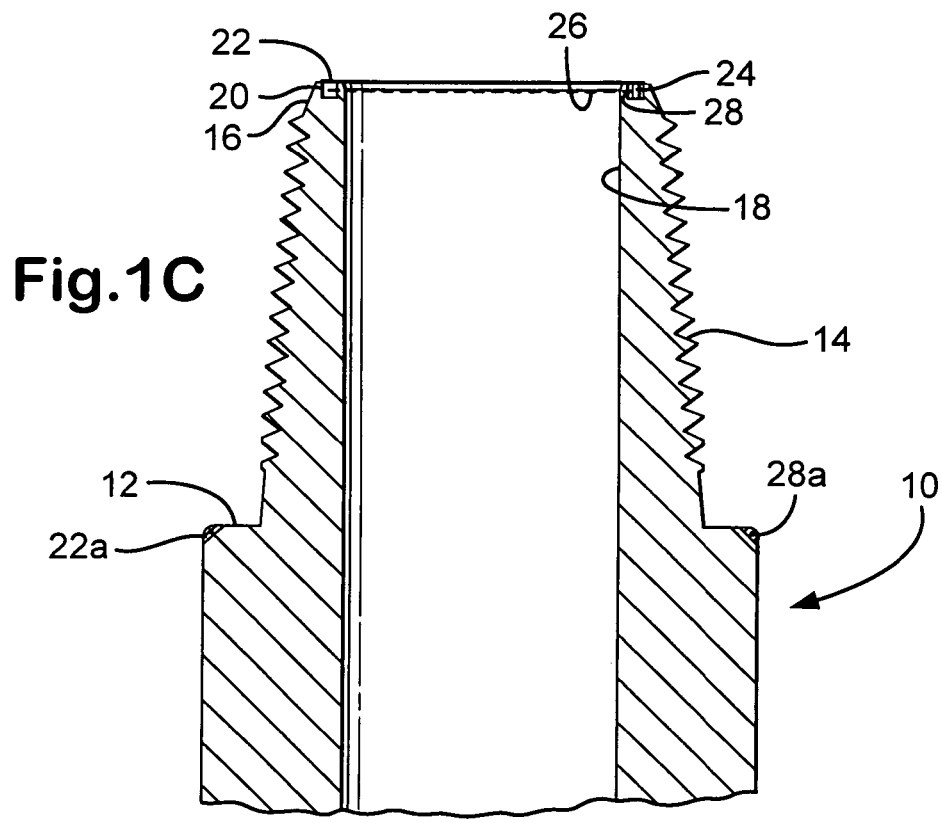
Fig.1C
Fig.1D
Fig.2
Prior Art
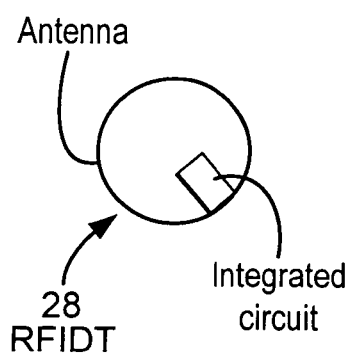
Antenna
Integrated circuit
28 RFIDT
Fig.2A
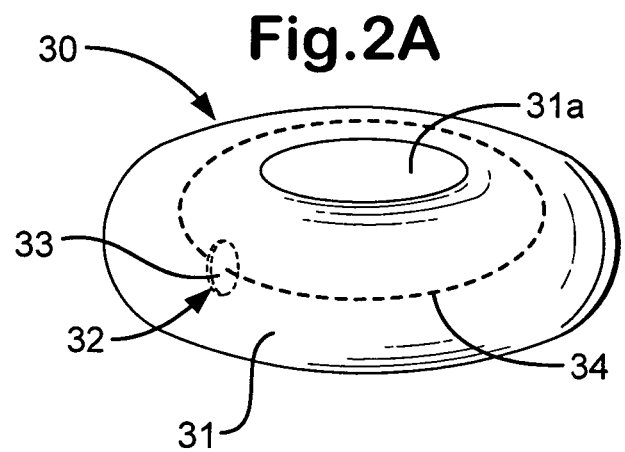

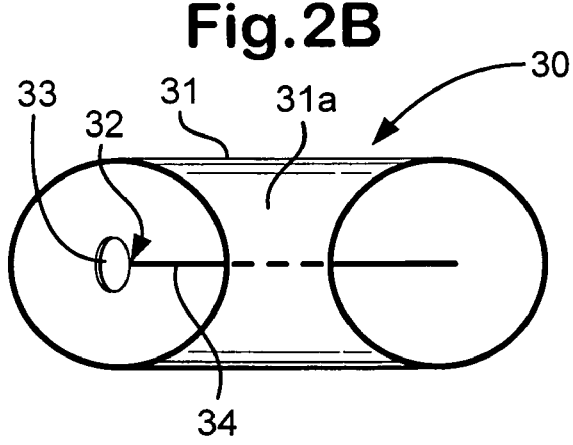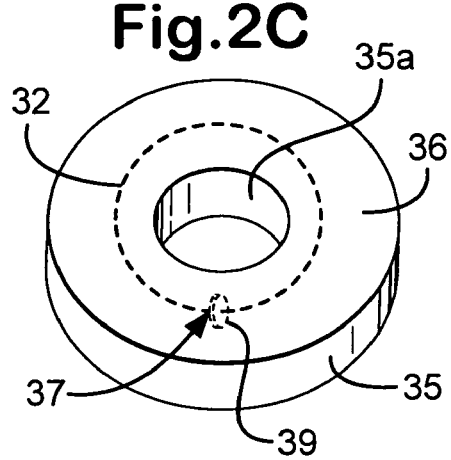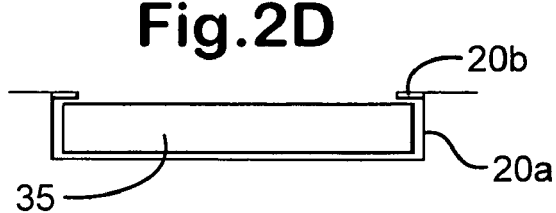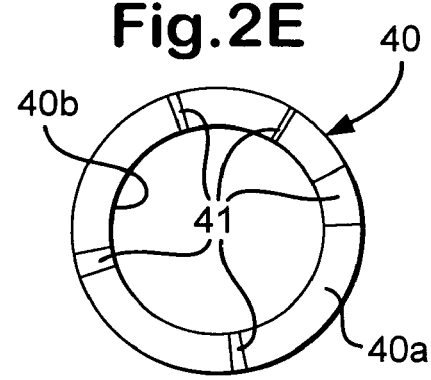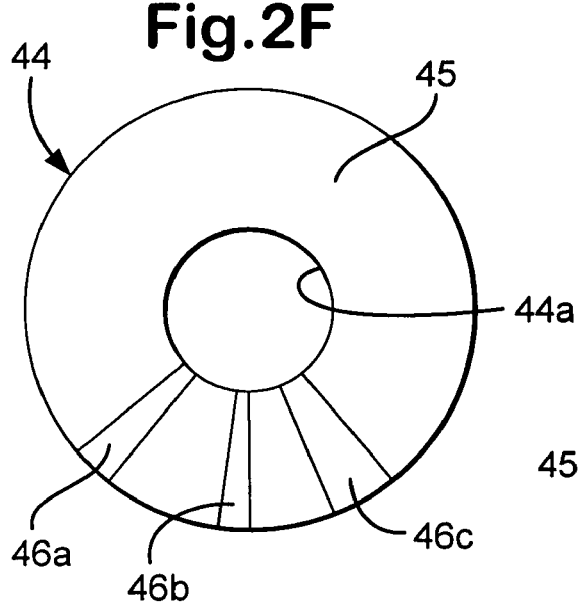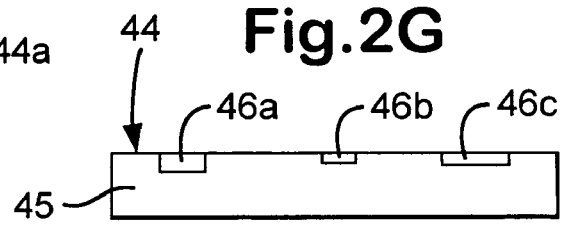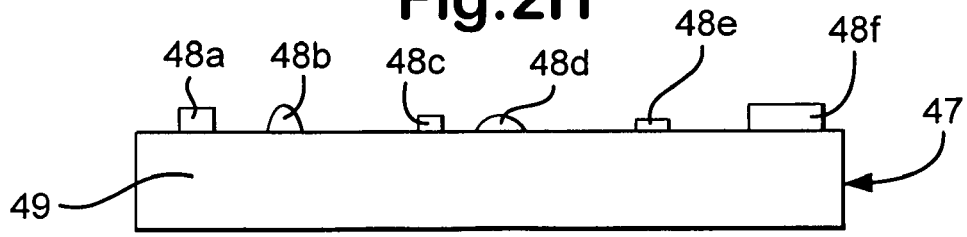

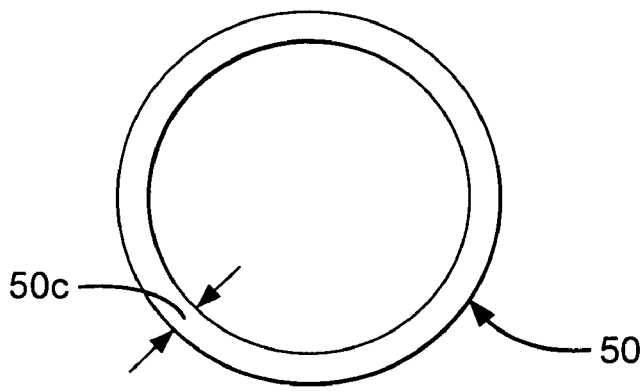
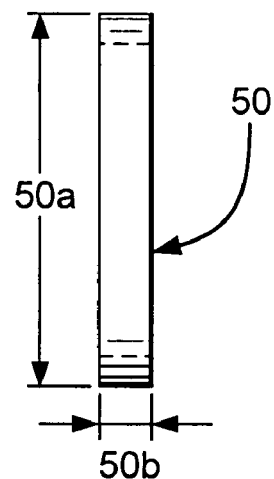
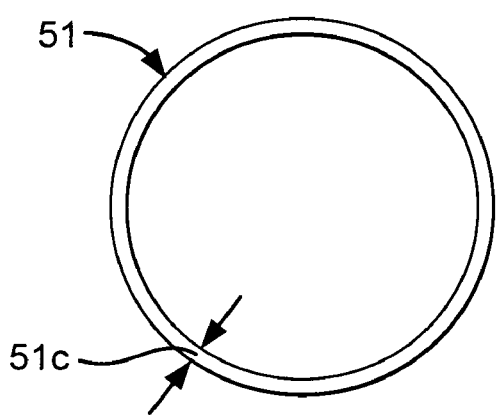
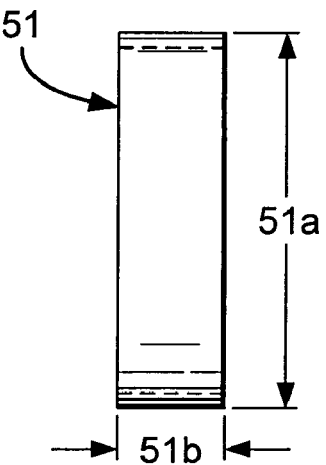
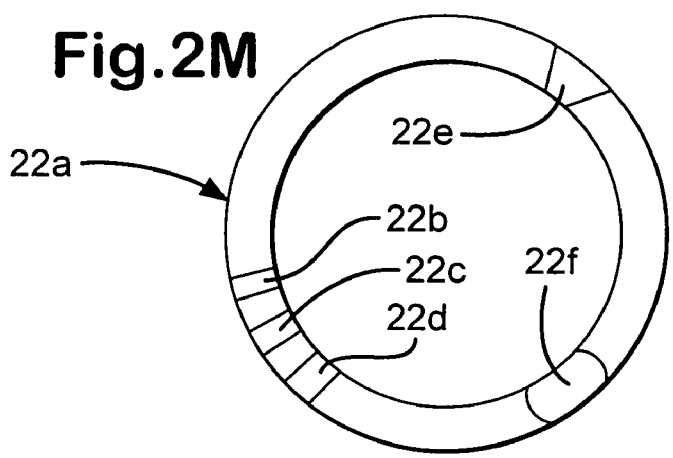

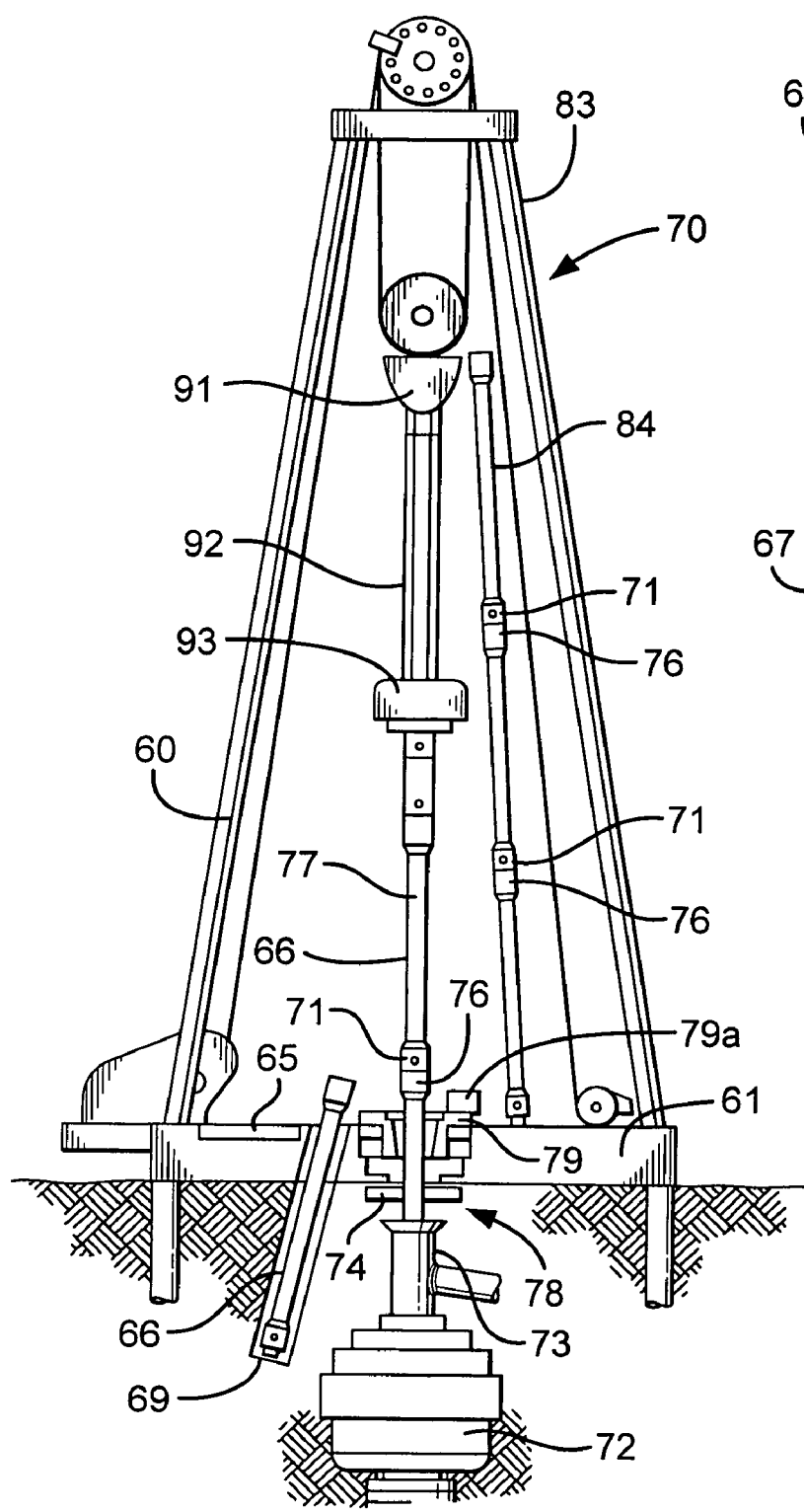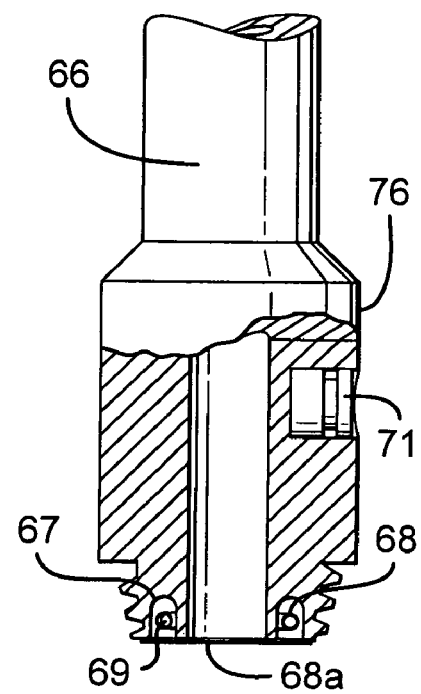

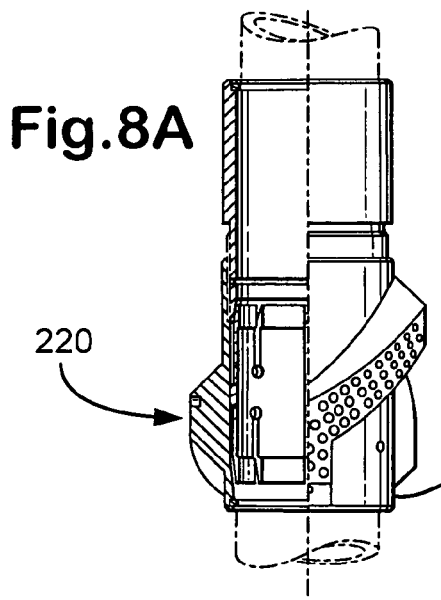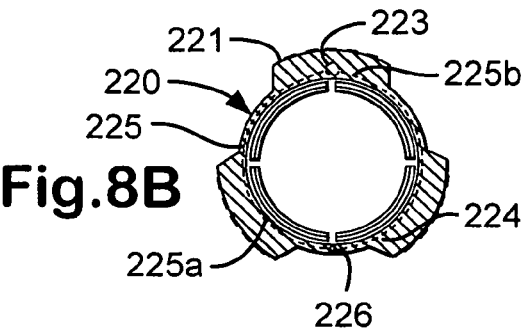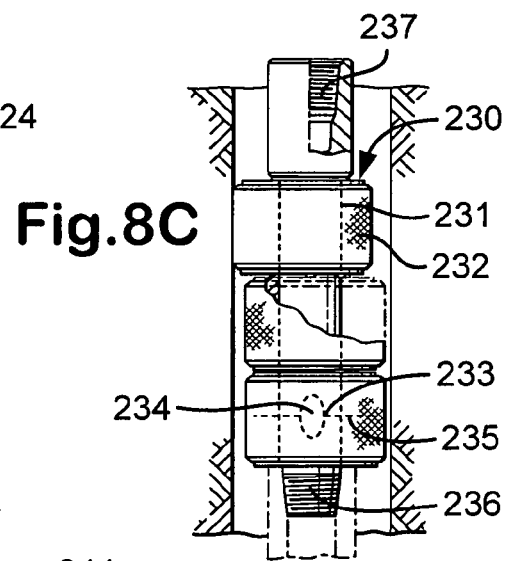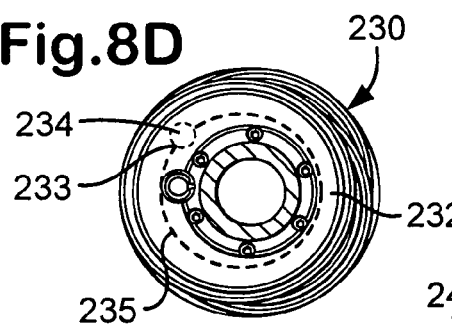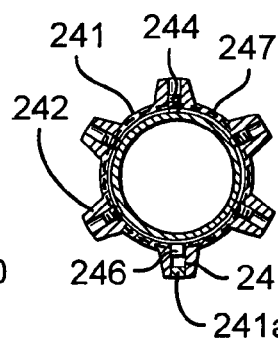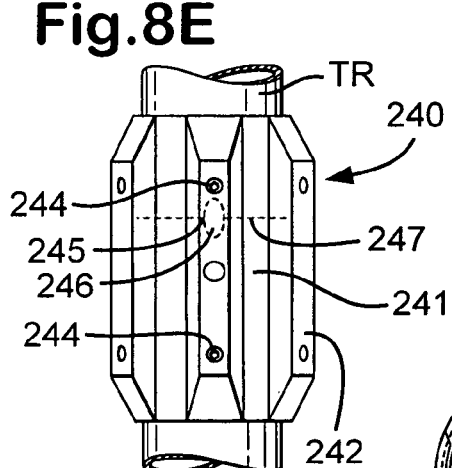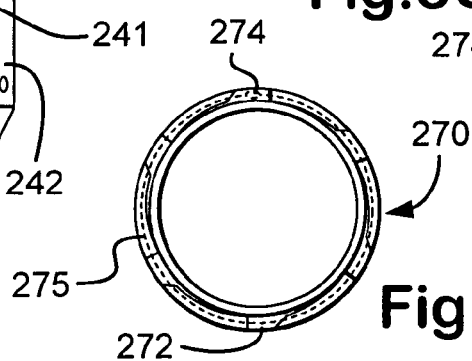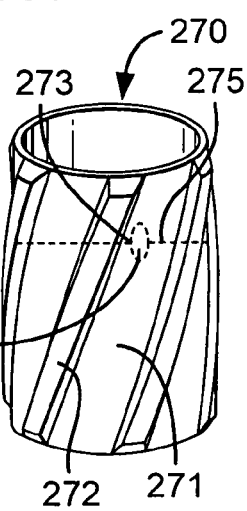

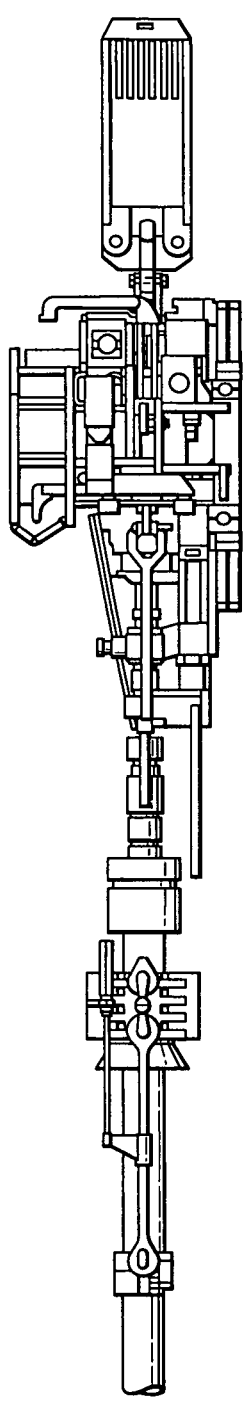
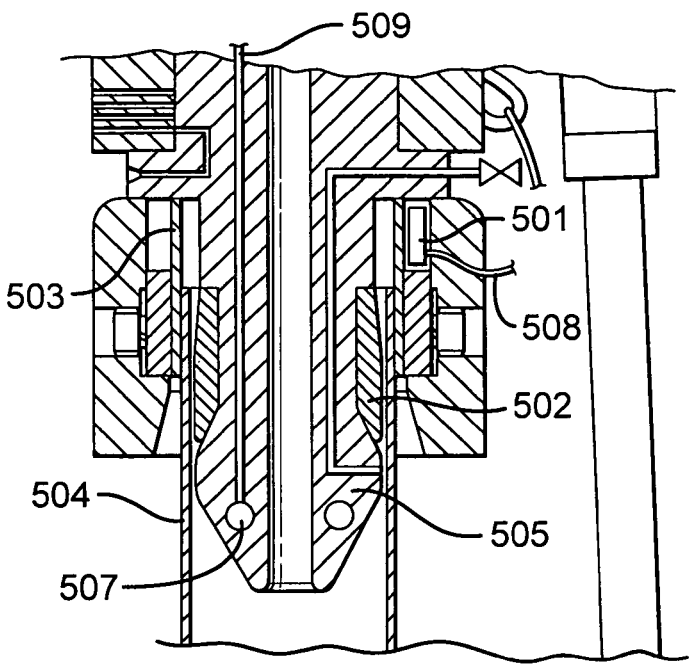
Fig.15B
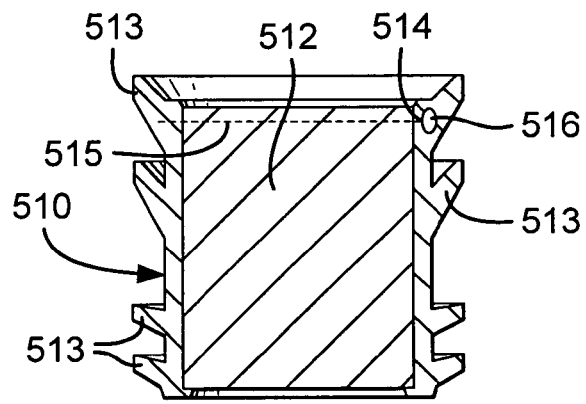
Fig.16A
Fig.15A
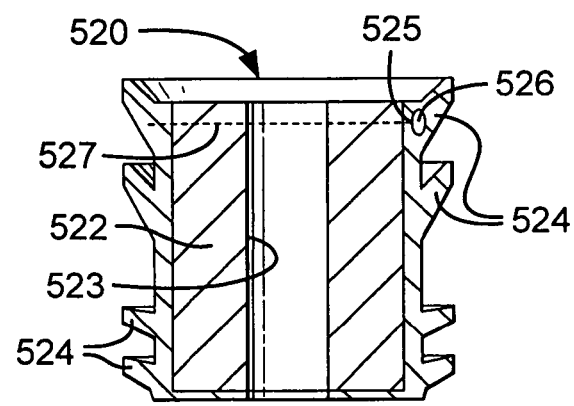
Fig.16B

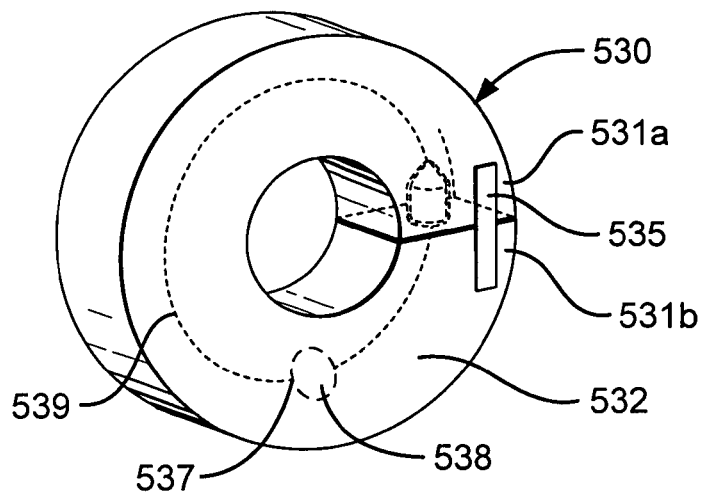
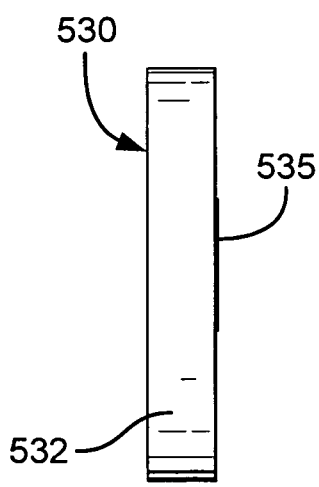
Fig.17A
Fig.17B
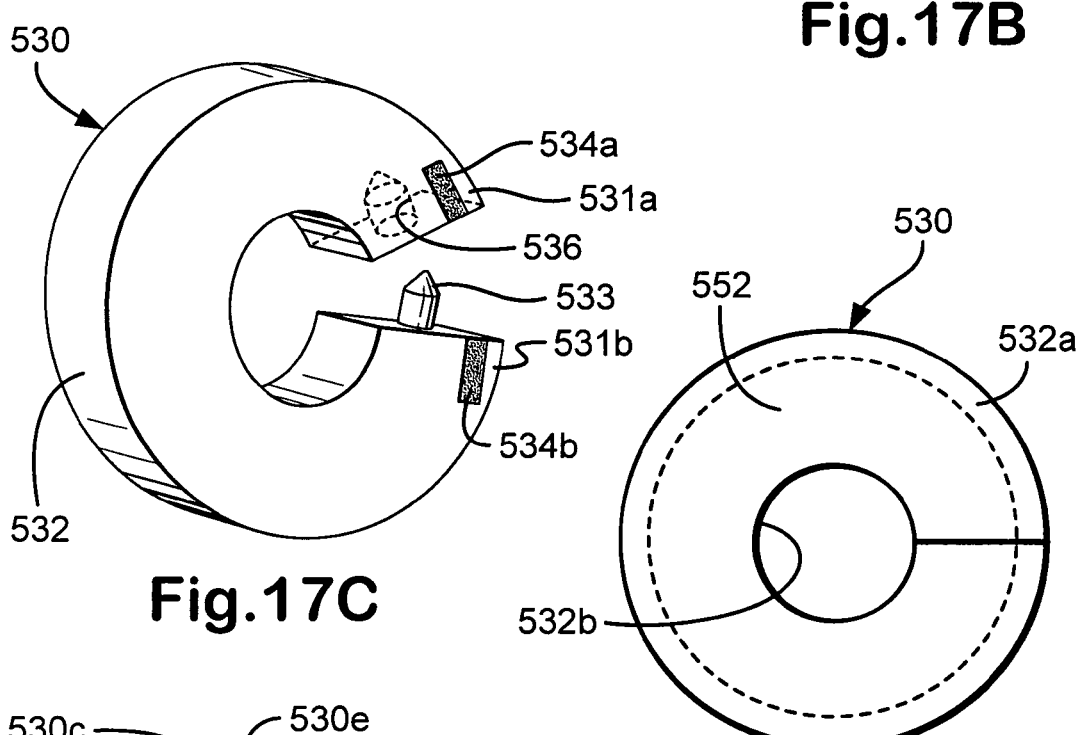
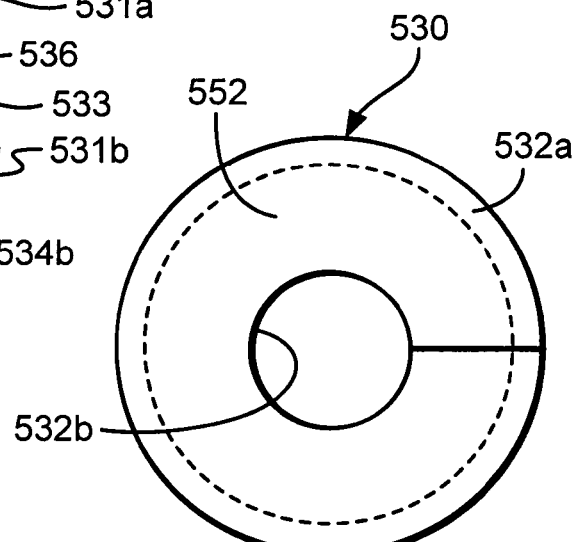
Fig.17C
Fig.17D
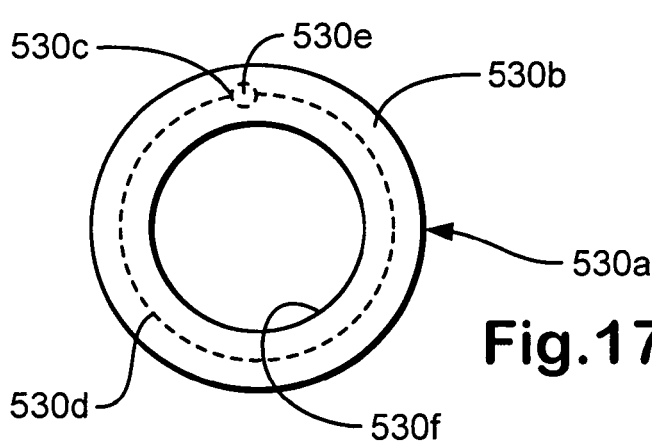
Fig.17E

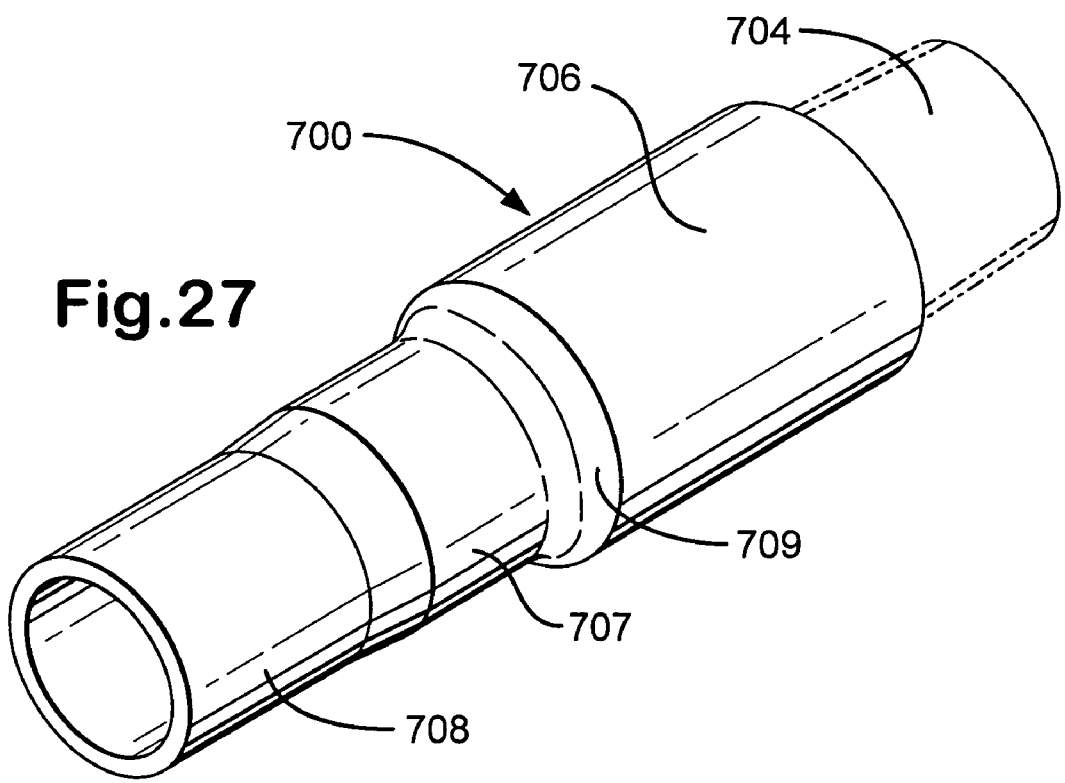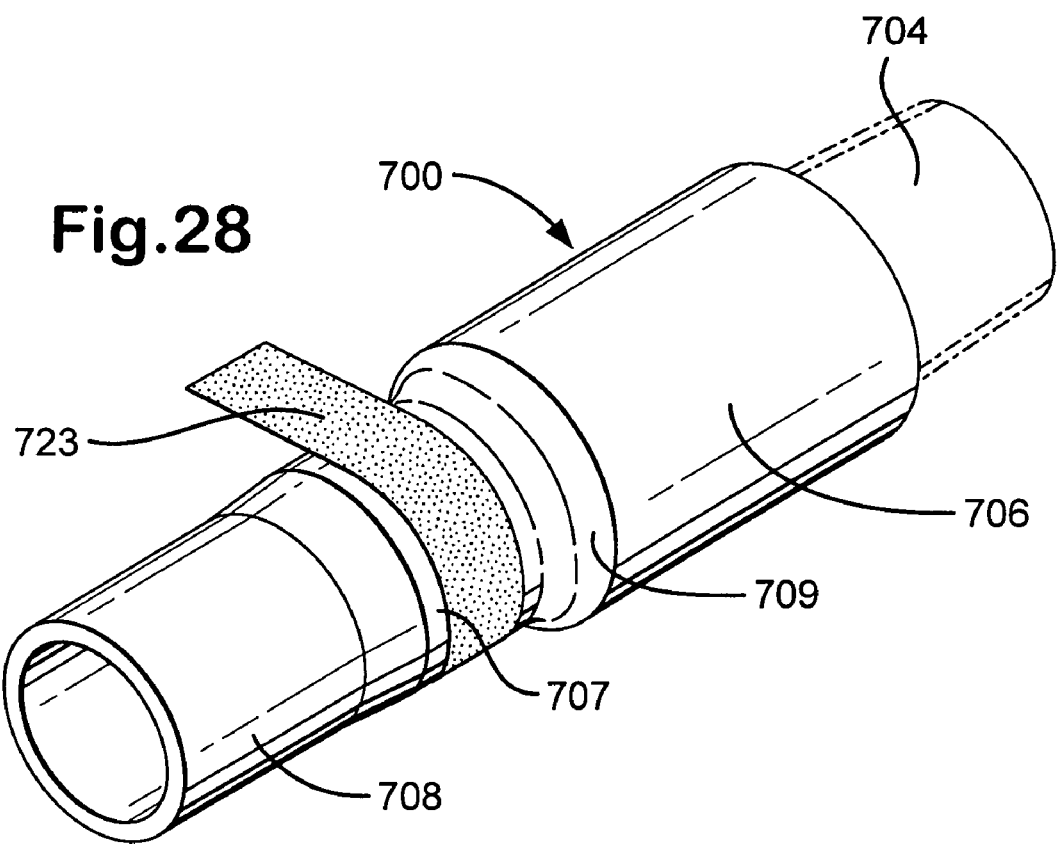

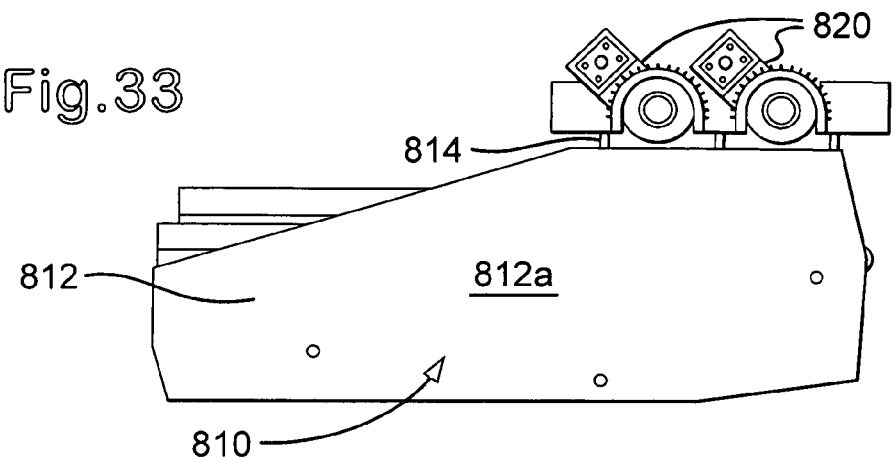
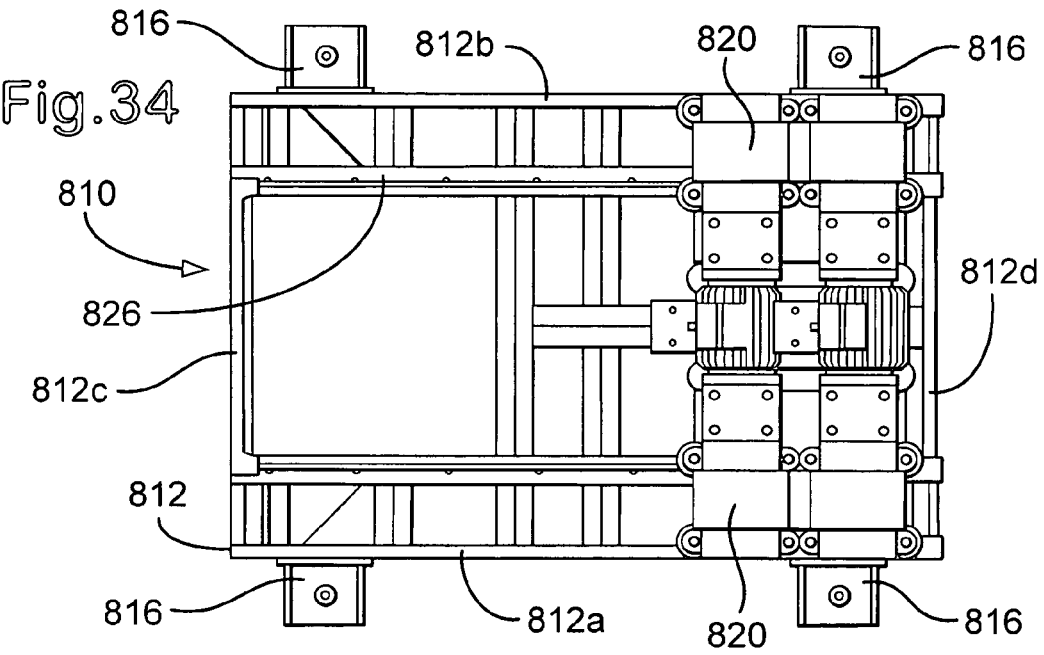
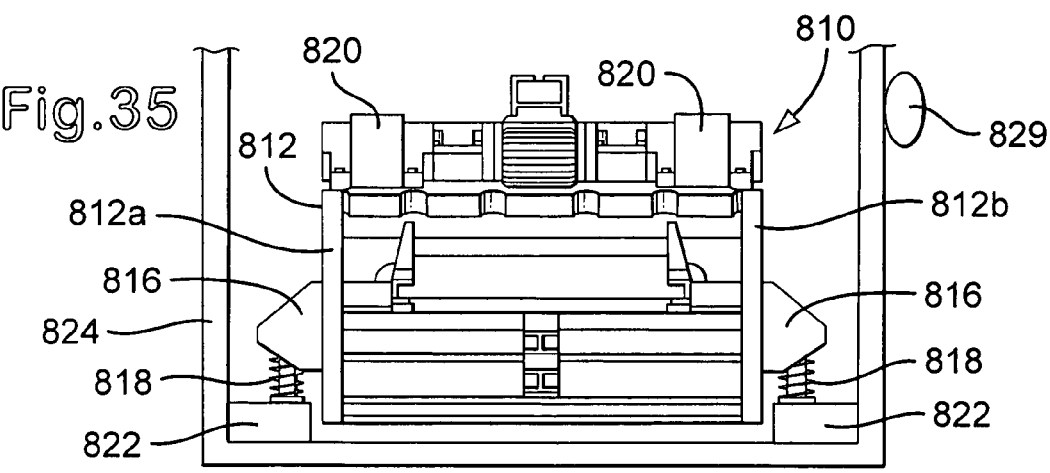

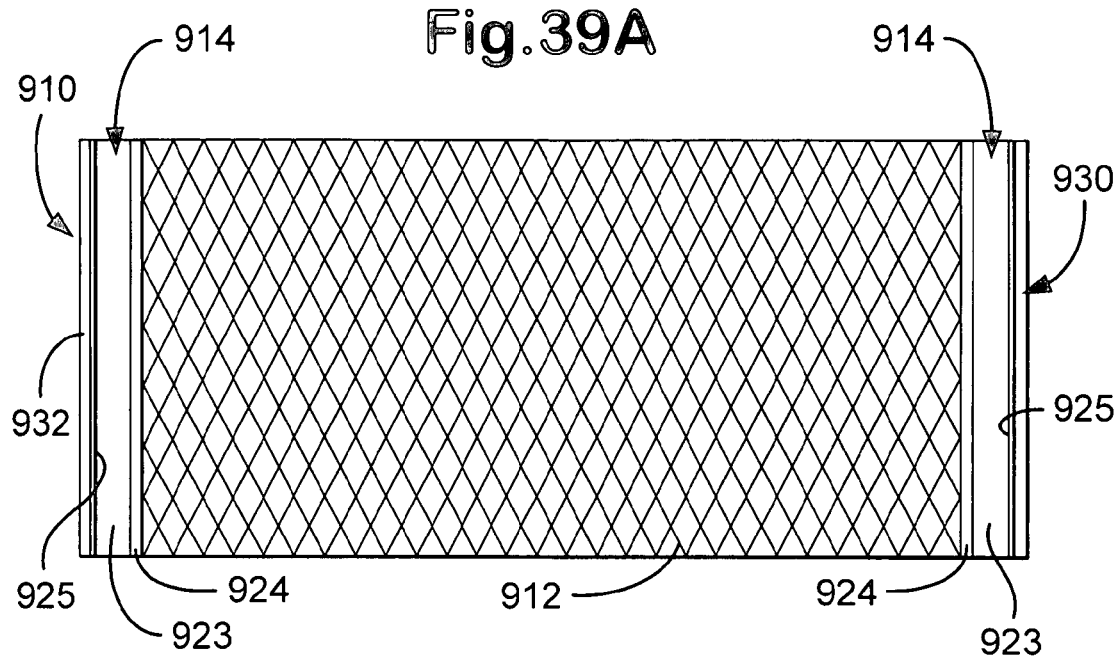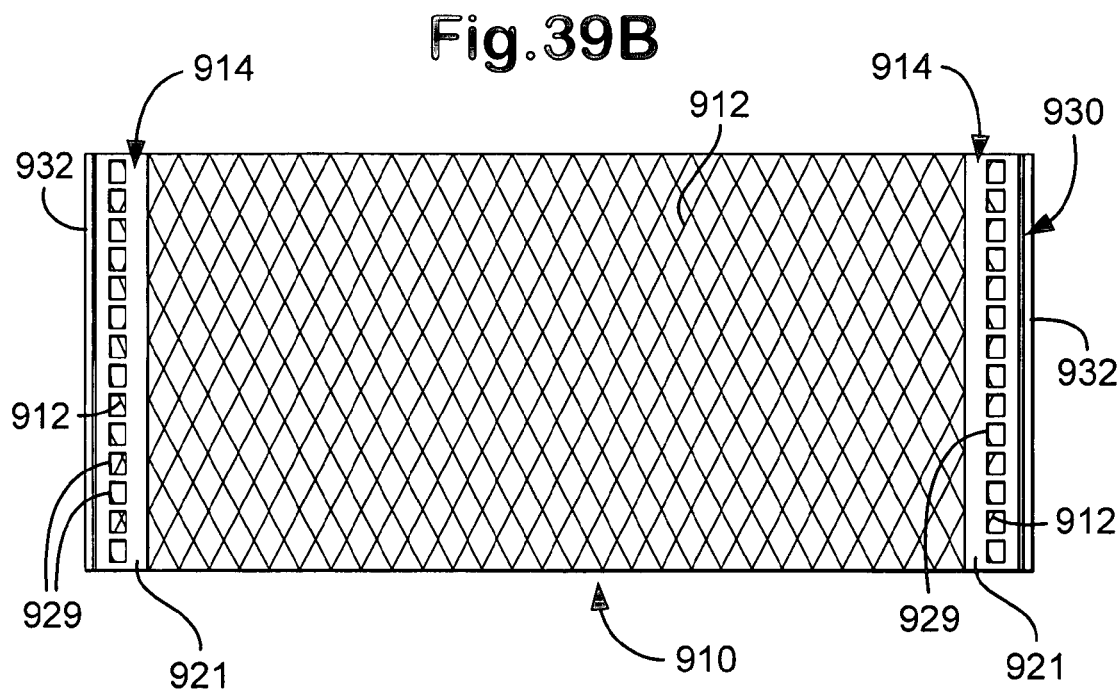

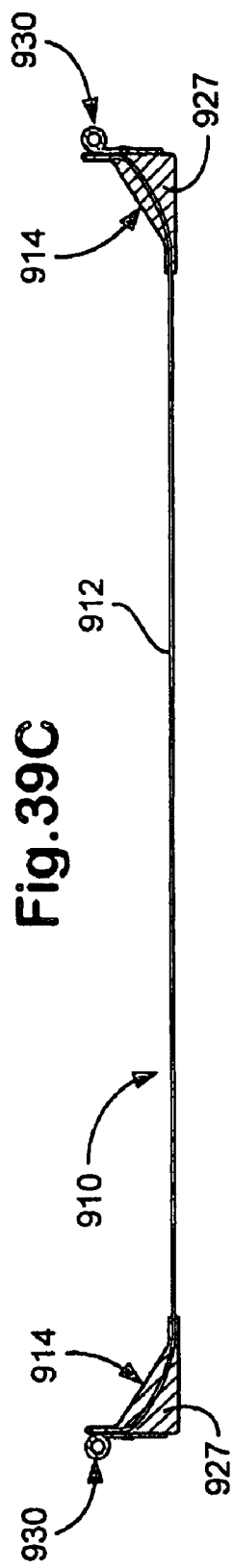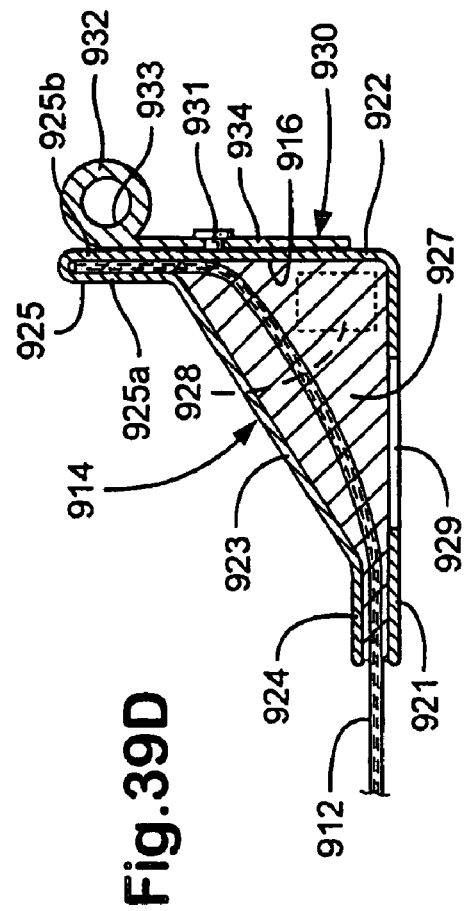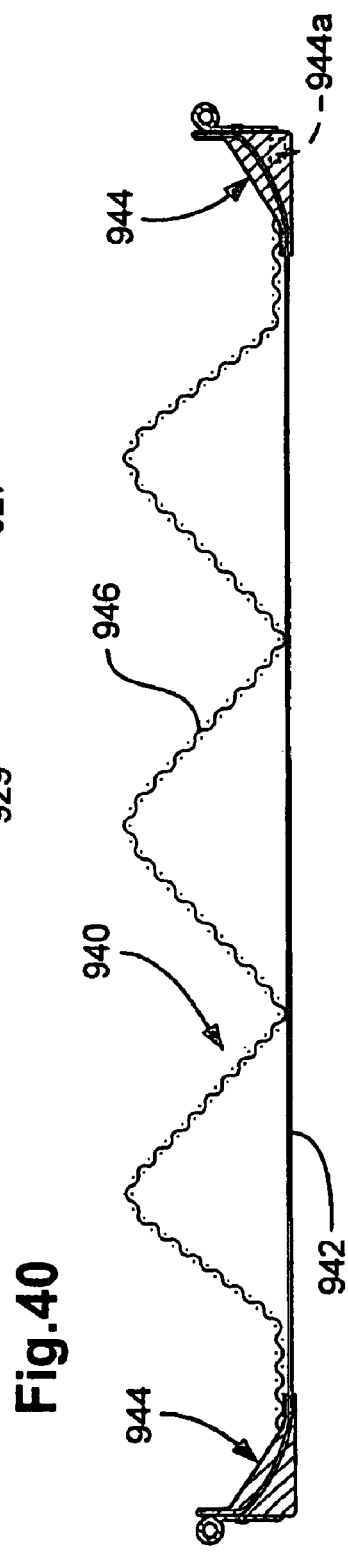

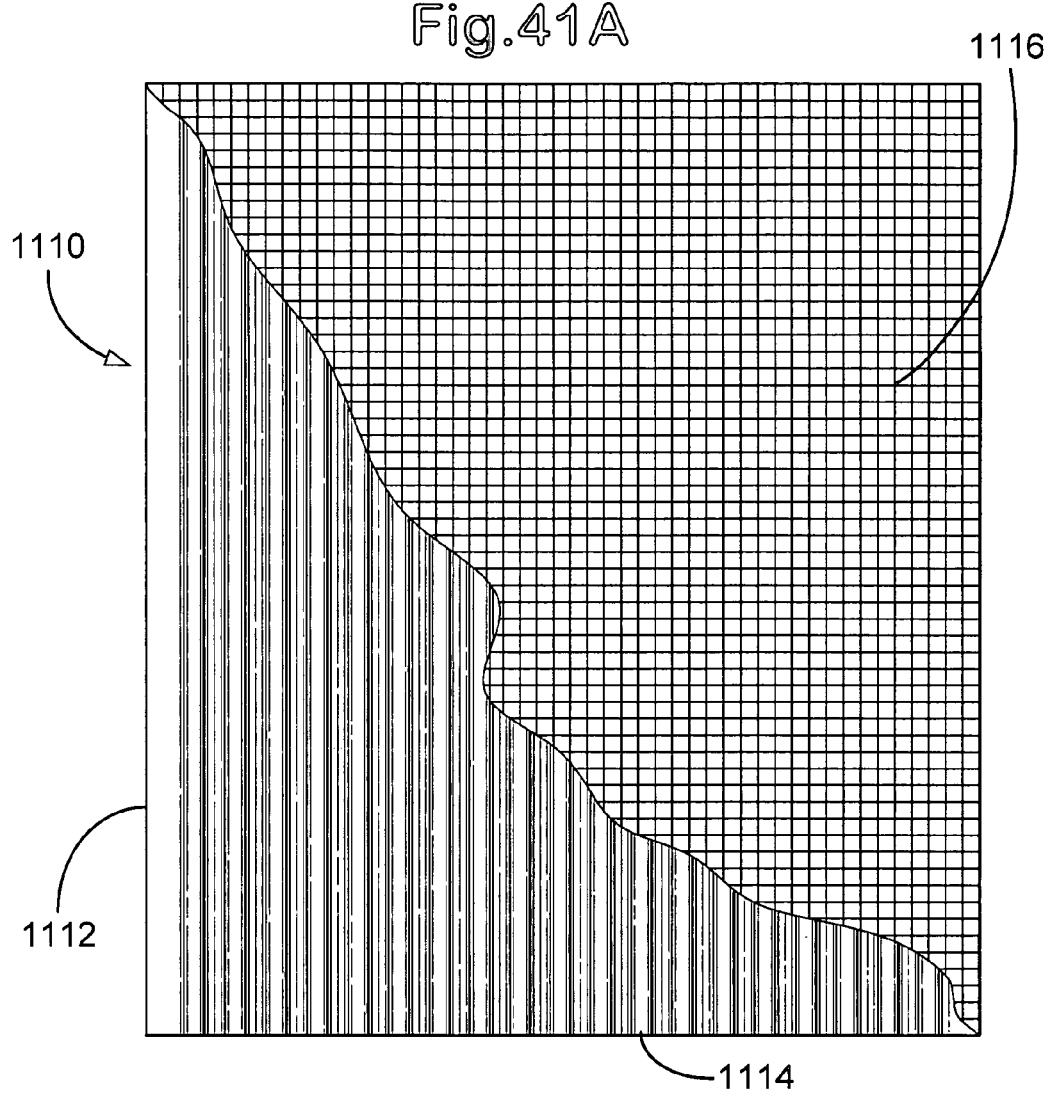
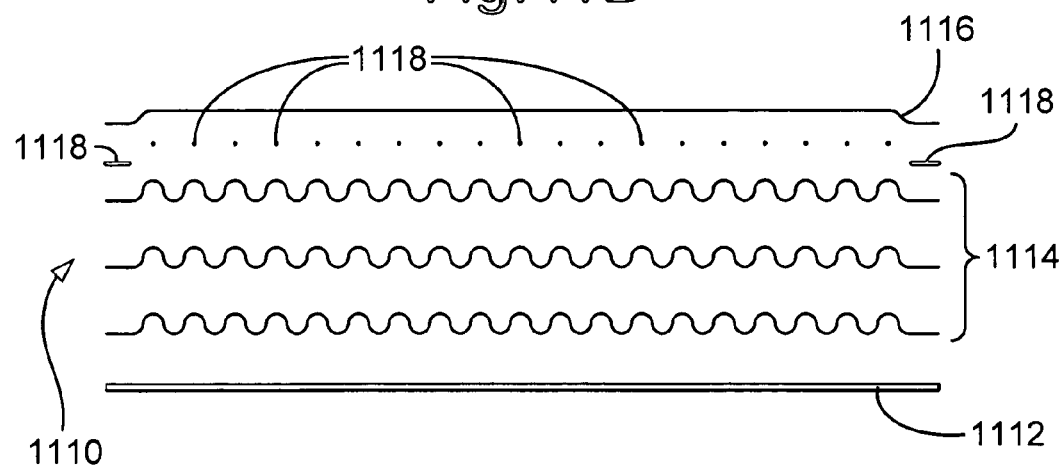

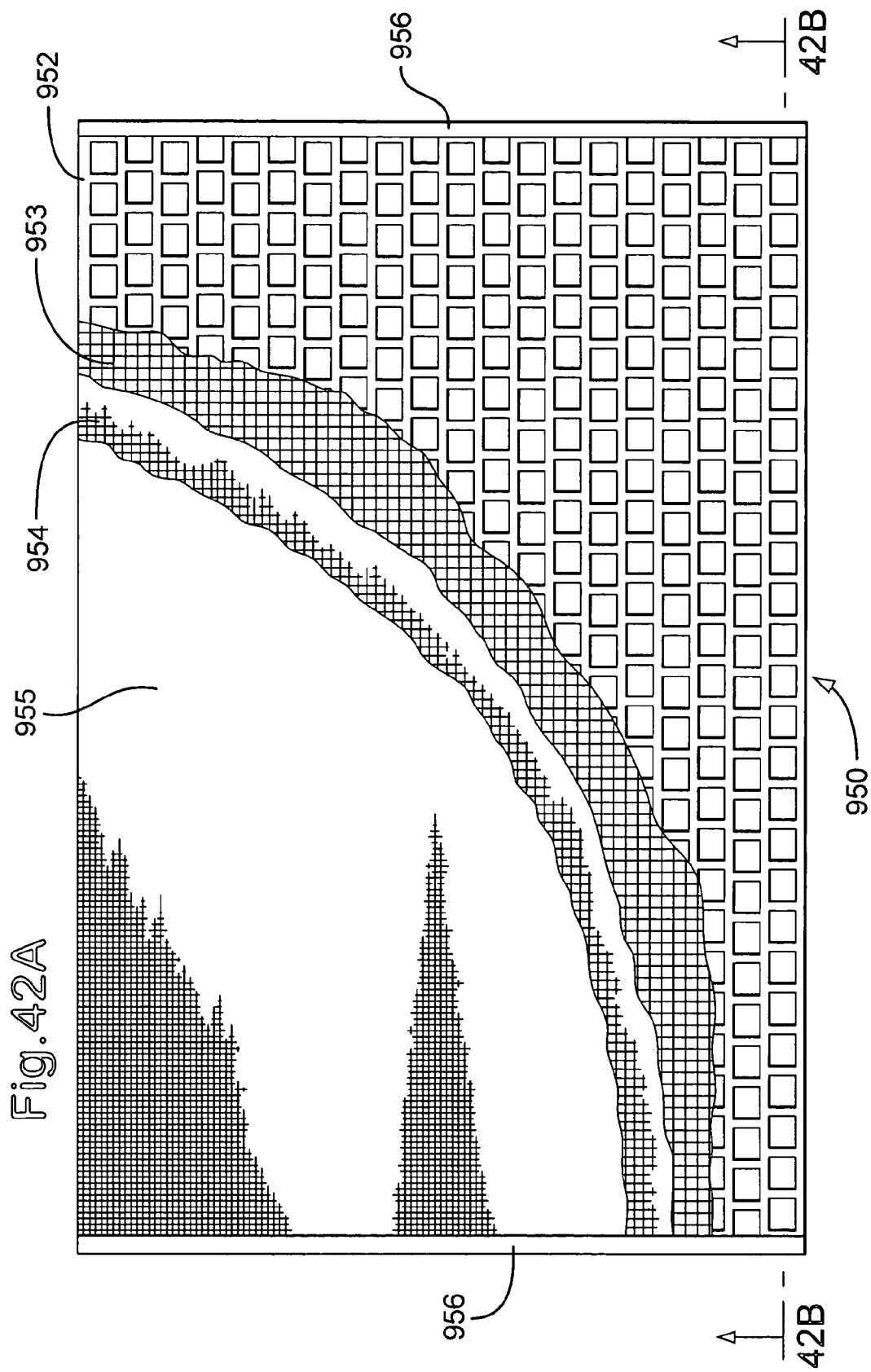

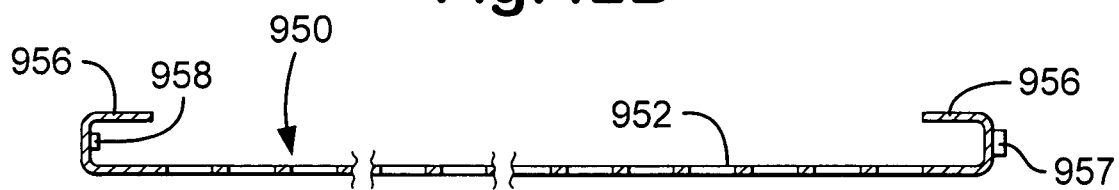
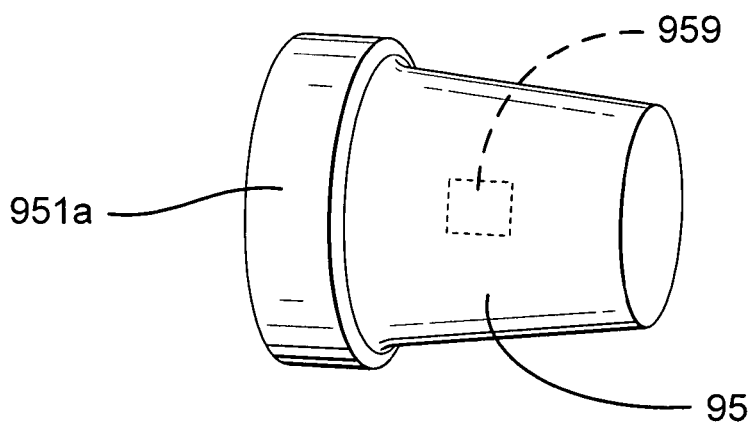
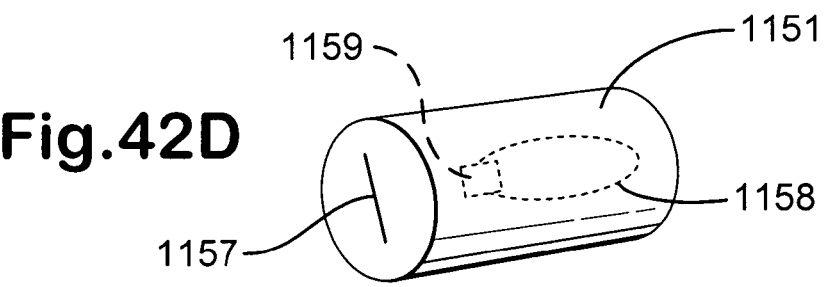
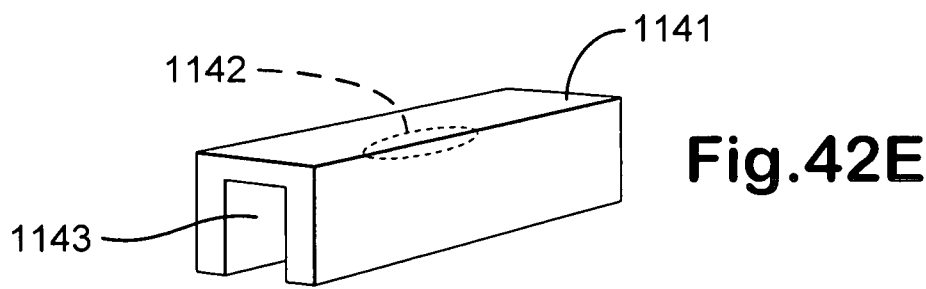

SHALE SHAKERS AND SCREENS WITH IDENTIFICATION APPARATUSES

RELATED APPLICATIONS

This is a continuation-in-part of U.S. application Ser. No. 11/059,584 filed Feb. 16, 2005 now U.S. Pat No. 7,159,654 which is a continuation-in-part of U.S. application Ser. No. 10/825,590 filed Apr. 15, 2004 now abandoned; and this is a continuation-in-part of U.S. application Ser. No. 10/512,372 which claims priority from PCT Application No. PCT/IB03/01031 (Int'l Publication No. WO 03/090940 A1) filed Mar. 13, 2003 which claims priority from U.S. application Ser. No. 10/134,027 filed Apr. 26, 2003—from all of which the present invention claims priority under the Patent Laws.

BACKGROUND OF THE INVENTION

1. Field Of The Invention

This invention is directed to systems and methods for identifying screens and screen assemblies used on vibratory separators and shale shakers.

2. Description of Related Art

The prior art discloses a variety of systems and methods for using surface acoustic wave tags or radio frequency identification tags in identifying items, including items used in the oil and gas industry such as drill pipe. (See e.g. U.S. Pat. Nos. 4,698,631; 5,142,128; 5,202,680; 5,360,967; 6,333,699; 6,333,700; 6,347,292; 6,480,811; and U.S. patent applications Ser. Nos. 10/323,536 filed Dec. 18, 2002; U.S. Ser. No. 09/843,998 filed Apr. 27, 2001; U.S. Ser. No. 10/047,436 filed Jan. 14, 2002; U.S. Ser. No. 10/261,551 filed Sep. 30, 2002; U.S. Ser. No. 10/032,114 filed Dec. 21, 2001; and U.S. Ser. No. 10/013,255 filed Nov. 5, 2001; all incorporated fully herein for all purposes.) In many of these systems a radio frequency identification tag or "RFIDT" is used on pipe at such a location either interiorly or exteriorly of a pipe, that the RFIDT is exposed to extreme temperatures and conditions downhole in a wellbore. Often an RFIDT so positioned fails and is of no further use. Also, in many instances, an RFIDT so positioned is subjected to damage above ground due to the rigors of handling and manipulation.

The present inventors have realized that, in certain embodiments, substantial usefulness for a tubular identification system can be achieved by divorcing the desire for effective above-ground identification and operation from the goal of downhole accessibility.

SUMMARY OF THE PRESENT INVENTION

The present invention provides, in certain aspects, a screen or screen assembly for a vibratory separator or shale shaker; the screen or screen assembly having one, two, or more energizable identification apparatuses, e.g. RFIDT or SAW tags, the energizable identification apparatuses may be on or within the screen or screen assembly, either within a solid part or in a space within a hollow member, e.g. within a hollow part of a frame.

The present invention, in certain aspects, provides an item, an apparatus, or a tubular, e.g. a piece of drill pipe, with an energizable identification apparatus, e.g. a radio frequency identification tag either affixed exteriorly to the item, apparatus or tubular or in a recess in an end thereof so that the RFIDT is protected from shocks (pressure, impacts, thermal) that may be encountered in a wellbore or during drilling operations. In one particular aspect one or more RFIDT's are covered with heat and/or impact resistant materials on the exterior of an item. In one particular aspect, the present invention discloses systems and methods in which a piece of drill pipe with threaded pin and box ends has one or more circumferential recesses formed in the pin end into which is emplaced one or more radio frequency identification tags each with an integrated circuit and with an antenna encircling the pin end within A recess. The RFIDT (OR RFIDT'S) in a recess is protected by a layer of filler, glue or adhesive, e.g. epoxy material, and/or by a cap ring corresponding to and closing off the recess. Such a cap ring may be made of metal (magnetic; or nonmagnetic, e.g. aluminum, stainless steel, silver, gold, platinum and titanium), plastic, composite, polytetrafluoroethylene, fiberglass, ceramic, and/or cermet. The RFIDT can be, in certain aspects, any known commercially-available read-only or read-write radio frequency identification tag and any suitable known reader system, manual, fixed, and/or automatic may be used to read the RFIDT.

The present invention, in certain aspects, provides an item, apparatus, or tubular, e.g. screen assembly or a piece of drill pipe, with one or more energizable identification apparatuses, e.g. radio frequency identification tags, wrapped in heat and impact resistant materials; in one aspect, located in an area 2-3" in length beginning ½ from the 18 degree taper of the pin and drill pipe tool joint so that the RFIDT (or RFIDT's) is protected from shocks (pressure, impacts, thermal) that may be encountered on a rig, in a wellbore, or during wellbore (e.g. drilling or casing) operations. In one particular aspect, the present invention discloses systems and methods in which a piece of drill pie with threaded pin and box ends has one or more radio frequency identification tags each with an integrated circuit and with an antenna encircling the pin end upset area located exteriorly on the pipe, e.g. in an area ½"-2½" from a pin end 18 degree taper. The RFIDT (or RFIDT'S) is protected by wrapping the entire RFIDT and antenna in a heat resistant material wrapped around the circumference of the tube body and held in place by heat resistant glue or adhesive, e.g. epoxy material which encases the RFIDT. This material is covered with a layer of impact resistant material and wrapped with multiple layers of wrapping material such as epoxy bonded wrap material. Preferably this wrapping does not exceed the tool joint OD. The RFIDT can be (as can be any disclosed herein), in certain aspects, any known commercially-available read-only or read-write radio frequency identification tag and any suitable know reader system, manual, fixed, and/or automatic may be used to read the RFIDT. Such installation of RFIDT's can be carried out in the field, in a factory, on a rig, with no machining necessary. Optionally, a metal tag designating a unique serial number of each item, apparatus, or length of drill pipe located under the wrap with the RFIDT(s) insures "Traceability" is never lost due to failure of the RFIDT(s). Replacement of failed RFIDT's can be carried out without leaving a location, eliminating expensive transportation or trucking costs. Optionally the wrap is applied in a distinctive and/or a bright color for easy identification. Determining whether an item, apparatus, or a tubular or a length of drill pipe or a drill pipe string is RFID-tagged or not is visibly noticeable, e.g. from a distance once the RFIDT's are in place. Such wrapping may be used to apply an energizable identification apparatus to a screen assembly.

In certain particular aspects an RFIDT is encased in a mass of material or in a ring of protective material whose shape and configuration corresponds to the shape of the pin end's recess and the ring is either permanently or removably positioned in the recess. Such a ring may be used without or in conjunction with an amount of protective material covering the ring or with a cap ring that protectively covers the RFIDT. Two or more RFIDT's may be used in one recess and/or there may be multiple recesses at different levels. In other aspects a ring is provided which is emplaceable around a member, either a generally cylindrical circular member or a member with some other shape.

With an RFIDT located in a pipe's pin end as described herein, upon makeup of a joint including two such pieces of pipe, an RFIDT in one pipe's pin end is completely surrounded by pipe material—including that of a corresponding pipe's box end—and the RFIDT is sealingly protected from access by materials flowing through the pipe and from materials exterior to the pipe. The mass of pipe material surrounding the enclosed RFIDT also protects it from the temperature extremes of materials within and outside of the pipe.

In other aspects [with or without an RFIDT in a recess] sensible material and/or indicia are located within a recess and, in one aspect, transparent material is placed above the material and/or indicia for visual inspection or monitoring; and, in one aspect, such sensible material and/or indicia are in or on a cap ring.

A pipe with a pin end recess as described herein can be a piece of typical pipe in which the recess is formed, e.g. by machining or with laser apparatus or by drilling; or the pipe can be manufactured with the recess formed integrally thereof. In certain particular aspects, in cross-section a recess has a shape that is square, rectangular, triangular, semi-triangular, circular, semi-circular, trapezoid, dovetail, or rhomboid.

It has also been discovered that the location of an RFIDT or RFIDT's according to the present invention can be accomplished in other items, apparatuses, tubulars and generally tubular apparatuses in addition to drill pipe, or in a member, device, or apparatus that has a cross-section area that permits exterior wrapping of RFIDT(S) or circumferential installation of antenna apparatus including, but not limited to, in or on casing, drill collars, (magnetic or nonmagnetic) pipe, thread protectors, centralizers, stabilizers, control line protectors, mills, plugs (including but not limited to cementing plugs), and risers; and in or on other apparatuses, including, but not limited to, whipstocks, tubular handlers, tubular manipulators, tubular rotators, top drives, tongs, spinners, downhole motors, elevators, spiders, powered mouse holes, and pipe handlers, sucker rods, and drill bits (all which can be made of or have portions of magnetizable metal or nonmagnetizable metal).

In certain aspects the present invention discloses a rig with a rig floor having thereon or embedded therein or positioned therebelow a tag reader system which reads RFIDT's in pipe or other apparatus placed on the rig floor above the tag reader system. All of such rig-floor-based reader systems, manually-operated reader systems, and other fixed reader systems useful in methods and systems according to the present invention may be, in certain aspects, in communication with one or more control systems, e.g. computers, computerized systems, consoles, and/or control system located on the rig, on site, and/or remotely from the rig, either via lines and/or cables or wirelessly. Such system can provide identification, inventory, and quality control functions and, in one aspect, are useful to insure that desired tubulars, and only desired tubulars, go downhole and/or that desired apparatus, and only desired apparatus, is used on the rig. In certain aspects one or more RFIDT's is affixed exteriorly of or positioned in a recess an item, apparatus, or tubular, e.g., in one aspect, in a box end of a tubular. In certain aspects antennas of RFIDT's according to the present invention have a diameter between one quarter inch to ten inches and in particular aspects this range is between two inches and four inches. Such systems can also be used with certain RFIDT's to record on a read-write apparatus therein historical information related to current use of an item, apparatus or of a tubular member; e.g., but not limited to, that this particular item, apparatus, or tubular member is being used at this time in this particular location or string, and/or with particular torque applied thereto by this particular apparatus.

In other aspects, a pipe with a pin end recess described therein has emplaced therein or thereon a member or ring with or without an RFIDT and with sensible indicia, e.g., one or a series of signature cuts, etchings, holes, notches, indentations, alpha and/or numeric characters, raised portion(s) and/or voids, filled in or not with filler material (e.g. but not limited to, epoxy material and/or nonmagnetic or magnetic metal, composite, fiberglass, plastic, ceramic and/or cermet), which indicia are visually identifiable and/or can be sensed by sensing systems (including, but not limited to, systems using ultrasonic sensing, eddy current sensing, optical/laser sensing, and/or microwave sensing). Similarly it is within the scope of the present invention to provide a cap ring (or a ring to be emplaced in a recess) as described herein (either for closing off a recess or for attachment to a pin end which has no such recess) with such indicia which can be sensed visually or with sensing equipment.

It is within the scope of this invention to provide an item, apparatus, or tubular member as described herein exteriorly affixed (RFIDT(s) and/or with a circular recess as described above with energizable identification apparatus other than or in addition to one or more RFIDT'S; including, for example one or more surface acoustic wave tags ("SAW tags") with its antenna apparatus in the circular apparatus.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

New, useful, unique, efficient, nonobvious devices, systems and methods for apparatus identification, tracking, inventory and control and, in certain aspects, such systems and methods employing energizable identification device(s), e.g. one or more RFID tags and/or one or more SAW tags;

Such systems and methods in which a member, e.g. part of a screen or screen assembly, is provided with one or more exteriorly affixed energizable identification apparatuses and/or one or more recesses into which one or more identification devices are placed;

Such systems and methods in which the member is a cylindrical or tubular member and the recess (or recesses) is a circumferential recess around either or both ends thereof, made or integrally formed therein;

Such systems and methods in which filler material and/or a cap ring is installed permanently or releasably over a recess to close it off and protect identification device(s);

Such systems and methods in which aspects of the present invention are combined in a nonobvious and new manner with existing apparatuses to provide dual redundancy identification;

Such systems and methods in which a sensing-containing member (flexible or rigid) is placed within or on an item; and Such systems and methods which include a system on, in, or under a rig floor, and/or on equipment, for sensing identification device apparatus according to the present invention.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly from a cursory inspection or review the nature and general area of the disclosure of this invention. The Abstract is neither intended to define the invention, which is done by the claims, nor is it intended to be limiting of the scope of the invention in any way.

It will be understood that the various embodiments of the present invention may include one, some, or all of the disclosed, described, and/or enumerated improvements and/or technical advantages and/or elements in claims to this invention.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 1C is a partial cross-sectional view of the drill pipe of FIG. 1A. FIG. 1D shows shapes for recesses according to the present invention.

FIG. 2 is a graphical representation of a prior art commercially-available radio frequency identification tag apparatus.

FIG. 2A is a perspective view of a torus according to the present invention. FIG. 2B is a side view partially in cross-section, of the torus of FIG. 2B.

FIG. 2C is a top perspective view of a torus according to the present invention. FIG. 2D is a side view in cross-section of a recess according to the present invention with the torus of FIG. 2C therein.

FIG. 2E is a top view in cross-section of a torus according to the present invention.

FIG. 2F is a top view of a torus according to the present invention. FIG. 2G is a side view of the torus of FIG. 2F.

FIG. 2H is a side view of a torus according to the present invention.

FIG. 2I is a top view of a cap ring according to the present invention. FIG. 2J is a side view of the cap ring of FIG. 2I.

FIG. 2K is a top view of a cap ring according to the present invention. FIG. 2L is a side view of the cap ring of FIG. 2K.

FIG. 2M is a top view of a cap ring according to the present invention.

FIG. 4A is a side schematic view of a rig according to the present invention. FIG. 4B is a side view partially in cross-section of a tubular according to the present invention.

FIG. 8A is a side view of a stabilizer according to the present invention. FIG. 8B is a cross-section view of the stabilizer of FIG. 8A. FIG. 8C is a side view of a centralizer according to the present invention. FIG. 8D is a cross-section view of the centralizer of FIG. 8C. FIG. 8E is a side view of a centralizer according to the present invention. FIG. 8F is a cross-section view of the centralizer of FIG. 8E. FIG. 8G is a side view of a centralizer according to the present invention. FIG. 8H is a cross-section view of the centralizer of FIG. 8E.

FIG. 15A is a side view of a top drive according to the present invention. FIG. 15B is an enlarged view of part of the top drive of FIG. 15A.

FIGS. 16A and 16B are side cross-section views of plugs according to the present invention.

FIG. 17A is a perspective view of a portable RFIDT bearing ring according to the present invention. FIG. 17B is a side view of the ring of FIG. 17A. FIG. 17C is a perspective view of the ring of FIG. 17A with the ring opened. FIG. 17D is a top view of a ring according to the present invention. FIG. 17E is a top view of a ring according to the present invention.

FIGS. 27-29 and 30-32 are perspective views of a tubular according to the present invention.

FIG. 33 is a side view of a shale shaker according to the present invention.

FIG. 34 is a top view of the shale shaker of FIG. 33.

FIG. 35 is an end view of the shale shaker of FIG. 33.

FIG. 39A is a top view of a screen assembly according to the present invention.

FIG. 39B is a top view of a screen assembly according to the present invention.

FIG. 39C is an end view of the screen assembly of FIG. 39B.

FIG. 39D is an enlargement of part of the screen assembly shown in FIG. 39C.

FIG. 40 is an end view of a screen assembly according to the present invention.

FIG. 41A is a top view of a screen assembly according to the present invention.

FIG. 41B is an exploded view of the screen assembly of FIG. 41A.

FIG. 42A is a top view of a screen assembly according to the present invention.

FIG. 42B is a section view along line 42B-42B of FIG. 42A.

FIG. 42C is a perspective view of an apparatus according to the present invention.

FIG. 42D is a perspective view of an apparatus according to the present invention.

FIG. 42E is a perspective view of an apparatus according to the present invention.

DESCRIPTION OF EMBODIMENTS PREFERRED AT THE TIME OF FILING FOR THIS PATENT

Figure 1A:
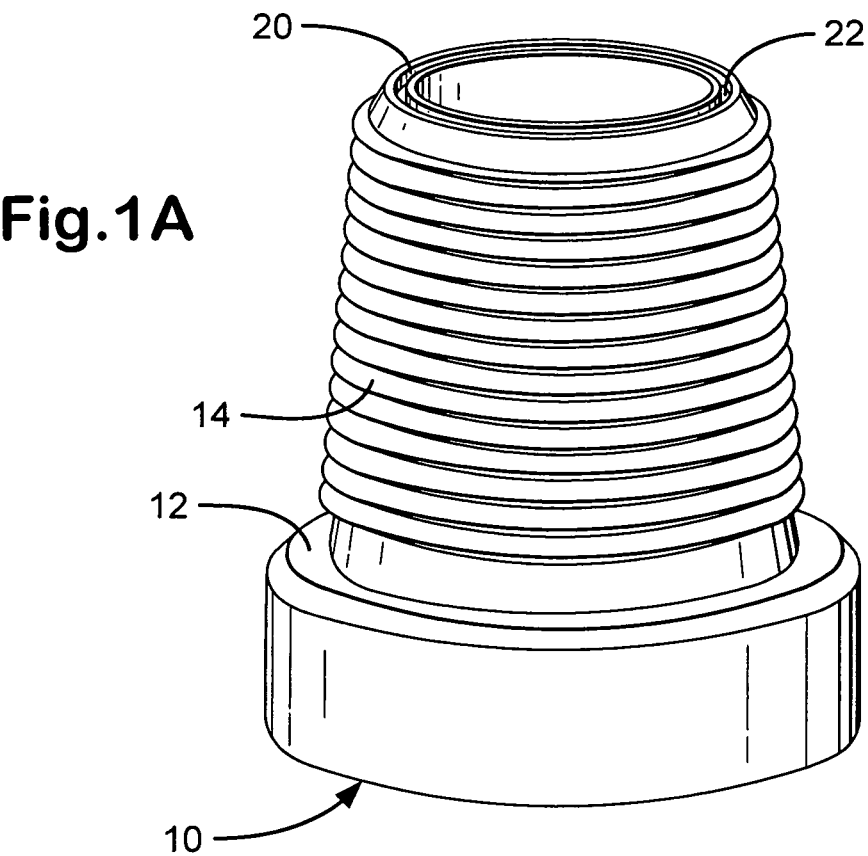
FIGS. 1A and 1B are perspective views of a pin end of a drill pipe according to the present invention.
Figure 1B:
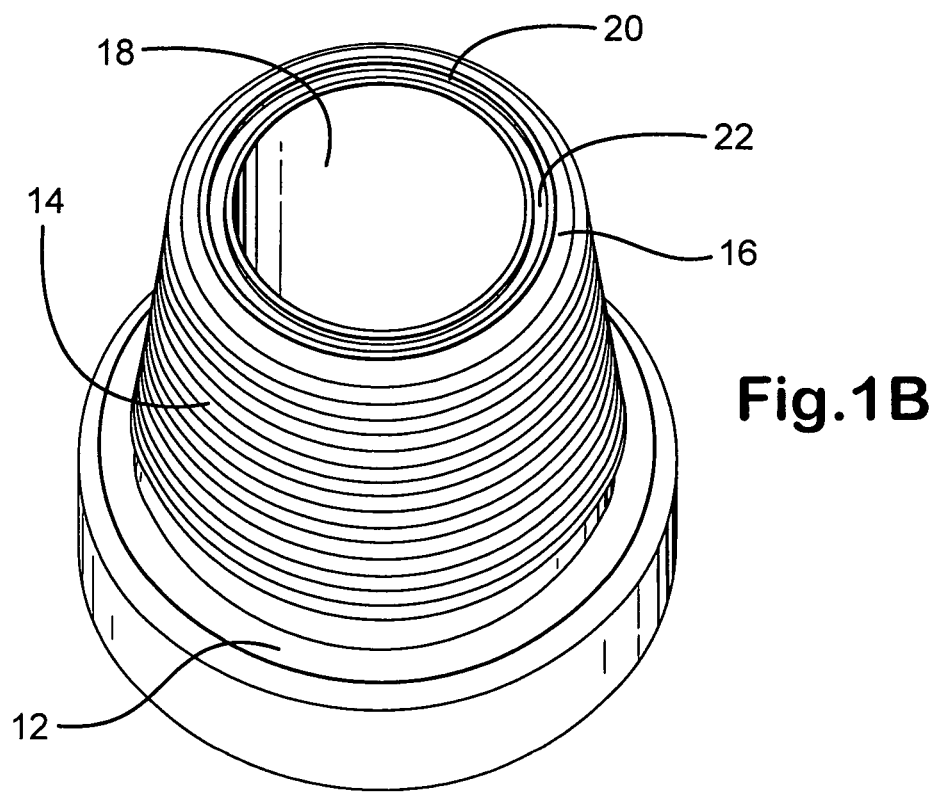

FIGS. 1A-1C show a pin end 10 of a drill pipe according to the present invention which has a sealing shoulder 12 and a threaded end portion 14. A typical flow channel 18 extends through the drill pipe from one end to the other. A recess 20 in the top 16 (as viewed in FIG. 1C) of the pin end 10 extends around the entire circumference of the top 16. This recess 20 is shown with a generally rectangular shape, but it is within the scope of this invention to provide a recess with any desired cross-sectional shape, including, but not limited to, the shapes shown in FIG. 1D. In one aspect an entire drill pipe piece with a pin end 10 is like the tubular shown in FIG. 3A or the drill pipe of FIG. 12B. The recess 20 (as is true for any recess of any embodiment disclosed herein) may be at any depth (as viewed in FIG. 1C) from the end of the pin end and, as shown in FIGS. 1A-1C may, according to the present invention, be located so that no thread is adjacent the recess.

It is within the scope of the present invention to form the recess 20 in a standard piece of drill pipe with a typical machine tool, drill, with a laser apparatus such as a laser cutting apparatus, or with etching apparatus. Alternatively, it is within the scope of the present invention to manufacture a piece of drill pipe (or other tubular) with the recess formed integrally in the pin end (and/or in a box end). The recess as shown in FIG. 1C is about 5 mm wide and 5 mm deep; but it is within the scope of certain embodiments of the present invention to have such a recess that is between 1 mm and 10 mm wide and between 2 mm and 20 mm deep.

A cap ring 22 is installed over the recess 20 which seals the space within the recess 20. This cap ring 22 (as may be any cap ring of any embodiment herein) may be made of any suitable material, including, but not limited to: metal, aluminum, zinc, brass, bronze, steel, stainless steel, iron, silver, gold, platinum, titanium, aluminum alloys, zinc alloys, or carbon steel; composite; plastic, fiberglass, fiber material such as ARAMID™ fiber material; KEVLAR™ or other similar material; ceramic; or cermet. The cap ring 22 may be sealingly installed using glue, adhesive, and/or welding (e.g., but not limited to Tig, Mig, and resistance welding and laser welding processes).

Disposed within the recess 20 beneath the cap ring 22, as shown in FIG. 1C, is an RFIDT device 28 which includes a tag 24 and an antenna 26. The antenna 26 encircles the recess 20 around the pin end's circumference and has two ends, each connected to the tag 24. The RFIDT tag device may be any suitable known device, including, but not limited to the RFID devices commercially available, as in FIG. 2, e.g. from MBBS Company of Switzerland, e.g. its E-Units™ (TAGs) devices e.g., as in FIG. 2. The RFIDT device 28 may be a read-only or a read-write device. It is within the scope of this invention to provide one, two, three or more such devices in a recess 20 (or in any recess of any embodiment herein). Optionally, the RFIDT device (or devices) is eliminated and a recess 20 with a particular varied bottom and/or varied side wall(s) and/or a cap ring with a nonuniform, varied, and/or structured surface or part(s) is used which variation(s) can be sensed and which provide a unique signature for a particular piece of drill pipe (as may be the case for any other embodiment of the present invention). These variations, etc. may be provided by different heights in a recess or different dimensions of projections or protrusions from a recess lower surface or recess side wall surface, by etchings thereon or on a cap ring, by cuts thereon or therein, and/or by a series of notches and/or voids in a recess and/or in a cap ring and/or by sensible indicia. Optionally, instead of the RFIDT device 28 (and for any embodiment herein any RFIDT) a SAW tag may be used and corresponding suitable apparatuses and systems for energizing the SAW tag(s) and reading them.

In certain aspects of the present invention with a recess like the recess 20 as described above, a ring or torus is releasably or permanently installed within the recess with or without a cap ring thereover (like the cap ring 22). Such a ring or torus may have one, two, or more (or no) RFIDT's therein. Such a ring or torus may be installed on any item, device, machine, or apparatus. FIG. 2A and 2B show a torus 30 installable within a recess, like the recess 20 or any recess as in FIG. 1C, which includes a body 31 with a central opening 31a. An RFIDT 32 is encased on the body 31. The RFIDT 32 has an integrated circuit 33 and an antenna 34 which encircles the body 31. In certain aspects the body 31 (as may be any body of any plug, mass for containing an energizable identification apparatus, torus or ring according to the present invention) is made of metal, plastic, polytetrafluorethylene, fiberglass, composite, ceramic, or of a nonmagnetizable metal. The opening 31a (as may be any opening of any torus or ring herein) may be any desired diameter. Optionally, or in addition to the RFIDT device 28, and RFIDT device 28a (or devices 28a) is affixed exteriorly to the pin end 10 with a multi-layer wrap as described below (see FIGS. 28, 26) (any energizable identification apparatus RFIDT(s) or SAW tag(s) may be used for the RFIDT 28a).

FIGS. 2C and 2D show a torus 35 which has a central opening 35a, a body 36 and an RFIDT 37 therein with an antenna 38 that encircles the body 36 and an integrated circuit 39. In one aspect a recess 20a in a body for receiving a torus 35 has an upper lip 20b (or inwardly inclined edge or edges as shown in FIG. 2D) and the body 36 is made of resilient material which is sufficiently flexible that the torus 35 may be pushed into the recess 20a and releasably held therein without adhesives and without a cap ring, although it is within the scope of the present invention to use adhesive and/or a cap ring with a torus 35.

FIG. 2E shows a torus 40 according to the present invention with a body 40a which is insertable into a recess (like the recess 20, the recess 20a, or any recess disclosed herein) which has one or more elements 41 therein which serve as strengthening members and/or as members which provide a unique sensible signature for the torus 40 and, therefore, for any pipe or other item employing a torus 40. The torus 40 has a central opening 40b and may, according to the present invention, also include one, two or more RFIDT's (not shown).

FIGS. 2F and 2G show a torus 44 according to the present invention insertable into any recess disclosed herein which has a body 45, a central opening 44a, and a series of voids 46a, 46b, and 46c. With such a torus 44 made of metal, the voids 46a-46c can be sensed by any sensing apparatus or method disclosed herein and provide a unique sensible signature for the torus 44 and for any item employing such a torus 44. Any torus described herein may have such a series of voids and any such series of voids may, according to the present invention, contain any desired number (one or more) of voids of any desired dimensions. In one particular aspect, a series of voids provides a barcode which is readable by suitable known barcode reading devices. A torus 44 can be used with or without a cap ring. As desired, as is true of any torus according to the present invention, one, two, or more RFIDT's may be used within or on the torus body. Voids may be made by machining, by drilling, by etching, by laser etching, by hardfacing or using a photovoltaic process.

FIG. 2H shows a torus 47 according to the present invention useful in any recess of any embodiment herein which has a series of sensible ridges 48a-48f which can be made by adding material to a torus body 49 (such a torus may have visually readable indicia, e.g. alpha ((letter)) and/or numeric characters). Any torus, ring, or cap ring herein may have one or more such ridges and the ridges can have different cross-sections (e.g. as in FIG. 2H) or similar cross-sections and they can be any suitable material, including, but not limited to metal, plastic, epoxy, carbides, and hardfacing. Also, according to the present invention, a cap ring with one or more RFIDT's and/or any other sensible material and/or indicia disclosed herein may be placed around and secured to a tubular's pin end or box end without using a recess.

FIG. 2M shows a cap ring 22a, like the cap ring 22, but with sensible indicia 22b-22f made therein or thereon for sensing by an optical sensing system, an ultrasonic sensing system, an eddy current sensing system, a barcode sensing system, or a microwave sensing system. A cap ring 22a may be releasably or permanently installed in or over a recess like any recess disclosed herein. The indicia 22b-22f may be like any of the indicia or sensible structures disclosed herein.

FIGS. 2I and 2J show a specific cap ring 50 according to the present invention for use with drill pipe having a pin end. The ring 50 has a body with an outer diameter 50a of 98 mm, a thickness 50b of 5 mm, and a wall thickness 50c of 5 mm. FIGS. 2K and 2L show a specific cap ring 51 according to the present invention for use with a drill pipe pin end having an end portion diameter of about four inches. The ring 51 has an outer diameter 51a of 98 mm, a thickness 51b of 8 to 10 mm, and a wall thickness 51c of 3 mm.

Figure 3A:
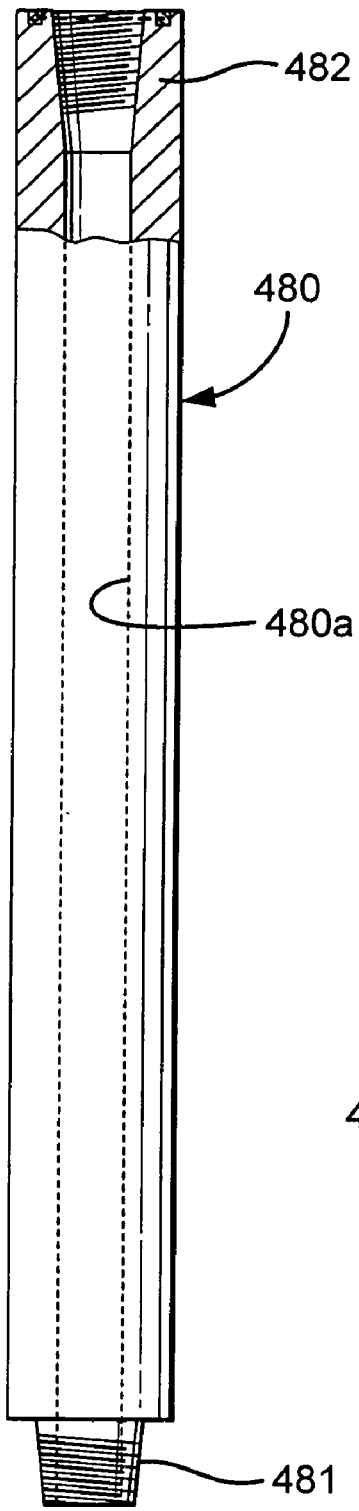
FIG. 3A is a side view, partially in cross-section, of a tubular according to the present invention.
Figure 3B:
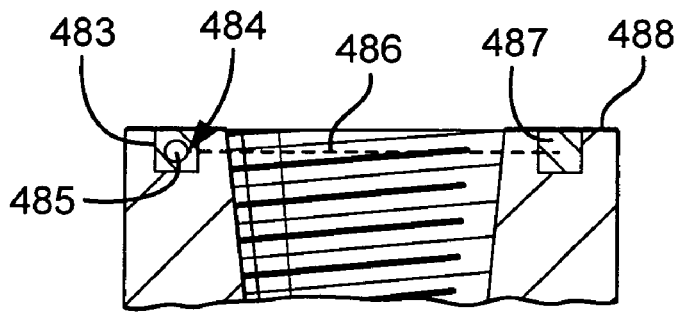
FIG. 3B is an enlarged view of a box end of the tubular of FIG. 3A.
Figure 3C:
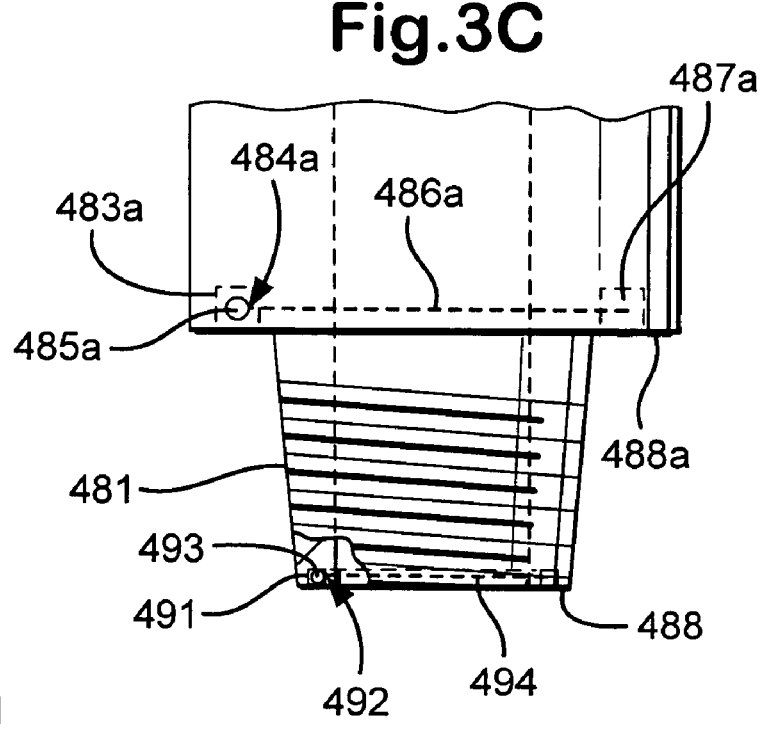
FIG. 3C is an enlarged view of a pin end of the tubular of FIG. 3A.

It is within the scope of the present invention to provide a tubular having a box end and a pin end (each threaded or not) (e.g. casing, riser, pipe, drill pipe, drill collar, tubing), each end with an RFIDT in a recess therein (as any recess described herein) with or without a cap ring (as any described herein). FIGS. 3A-3C show a generally cylindrical hollow tubular member 480 according to the present invention with a flow channel 480a therethrough from top to bottom and which has a threaded pin end 481 and a threaded box end 482. The threaded box end 482 has a circumferential recess 483 with an RFIDT 484 therein. The RFIDT has an IC 485 and an antenna 486 which encircles the box end. Optionally, filler material 487 in the recess 483 encases and protects the IC 485 and the antenna 486; and an optional circular cap ring 488 closes off the recess. The RFIDT and its parts and the cap ring may be as any disclosed or referred to herein. Optionally, the tubular member 480 may have a shoulder recess 483a with an RFIDT 484a with an IC 485a and an antenna 486a. Filler material 487a (optional) encases the RFIDT 484a and, optionally, a cap ring 488a closes off the recess.

The pin end 481 has a circumferential recess 491 in which is disposed an RFIDT 492 with an IC 493 and an antenna 494 around the pin end. As with the box end, filler material and/or a cap ring may be used with the recess 491. Antenna size is related to how easy it is to energize an IC and, therefore, the larger the antenna, the easier [less power needed and/or able to energize at a greater distance] to energize: and, due to the relatively large circumference of some tubulars, energizing end antennas is facilitated.

Figure 4C:
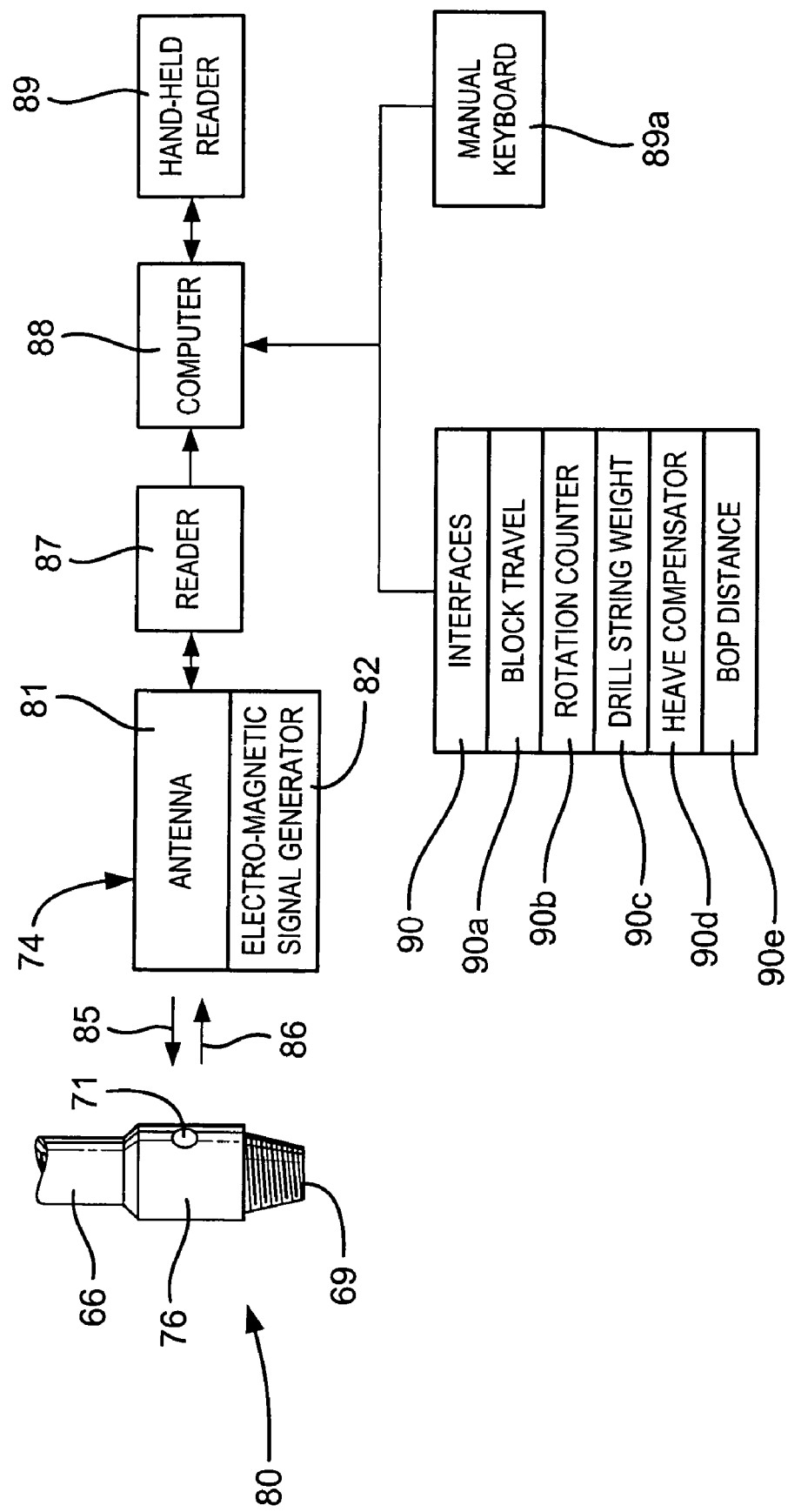
FIG. 4C is a schematic view of the system of FIG. 4A.

FIG. 4A shows a system 70 according to the present invention with a rig 60 according to the present invention which has in a rig floor 61 a reading system 65 (shown schematically) for reading one or more RFIDT's in a drill pipe 66 which is to be used in drilling a wellbore. The reading system 65 incorporates one or more known reading apparatuses for reading RFIDT's, including, but not limited to suitable readers as disclosed in the prior art and readers as commercially available from MBBS Co. of Switzerland. The present invention provides improvements of the apparatuses and systems disclosed in U.S. patent application Ser. No. 09/906,957 filed Jul. 16, 2001 and published on Feb. 7, 2002 as Publication No. 2002/0014966. In an improved system 70 according to the present invention a drill pipe 66 (FIG. 4B) is like the drill pipes 16 in U.S. patent application Ser. No. 09/906,957, but the drill pipe 66 has a recess 67 with a torus 68 therein having at least one RFIDT 69 (shown schematically in FIG. 4B) and a cap ring 68a over the torus 68. The drill pipe 66 may be connected with a tool joint 76 to other similar pieces of drill pipe in a drill string 77 (see FIG. 4A) as in U.S. patent application Ser. No. 09/906,957 (incorporated fully herein) and the systems and apparatuses associated with the system 70 (FIG. 4A and FIG. 4C) operate in a manner similar to that of the systems 10 and the system of FIG. 1B of said patent application.

Drill string 77 includes a plurality of drill pipes 66 coupled by a plurality of tool joints 76 and extends through a rotary table 78, and into a wellbore through a bell nipple 73 mounted on top of a blowout preventer stack 72. An identification tag (e.g. an RFIDT) 71 is provided on one or more drilling components, such as illustrated in FIG. 4A, associated with the system 70, or the drill pipe 66. An electromagnetic signal generator system 74 that includes an antenna and a signal generator is positioned proximate to an identification tag, for example just below rotary table 78 as illustrated in FIG. 4A. Electromagnetic signal generator system 74 establishes a communications link with an identification tag 71 to energize the antenna, interrogate it, and to convey information relating to the equipment or drill pipe.

The drilling system 70 includes the rig 60 with supports 83, a swivel 91, which supports the drill string 77, a kelly joint 92, a kelly drive bushing 93, and a spider 79 with an RFIDT sensor and/or reader 79a. A tool joint 76 is illustrated in FIG. 4A as connecting two drilling components such as drill pipes 66. The identification tag 71 (or the RFIDT 69 read by the system 65) is operated to communicate a response to an incoming electromagnetic signal generated by electromagnetic signal generator system 74 (or by the system 65) that includes information related to the drilling component with the identification tag. The information may be used, for example, to inform an operator of system 70 of a drilling component's identity, age, weaknesses, previous usage or adaptability. According to the teachings of the present invention, this information may be communicated while drill system 70 is in operation. Some or all of the information provided in an identification tag may assist an operator in making a determination of when drilling components need to be replaced, or which drilling components may be used under certain conditions. The electromagnetic signal communicated by an identification tag or RFIDT may provide general inventory management data (such as informing an operator of the drilling components availability on the drilling site, or the drilling component's size, weight, etc.), or any other relevant drilling information associated with the system.

Additional drill string components 84, which are illustrated in FIG. 4A in a racked position, may be coupled to drill pipe 66 and inserted into the well bore, forming a portion of the drill string. One or more of drill string components may also include identification tags or RFIDT's.

FIG. 4C shows typical information that may be included within an identification tag's or RFIDT's, antenna as the antenna cooperates with electromagnetic signal generator 74 and/or the system 65 to transmit an electromagnetic energizing signal 85 to an identification tag 71 (or 69). The electromagnetic signal generators use an antenna to interrogate the RFIDT's for desired information associated with a corresponding pipe or drilling component.

The electromagnetic signal 85 is communicated to an RFIDT that responds to the transmitted electromagnetic signal by returning data or information 86 in an electromagnetic signal form that is received by one of the antennas, and subsequently communicated to a reader 87 which may subsequently process or simply store electromagnetic signal 86. The reader 87 may be handheld, i.e. mobile, or fixed according to particular needs.

The RFIDT's 69 and 71 may be passive (e.g. requiring minimal incident power, for example power density in the approximate range of 15-25 mW/cm$^2$) in order to establish a communications link between an antenna and the RFIDT. "Passive" refers to an identification tag not requiring a battery or any other power source in order to function and to deriving requisite power to transmit an electromagnetic signal from an incoming electromagnetic signal it receives via an antenna. Alternatively, an RFIDT (as may any in any embodiment herein) may include a battery or other suitable power source that would enable an RFIDT to communicate an electromagnetic signal response 86.

Antennas are coupled to reader 87 by any suitable wiring configuration, or alternatively, the two elements may communicate using any other appropriate wireless apparatus and protocol. The reader 87 is coupled to a control system which in one aspect is a computer (or computers) 88 which may include a monitor display and/or printing capabilities for the user. Computer 88 may be optionally coupled to a handheld reader 89 to be used on the rig or remote therefrom. Computer 88 may also be connected to a manual keyboard 89a or similar input device permitting user entry into computer 88 of items such as drill pipe identity, drill string serial numbers, physical information (such as size, drilling component lengths, weight, age, etc.) well bore inclination, depth intervals, number of drill pipes in the drill string, and suspended loads or weights, for example.

The computer 88 may be coupled to a series of interfaces 90 that may include one or more sensors capable of indicating any number of elements associated with drill rig derrick 83, such as: a block travel characteristic 90a, a rotation counter characteristic 90b, a drill string weight 90c, a heave compensator 90d, and a blowout preventer (BOP) distance sensor 90e. A micro-controller may include one or more of these sensors or any other additional information as described in U.S. application Ser. No. 09/906,957. The control system may be or may include a microprocessor based system and/or one or more programmable logic controllers.

A drill pipe 66 with an RFIDT 69 and an RFIDT 71 provides a redundancy feature for identification of the drill pipe 66 so that, in the event one of the RFIDT's fails, the other one which has not failed can still be used to identify the particular drill pipe. This is useful, e.g. when the RFIDT 71, which has relatively more exposure to down hole conditions, fails. Then the RFIDT 69 can still be used to identify the particular piece of drill pipe. It is within the scope of the present invention for any item according to the present invention to have two (or more RFIDT's like the RFIDT 69 and the RFIDT 71, optionally, or in addition to the RFIDT 69, an RFIDT 69a (or RFIDT's 69a) may be affixed exteriorly of the pipe 66 with wrap material 69b (as described below, e.g. as in FIGS. 25-32).

Figure 5A:
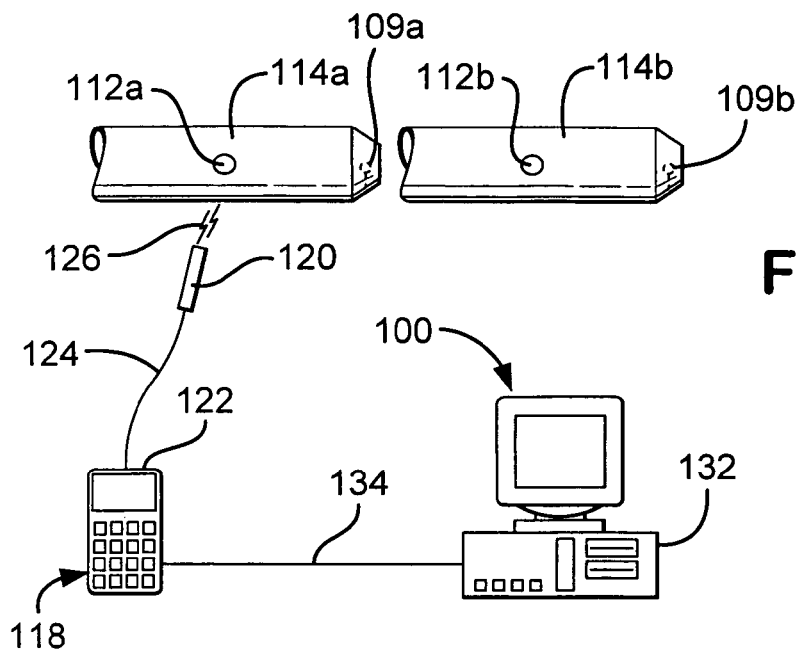
FIGS. 5A, 5C and 5D are schematic views of systems according to the present invention.
Figure 5B:
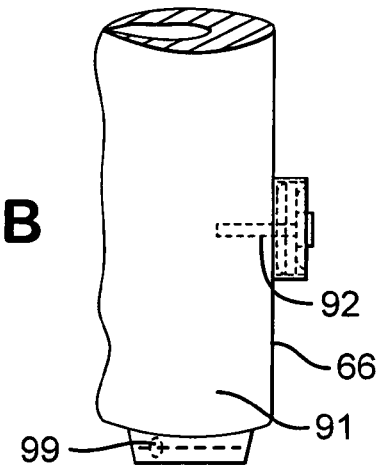
FIG. 5B is a side view of a tubular according to the present invention.

FIGS. 5A-5D present improvements according to the present invention of prior art systems and apparatuses in U.S. Pat. No. 6,480,811 B2 issued Nov. 12, 2002 (incorporated fully herein for all purposes). FIG. 5B shows schematically and partially a drill pipe 91 with an RFIDT 92 (like the identifier assemblies 12, U.S. Pat. No. 6,604,063 B2 or like any RFIDT disclosed herein and with an RFIDT 99, (as any RFIDT disclosed herein in a drill pipe's pin end). According to the present invention any item (e.g. a screen) or any oilfield equipment disclosed in U.S. Pat. No. 6,604,063 B2 may have one, two (or more) RFIDT's (e.g., on the item; or one in an end, one in a side, e.g. as shown in FIG. 5B).

Figure 5C:
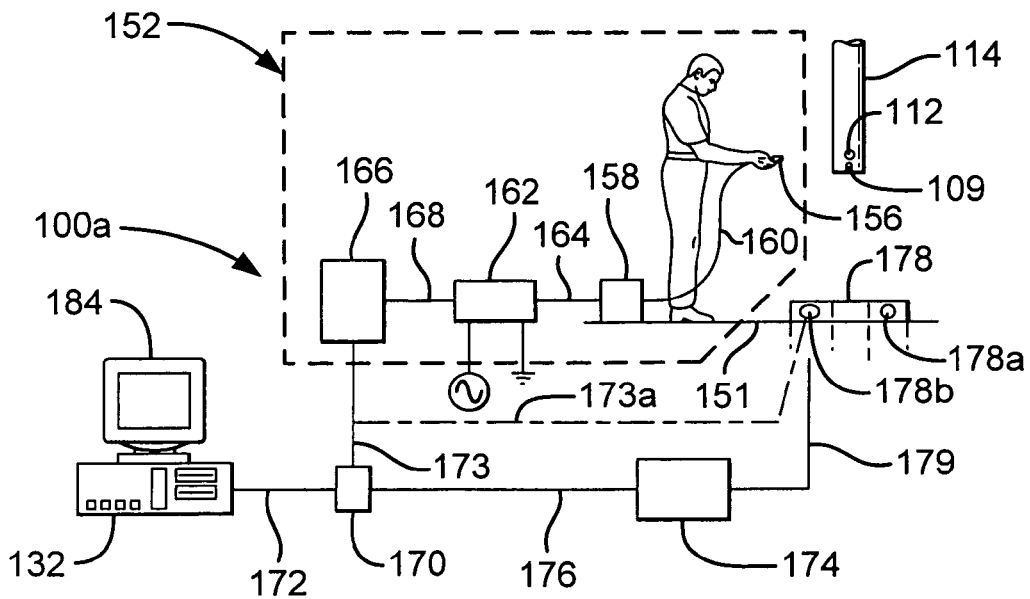
Figure 5D:
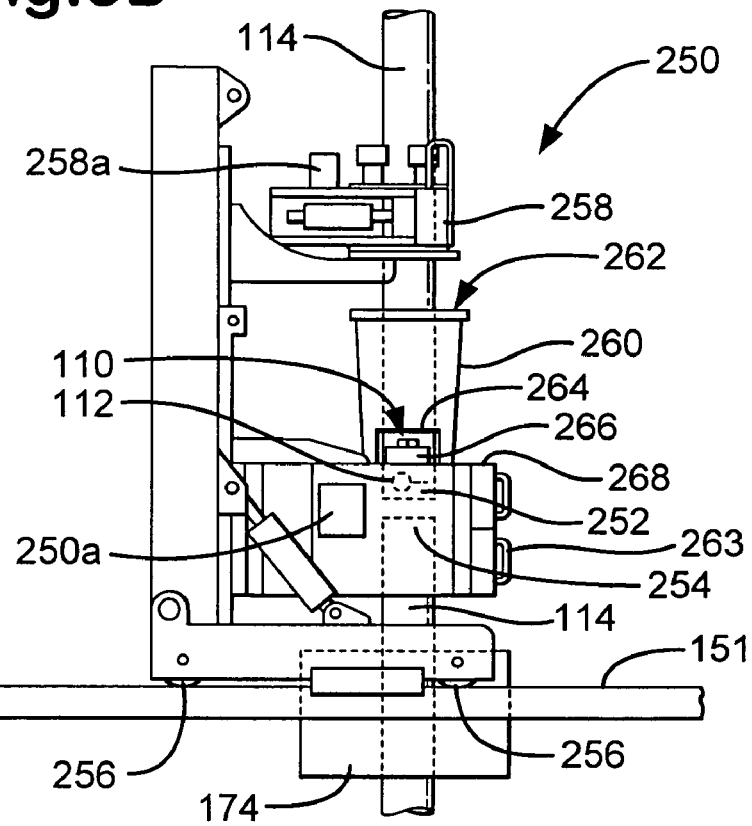

FIGS. 5A, 5C and 5D show an oilfield equipment identifying apparatus 100 according to the present invention for use with pipe or equipment as in FIG. 5B with two (or more) RFIDT's on respective pieces 114 of oilfield equipment. The RFIDT's may be any disclosed or referred to herein and those not mounted in a recess according to the present invention may be as disclosed in U.S. Pat. No. 6,480,811 B2 indicated by the reference numerals 112a and 112b on pieces of equipment 114a and 114b with RFIDT's in recesses according to the present invention shown schematically and indicated by reference numerals 109a, 109b; and/or one or more RFIDT's may be affixed exteriorly (see e.g., FIGS. 25, 26) to either piece 114 of oilfield equipment. Each of the identifier assemblies 112 and RFIDT's like 109a, 109b are capable of transmitting a unique identification code for each piece of pipe or oilfield equipment. The piece of equipment 114 may be a screen or shaker.

The oilfield equipment identifying apparatus 100 with a reader 118 is capable of reading each of the identifier assemblies and RFIDT's. The reader 118 includes a hand-held wand 120, which communicates with a portable computer 122 via a signal path 124. In one embodiment, each identifier assembly 112 includes a passive circuit as described in detail in U.S. Pat. No. 5,142,128 (fully incorporated herein for all purposes) and the reader 118 can be constructed and operated in a manner as set forth in said patent or may be any other reader or reader system disclosed or referred to herein.

In use, the wand 120 of the reader 118 is positioned near a particular one of the identifier assemblies 112 or RFIDT's. A unique identification code is transmitted from the identifier assembly or RFIDT to the wand 120 via a signal path 126 which can be an airwave communication system. Upon receipt of the unique identification code, the wand 120 transmits the unique identification code to the portable computer 122 via the signal path 124. The portable computer 122 receives the unique identification code transmitted by the wand 120 and then decodes the unique identification code, identifying a particular one of the identifier assemblies 112 or RFIDT's and then transmitting (optionally in real time or in batch mode) the code to a central computer (or computers) 132 via a signal path 134. The signal path 134 can be a cable or airwave transmission system.

FIG. 5C shows an embodiment of an oilfield equipment identifying apparatus 100a according to the present invention which includes a plurality of the identifier assemblies 112 and/or RFIDT's 109 which are mounted on respective pieces 114 of pipe or oilfield equipment as described above. The oilfield equipment identifying apparatus includes a reader 152, which communicates with the central computer 132. The central computer 132 contains an oilfield equipment database (which in certain aspects, can function as the oilfield equipment database set forth in U.S. Pat. No. 5,142,128). In one aspect the oilfield equipment database in the central computer 132 may function as described in U.S. Pat. No. 5,142,128. In one aspect the oilfield equipment identifying apparatus 100a is utilized in reading the identifier assemblies 112 (and/or RFIDT's 109) on various pieces 114 of pipe or oilfield equipment located on a rig floor 151 of an oil drilling rig.

The reader 152 includes a hand-held wand 156 (but a fixed reader apparatus may be used). The hand-held wand 156 is constructed in a similar manner as the hand-held wand 120 described above. The wand 156 may be manually operable and individually mobile. The hand-held wand 156 is attached to a storage box 158 via a signal path 160, which may be a cable having a desired length. Storage box 158 is positioned on the rig floor 151 and serves as a receptacle to receive the hand-held wand 156 and the signal path 160 when the hand-held wand 156 is not in use.

An electronic conversion package 162 communicates with a connector on the storage box 158 via signal path 164, which may be an airway or a cable communication system so that the electronic conversion package 162 receives the signals indicative of the identification code stored in the identifier assemblies 112 and/or RFIDT's, which are read by the hand-held wand 156. In response to receiving such signal, the electronic conversion package 162 converts the signal into a format which can be communicated an appreciable distance therefrom. The converted signal is then output by the electronic conversion package 162 to a buss 166 via a signal path 168. The buss 166, which is connected to a drilling rig local area network and/or a programmable logic controller (not shown) in a well-known manner, receives the converted signal output by the electronic conversion package 162.

The central computer 132 includes an interface unit 170. The interface 170 communicates with the central computer 132 via a signal path 172 or other serial device, or a parallel port. The interface unit 170 may also communicates with the buss 166 via a signal path 173. The interface unit 170 receives the signal, which is indicative of the unique identification codes and/or information read by the hand-held wand 156, from the buss 166, and a signal from a drilling monitoring device 174 via a signal path 176. The drilling monitoring device 174 communicates with at least a portion of a drilling device 178 (FIG. 5D) via a signal path 179. The drilling device 178 can be supported by the rig floor 151, or by the drilling rig. The drilling device 178 can be any drilling device which is utilized to turn pieces 114 of oilfield equipment, such as drill pipe, casing (in casing drilling operations) or a drill bit to drill a well bore. For example, but not by way of limitation, the drilling device 178 can be a rotary table supported by the rig floor 151, or a top mounted drive ("top drive") supported by the drilling rig, or a downhole mud motor suspended by the drill string and supported by the drilling rig. Optionally, the drilling device 178 has at least one RFIDT 178a therein or thereon and an RFIDT reader 178b therein or thereon. The RFIDT reader 178a is interconnected with the other systems as is the reader 152, e.g. via the signal path 173 as indicated by the dotted line 173a.

The drilling monitoring device 174 monitors the drilling device 178 so as to determine when the piece 114 or pieces 114 of oilfield equipment in the drill string are in a rotating condition or a non-rotating condition. The drilling monitoring device 174 outputs a signal to the interface unit 170 via the signal path 176, the signal being indicative of whether the piece(s) 114 of oilfield equipment are in the rotating or the non-rotating condition. The central computer 132 may be loaded with a pipe and identification program in its oilfield equipment database which receives and automatically utilizes the signal received by the interface unit 170 from the signal path 176 to monitor, on an individualized basis, the rotating and non-rotating hours of each piece 114 of oilfield equipment in the drill string.

For example, when the drilling device 178 is a downhole mud motor (which selectively rotates the drill string's drill bit while the drill string's pipe remains stationary), the central computer 132 logs the non-rotating usage of each piece 114 of the drill string's pipe. In the case where the drilling device 178 is the downhole mud motor, the central computer 132 has stored therein a reference indicating that the drilling device 178 is the downhole mud motor so that the central computer 132 accurately logs the non-rotating usage of each piece 114 of oilfield equipment included in the drill string that suspends the drilling device 178.

FIG. 5D shows a system 250 according to the present invention for rotating pieces of drill pipe 114 which have at least one identifier assembly 112 and/or one RFIDT in a pin end (or box end, or both) recess according to the present invention to connect a pin connection 252 of the piece 114 to a box connection 254 of an adjacently disposed piece 114 in a well known manner. Each piece 114 may have an RFIDT in its pin end and/or box end. The system 250 includes a reader system 250a (shown schematically) for reading the RFIDT in the pin end recess prior to makeup of a joint. The apparatus 250 can be, for example, but not by way of limitation, an Iron Roughneck, an ST-80 Iron Roughneck, or an AR 5000 Automated Iron Roughneck from Varco International and/or apparatus as disclosed in U.S. Pat. Nos. 4,603,464; 4,348,920; and 4,765,401. The reader system 250a may be located at any appropriate location on or in the apparatus 250.

The apparatus 250 is supported on wheels 256 which engage tracks (not shown) positioned on the rig floor 151 for moving the apparatus 250 towards and away from the well bore. Formed on an upper end of the apparatus 250 is a pipe spinner assembly 258 (or tong or rotating device) for selectively engaging and turning the piece 114 to connect the pin connection 252 to the box connection 254. Optionally the assembly 258 has an RFIDT reader 258a. An optional funnel-shaped mudguard 260 can be disposed below the pipe spinner assembly 258. The mudguard 260 defines a mudguard bore 262, which is sized and adapted so as to receive the piece 114 of oilfield equipment therethrough. The apparatus 250 also may include a tong or a torque assembly or torque wrench 263 disposed below the pipe spinner assembly 258. An opening 264 is formed through the mudguard 260 and communicates with a mudguard bore 262. Optionally an oilfield equipment identifying apparatus 110 includes a fixed mount reader 266 for automating the reading of the RFIDT's and of the identifier assemblies 112, rather than the hand-held wand 156. In one embodiment a flange 268 is located substantially adjacent to the opening 264 so as to position the fixed mount reader 266 through the opening 264 whereby the fixed mount reader 266 is located adjacent to the piece 114 of oilfield equipment when the piece 114 of oilfield equipment is moved and is being spun by the pipe spinner assembly 258. The reader(s) of the apparatus 250 are interconnected with an in communication with suitable control apparatus, e.g. as any disclosed herein. In certain aspects, the fixed mount reader 266 can be located on the apparatus 250 below the pipe spinner assembly 258 and above the torque assembly or torque wrench 263, or within or on the spinner assembly 258; or within or on the torque wrench 263.

Figure 6:
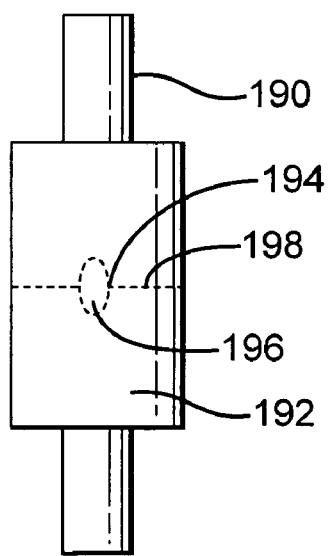
FIG. 6 is a side view of a tubular according to the present invention.

The prior art discloses a variety of tubular members including, but not limited to casing, pipe, risers, and tubing, around which are emplaced a variety of encompassing items, e.g., but not limited to centralizers, stabilizers, and buoyant members. According to the present invention these items are provided with one or more RFIDT's with antenna(s) within and encircling the item and with a body or relatively massive part thereof protecting the RFIDT. FIG. 6 shows schematically a tubular member 190 with an encompassing item 192 having therein an RFIDT 194 (like any disclosed or referred to herein as may be the case for all RFIDT's mentioned herein) with an IC (integrated circuit) or microchip 196 to which is attached an antenna 198 which encircles the tubular member 190 (which is generally cylindrical and hollow with a flow channel therethrough from one end to the other or which is solid) and with which the IC 196 can be energized for reading and/or for writing thereto. In one aspect the RFIDT 194 is located midway between exterior and interior surfaces of the encompassing item 192; while in other aspects it is nearer to one or these surfaces than the other. The encompassing item may be made of any material mentioned or referred to herein. The RFIDT 194 is shown midway between a top and a bottom (as viewed in FIG. 6) of the encompassing item 192; but it is within the scope of this invention to locate the RFIDT at any desired level of the encompassing item 192. Although the encompassing item 192 is shown with generally uniform dimensions, it is within the scope of the present invention for the encompassing item to have one or more portions thicker than others; and, in one particular aspect, the RFIDT (or the IC 196 or the antenna 198) is located in the thicker portion(s). In certain particular aspects the encompassing item is a centralizer, stabilizer, or protector. Optionally, or in addition to the RFIDT 194, one or more RFIDT's 194a in wrap material 194b may be affixed exteriorly (see e.g., FIGS. 25, 26) of the member 190 and/or of the encompassing item 192.

Figure 7A:
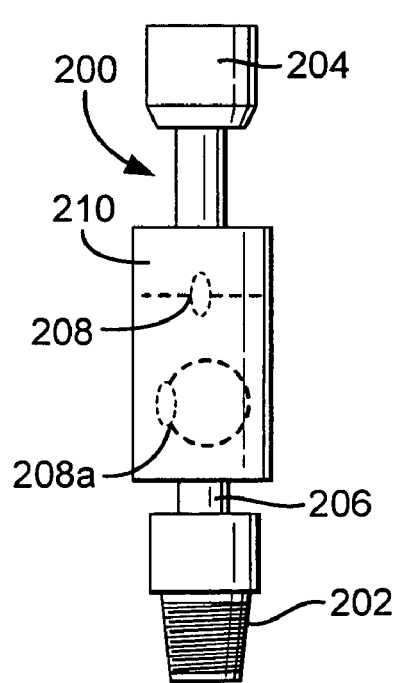
FIG. 7A is a side view of a tubular according to the present invention.
Figure 7B:
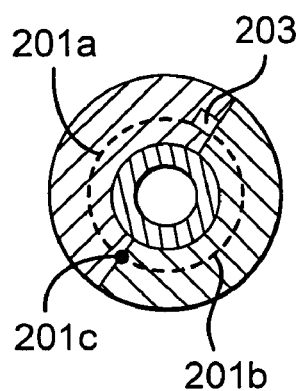
FIG. 7B is a cross-section view of the tubular of FIG. 7B.

FIG. 7A shows a buoyant drill pipe 200 which is similar to such pipes as disclosed in U.S. Pat. No. 6,443,244 (incorporated fully herein for all purposes), but which, as shown in FIG. 7A, has improvements according to the present invention. The drill pipe 200 has a pin end 202 and a box end 204 at ends of a hollow tubular body 206 having a flow channel (not shown) therethrough. A buoyant element 210 encompasses the tubular body 206. Within the buoyant element 210 is at least one RFIDT 208 which may be like and be located as the RFIDT 198, FIG. 6. As shown in FIG. 7B, in one aspect the buoyant member 210 has two halves which are emplaced around the tubular body 206 and then secured together. In such an embodiment either one or both ends of an antenna 201 are releasably connectible to an IC 203 of an RFIDT 208 or two parts of the antenna 201 itself are releasably connectible. As shown in FIG. 7B, antenna parts 201a and 201b are releasably connected together, e.g. with connector apparatus 201c, and an end of the antenna part 201b is releasably connected to the IC 203. Alternatively an optional location provides an RFIDT that is entirely within one half of the buoyant member 210, e.g. like the optional RFIDT 208a shown in FIG. 7A. The pin end 202 may have any RFIDT therein and/or cap ring according to the present invention as disclosed herein. The two halves of the buoyant member may be held together by adhesive, any known suitable locking mechanism, or any known suitable latch mechanism (as may be any two part ring or item herein according to the present invention).

It is within the scope of the present invention to provide a stabilizer as is used in oil and gas wellbore operations with one or more RFIDT's. FIGS. 8A and 8B show a stabilizer 220 according to the present invention which is like the stabilizers disclosed in U.S. Pat. No. 4,384,626 (incorporated fully herein for all purposes) but which has improvements according to the present invention. An RFIDT 222 (like any disclosed or referred to herein) is embedded within a stabilizer body 224 with an IC 223 in a relatively thicker portion 221 of the body 224 and an antenna 225 that is within and encircles part of the body 224. Parts 225a and 225b of the antenna 225 are connected together with a connector 226. The stabilizer 220 may, optionally, have a recess at either end with an RFIDT therein as described herein according to the present invention. Optionally, the stabilizer 220 may have one or more RFIDT's located as are the RFIDT's in FIGS. 6 and 7A.

Various stabilizers have a tubular body that is interposed between other tubular members, a body which is not clamped on around an existing tubular members. According to the present invention such stabilizers may have one or more RFIDT's as disclosed herein; and, in certain aspects, have an RFIDT located as are the RFIDT's in FIGS. 6, 7A or 8A and/or an RFIDT in an end recess (e.g. pin end and/or box end) as described herein according to the present invention. FIGS. 8C and 8D show a stabilizer 230 according to the present invention which has a tubular body 231 and a plurality of rollers 232 rotatably mounted to the body 231 (as in the stabilizer of U.S. Pat. No. 4,071,285, incorporated fully herein, and of which the stabilizer 230 is an improvement according to the present invention). An RFIDT 233 with an IC 234 and an antenna 235 is disposed within one or the rollers 232. The stabilizer 230 has a pin end 236 and a box end 237 which permit it to be threadedly connected to tubulars at either of its ends. A recess may, according to the present invention, be provided in the pin end 236 and/or the box end 237 and an RFIDT and/or cap ring used therewith as described herein according to the present invention. The antenna 235 is within and encircles part of the roller 232.

It is within the scope of the present invention to provide a centralizer with one or more RFIDT's as disclosed herein. A centralizer 240, FIG. 8E, is like the centralizers disclosed in U.S. Pat. No. 5,095,981 (incorporated fully herein), but with improvements according to the present invention. FIGS. 8E and 8F show the centralizer 240 on a tubular TR with a hollow body 241 with a plurality of spaced-apart ribs 242 projecting outwardly from the body 241. A plurality of screws 244 releasably secure the body 241 around the tubular TR. An RFIDT 245 with an IC 246 and an antenna 247 is located within the body 241. Optionally a plug 241a (or filler material) seals off a recess 241b in which the IC 246 is located. Optionally, or in addition to the RFIDT 245 one or more RFIDT's 245a are affixed exteriorly of the centralizer 240 under multiple layers of wrap material 245b (see, e.g., FIGS. 25, 26)

FIGS. 8G and 8H show a centralizer 270 according to the present invention which is like centralizers (or stabilizers) disclosed in U.S. Pat. No. 4,984,633 (incorporated fully herein for all purposes), but which has improvements according to the present invention. The centralizer 270 has a hollow tubular body 271 with a plurality of spaced-apart ribs 272 projecting outwardly therefrom. An RFIDT 273 with an IC 274 and an antenna 275 (dotted circular line) is disposed within the body 271 with the IC 274 within one of the ribs 272 and the antenna 275 within and encircling part of the body 271. Optionally, or in addition to the RFIDT 273, one or more RFIDT's 273a is affixed exteriorly to the centralizer 270 under layers of wrap material 273b (see, e.g. FIGS. 25, 26).

Figure 9A:
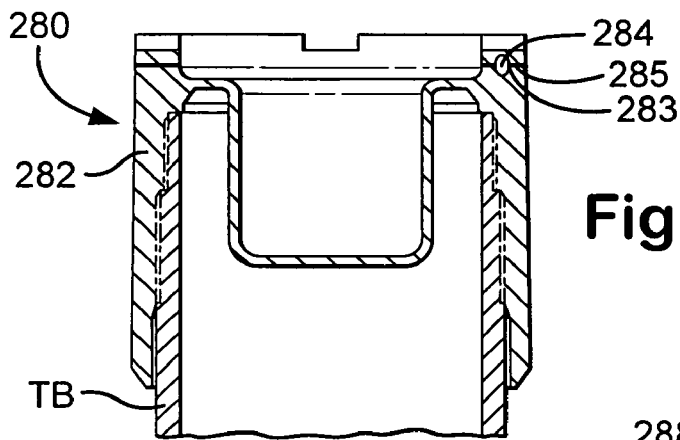
FIGS. 9A, 9B, and 10A are side cross-section views of thread protectors according to the present invention.
Figure 9B:
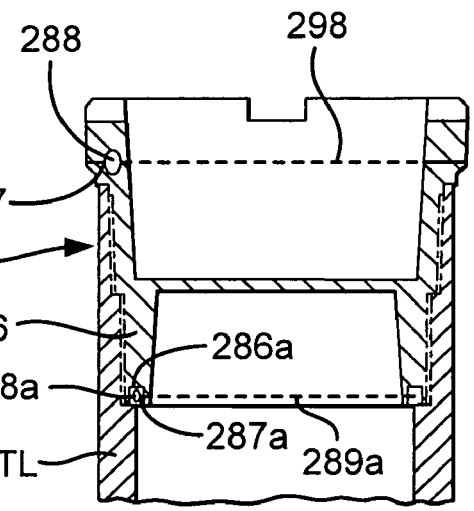
Figure 10A:
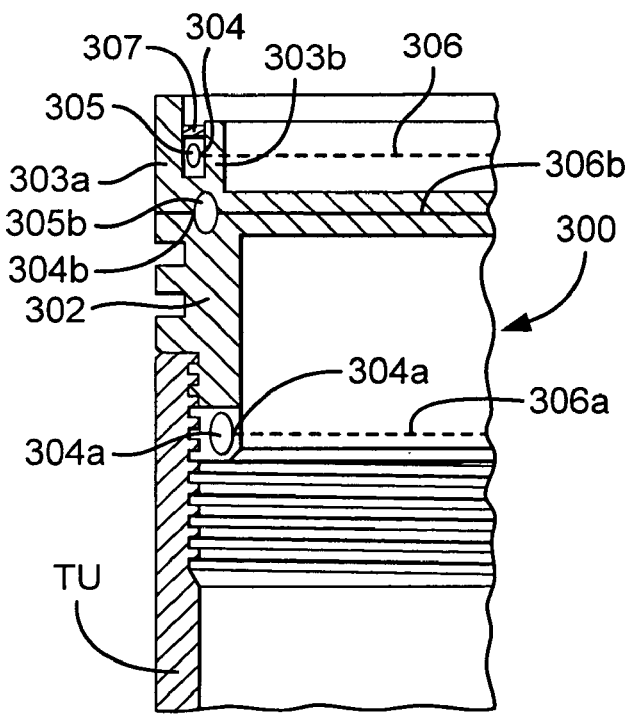
Figure 11:
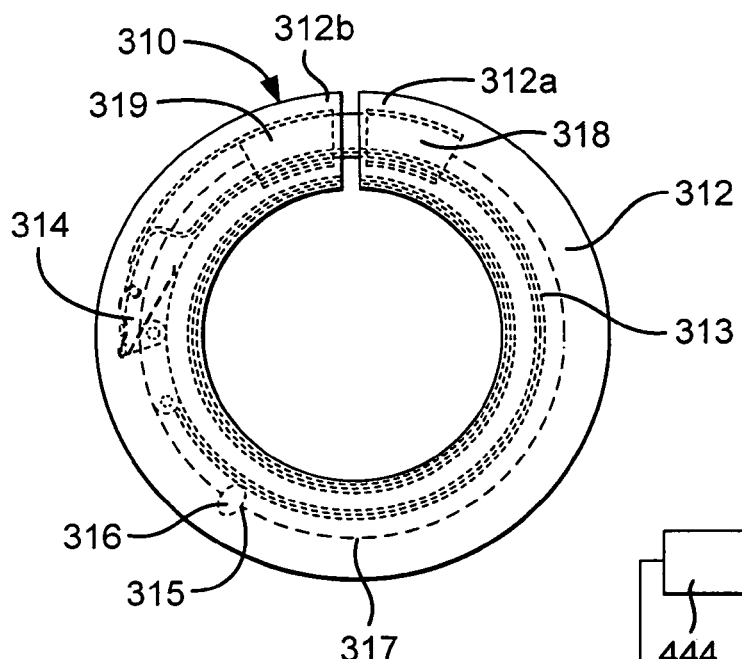
FIG. 11 is a cross-section view of a thread protector according to the present invention.

Often thread protectors are used at the threaded ends of tubular members to prevent damage to the threads. It is within the scope of the present invention to provide a thread protector, either a threaded thread protector or a non-threaded thread protector, with one or more RFIDT's as disclosed herein. FIGS. 9A, 10A, and 11 show examples of such thread protectors.

FIGS. 9A and 9B and 10A and 10B show thread protectors like those disclosed in U.S. Pat. No. 6,367,508 (incorporated fully herein), but with improvements according to the present invention.

A thread protector 280, FIG. 9A, according to the present invention protecting threads of a pin end of a tubular TB has an RFIDT 283 within a body 282. The RFIDT 283 has an IC 284 and an antenna 285. A thread protector 281, FIG. 9B, according to the present invention protecting threads of a box end of a tubular TL has a body 286 and an RFIDT 287 with an IC 288 and an antenna 298 within the body 286. Both the bodies 282 and 286 are generally cylindrical and both antennas 285 and 298 encircle a part of their respective bodies. Optionally the thread protector 281 has an RFIDT 287a within a recess 286a of the body 286. The RFIDT 287a has an IC 288a and an antenna 289a. Optionally, any thread protector herein may be provided with a recess according to the present invention as described herein with an RFIDT and/or torus and/or cap ring according to the present invention (as may any item according to the present invention as in FIGS. 6-8G). Optionally, or in addition to the RFIDT 283, one or more RFIDT's 283a is affixed exteriorly (see, e.g., FIGS. 25, 26) to the thread protector 280 under layers of wrap material 283b.

Figure 10B:
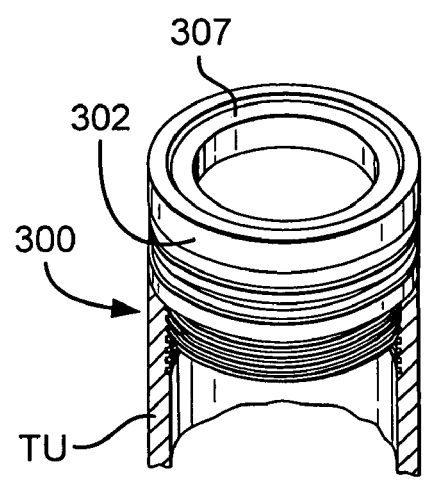
FIG. 10B is a perspective view of a thread protector according to the present invention.

FIGS. 10A and 10B show a thread protector 300 according to the present invention which is like thread protectors disclosed in U.S. Pat. No. 6,367,508 B1 (incorporated fully herein), but with improvements according to the present invention. The thread protector 300 for protecting a box end of a tubular TU has a body 302 with upper opposed spaced-apart sidewalls 303a, 303b. An RFIDT 304 with an IC 305 and an antenna 306 is disposed between portions of the two sidewalls 303a, 303b. Optionally, an amount of filler material 307 (or a cap ring as described above) is placed over the RFIDT 304. Optionally, or as an alternative, an RFIDT 304a is provided within the body 302 with an IC 305a and an antenna 306a. Optionally, or as an alternative, an RFIDT 304b is provided within the body 302 with an IC 305b and an antenna 306b.

A variety or prior art thread protectors have a strap or tightening apparatus which permits them to be selectively secured over threads of a tubular. FIG. 11 shows a thread protector 310 according to the present invention which is like the thread protectors disclosed in U.S. Pat. No. 5,148,835 (incorporated fully herein), but with improvements according to the present invention. The thread protector 310 has a body 312 with two ends 312a and 312b. A strap apparatus 313 with a selectively lockable closure mechanism 314 permits the thread protector 310 to be installed on threads of a tubular member. An RFIDT 315 with an IC 316 and an antenna 317 is disposed within the body 312. The antenna 317 may be connected or secured to, or part of, the strap apparatus 313 and activation of the lockable closure mechanism 314 may complete a circuit through the antenna. In one aspect the antenna has ends connected to metallic parts 318, 319 and the antenna is operational when these parts are in contact. The bodies of any thread protector according to the present invention may be made of any material referred to herein, including, but not limited to, any metal or plastic referred to herein or in the patents incorporated by reference herein.

Figure 12B:
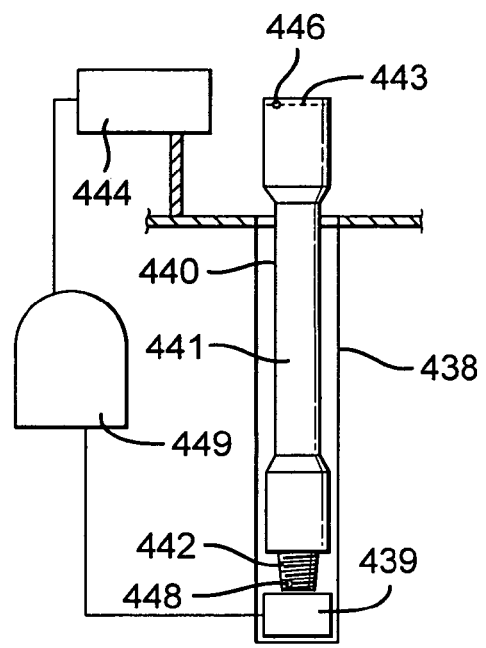
FIG. 12B is an enlarged view of part of the system of FIG. 12A.
Figure 12A:
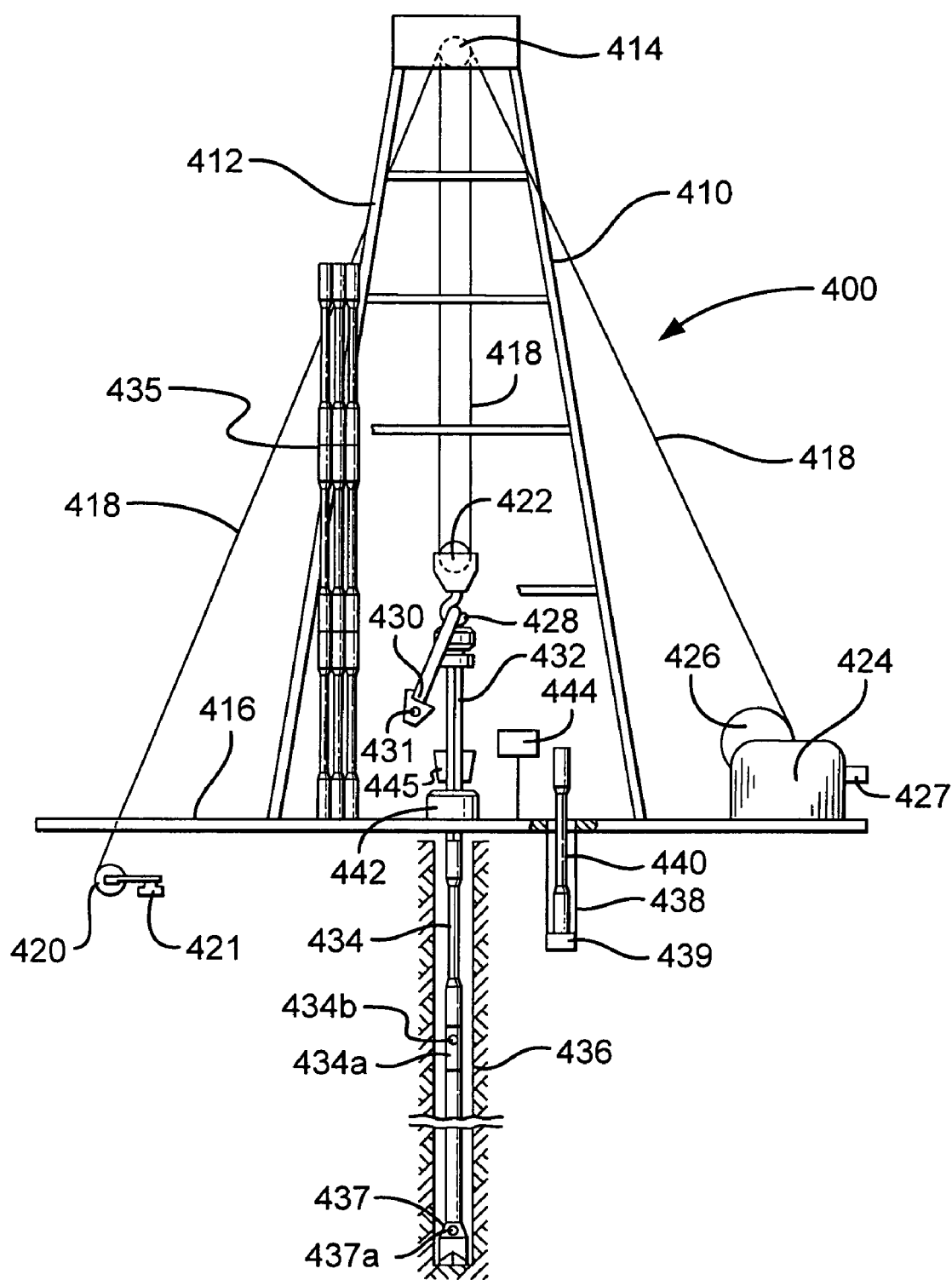
FIG. 12A is a schematic side view of a drilling rig system according to the present invention.

FIG. 12A shows a system 400 according to the present invention which has a rig 410 that includes a vertical derrick or mast 412 having a crown block 414 at its upper end and a horizontal rig floor 416 at its lower end. Drill line 418 is fixed to deadline anchor 420, which is commonly provided with hook load sensor 421, and extends upwardly to crown block 414 having a plurality of sheaves (not shown). From block 414, drill line 418 extends downwardly to traveling block 422 that similarly includes a plurality of sheaves (not shown). Drill line 418 extends back and forth between the sheaves of crown block 414 and the sheaves of traveling block 422, then extends downwardly from crown block 414 to drawworks 424 having rotating drum 426 upon which drill line 418 is wrapped in layers. The rotation of drum 426 causes drill line 418 to be taken in or out, which raises or lowers traveling block 422 as required. Drawworks 424 may be provided with a sensor 427 which monitors the rotation of drum 426. Alternatively, sensor 427 may be located in crown block 414 to monitor the rotation of one or more of the sheaves therein. Hook 428 and any elevator 430 is attached to traveling block 422. Hook 428 is used to attach kelly 432 to traveling block 422 during drilling operations, and elevators 430 are used to attach drill string 434 to traveling block 422 during tripping operations. Shown schematically the elevator 430 has an RFIDT reader 431 (which may be any reader disclosed or referred to herein and which is interconnected with and in communication with suitable control apparatus, e.g. as any disclosed herein, as is the case for reader 439 and a reader 444). Drill string 434 is made up of a plurality of individual drill pipe pieces, a grouping of which are typically stored within mast 412 as joints 435 (singles, doubles, or triples) in a pipe rack. Drill string 434 extends down into wellbore 436 and terminates at its lower end with bottom hole assembly (BHA) 437 that typically includes a drill bit, several heavy drilling collars, and instrumentation devices commonly referred to as measurement-while-drilling (MWD) or logging-while-drilling (LWD) tools. A mouse hole 438, which may have a spring at the bottom thereof, extends through and below rig floor 416 and serves the purpose of storing next pipe 440 to be attached to the drill string 434. With drill pipe according to the present invention having an RFIDT 448 in a pin end 442, an RFIDT reader apparatus 439 at the bottom of the mouse hole 438 can energize an antenna of the RFIDT 448 and identify the drill pipe 440. Optionally, if the drill pipe 440 has an RFIDT in a box end 443, an RFIDT reader apparatus can energize an antenna in the RFIDT 446 and identify the drill pipe 440. Optionally, the drill bit 437 has at least one RFIDT 437a (any disclosed herein) (shown schematically). Optionally, or in addition to the RFIDT 448, the drill pipe 440 has one or more RFIDT's 448a affixed exteriorly to the drill pipe 440 (see, e.g., FIGS. 25, 26) under wrap layers 448b.

During a drilling operation, power rotating means (not shown) rotates a rotary table (not shown) having rotary bushing 442 releasably attached thereto located on rig floor 416. Kelly 432, which passes through rotary bushing 442 and is free to move vertically therein, is rotated by the rotary table and rotates drill string 434 and BHA 437 attached thereto. During the drilling operation, after kelly 432 has reached its lowest point commonly referred to as the "kelly down" position, the new drill pipe 440 in the mouse hole 438 is added to the drill string 434 by reeling in drill line 418 onto rotating drum 426 until traveling block 422 raises kelly 432 and the top portion of drill string 434 above rig floor 416. Slips 445, which may be manual or hydraulic, are placed around the top portion of drill string 434 and into the rotary table such that a slight lowering of traveling block 422 causes slips 445 to be firmly wedged between drill string 434 and the rotary table. At this time, drill string 434 is "in-slips" since its weight is supported thereby as opposed to when the weight is supported by traveling block 422, or "out-of-slips". Once drill string 434 is in-slips, kelly 432 is disconnected from string 434 and moved over to and secured to new pipe 440 in mouse hole 438. New pipe 440 is then hoisted out of mouse hole 438 by raising travelling block 422, and attached to drill string 434. Traveling block 422 is then slightly raised which allows slips 445 to be removed from the rotary table. Traveling block 422 is then lowered and drilling resumed. "Tripping-out" is the process where some or all of drill string 434 is removed from wellbore 436. In a trip-out, kelly 432 is disconnected from drill string 434, set aside, and detached from hook 428. Elevators 430 are then lowered and used to grasp the uppermost pipe of drill string 434 extending above rig floor 416. Drawworks 424 reel in drill line 418 which hoists drill string 434 until the section of drill string 434 (usually a "triple") to be removed is suspended above rig floor 416. String 434 is then placed in-slips, and the section removed and stored in the pipe rack. "Tripping-in" is the process where some or all of drill string 434 is replaced in wellbore 436 and is basically the opposite of tripping out. In some drilling rigs, rotating the drill string is accomplished by a device commonly referred to as a "top drive" (not shown). This device is fixed to hook 428 and replaces kelly 432, rotary bushing 442, and the rotary table. Pipe added to drill string 434 is connected to the bottom of the top drive. As with rotary table drives, additional pipe may either come from mouse hole 438 in singles, or from the pipe racks as singles, doubles, or triples. Optionally, drilling is accomplished with a downhole motor system 434a which has at least one RFIDT 434b (shown schematically in FIG. 12A).

As shown in FIG. 12B, the reader apparatus 439 is in communication with a control apparatus 449 (e.g. any computerized or PLC system referred to or disclosed herein) which selectively controls the reader apparatus 439, receives signals from it and, in certain aspects, processes those signals and transmits them to other computing and/or control apparatus. Similarly when the optional reader apparatus 444 is used, it also is in communication with the control apparatus 449 and is controlled thereby. With a reader at the pin end and a reader at the box end, the length of the piece of drill pipe be determined and/or its passage beyond a certain point. In one aspect the reader apparatus 439 is deleted and the reader apparatus 444 reads the RFIDT (or RFIDT's) in and/or on the drill pipe 440 as the drill pipe 440 passes by the reader apparatus 444 as the drill pipe 440 is either lowered into the mouse hole 438 or raised out of it. The reader apparatus 444 may be located on or underneath the rig floor 416. It is within the scope of the present invention to use a reader apparatus 439 and/or a reader apparatus 444 in association with any system's mouse hole or rat hole (e.g., but not limited to, systems as disclosed in U.S. Pat. Nos. 5,107,705; 4,610,315; and in the prior art cited therein), and with so-called "mouse hole sleeves" and mouse hole scabbards" as disclosed in, e.g. U.S. Pat. Nos. 5,351,767; 4,834,604; and in the prior art references cited in these two patents. With respect to the drilling operation depicted in FIG. 12A (and, any drilling operation referred to herein according to the present invention) the drilling may be "casing drilling" and the drill pipe can be casing.

Figure 13A:
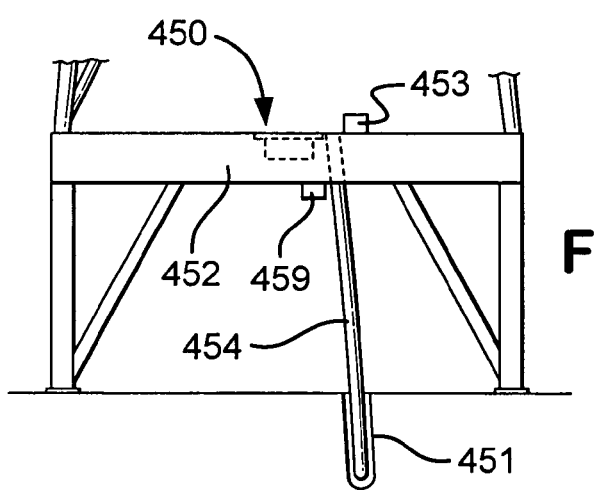
FIG. 13A is a side view of a system according to the present invention.
Figure 13B:
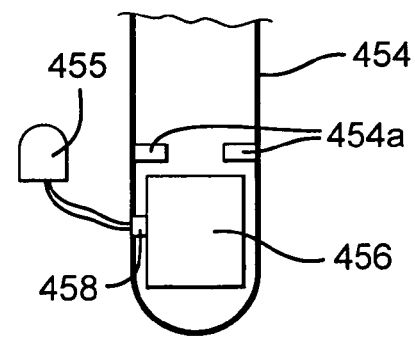
FIG. 13B is a side view of part of the system of FIG. 13A.

FIGS. 13A and 13B show a system 450 according to the present invention which has a mouse hole 451 associated with a rig 452 (shown partially). The mouse hole 451 includes a mouse hole scabbard 454 (shown schematically, e.g. like the one in U.S. Pat. No. 4,834,604, but with improvements according to the present invention). The mouse hole scabbard 454 includes an RFIDT reader apparatus 456 (like any such apparatus described or referred to herein) with connection apparatus 458 via which a line or cable 459 connects the reader apparatus 456 to control apparatus 455 (shown schematically, like any described or referred to herein). It is within the scope of the present invention to provide, optionally, reader apparatuses (E.G. other than adjacent the pipe or adjacent a mouse hole, or tubular preparation hole) 453 and/or 459 on the rig 452. Optionally, one or more antenna energizers are provided on a rig and reader apparatuses are located elsewhere. According to the present invention a scabbard can be made of nonmagnetic metal, plastic, polytetrafluoroethylene, fiberglass or composite to facilitate energizing of an RFIDT's antenna of an RFIDT located within the scabbard. Optionally a scabbard may be tapered to prevent a pipe end from contacting or damaging the reader apparatus 456 and/or, as shown in FIG. 13B, stops 454a may be provided to achieve this.

Figure 14A:
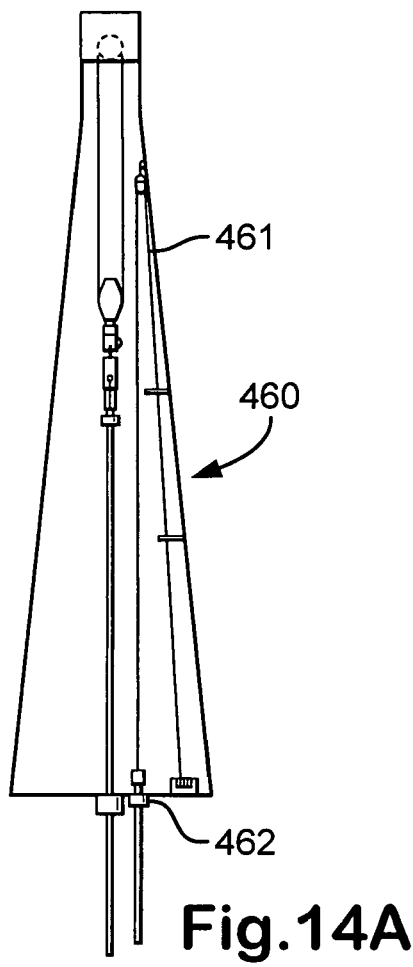
FIG. 14A is a schematic view of a system according to the present invention with a powered mouse hole.
Figure 14B:
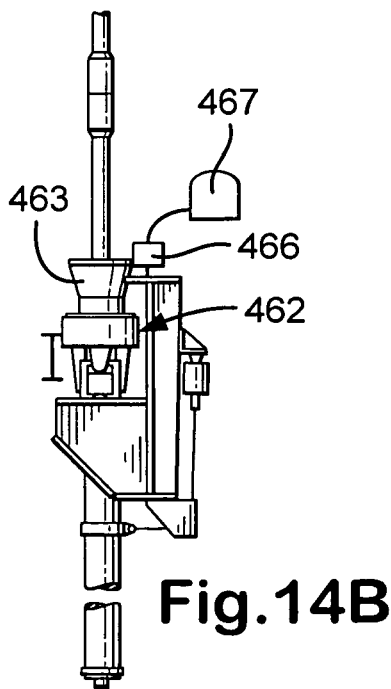
FIG. 14B is a side view of the powered mouse hole of FIG. 14A.
Figure 14C:
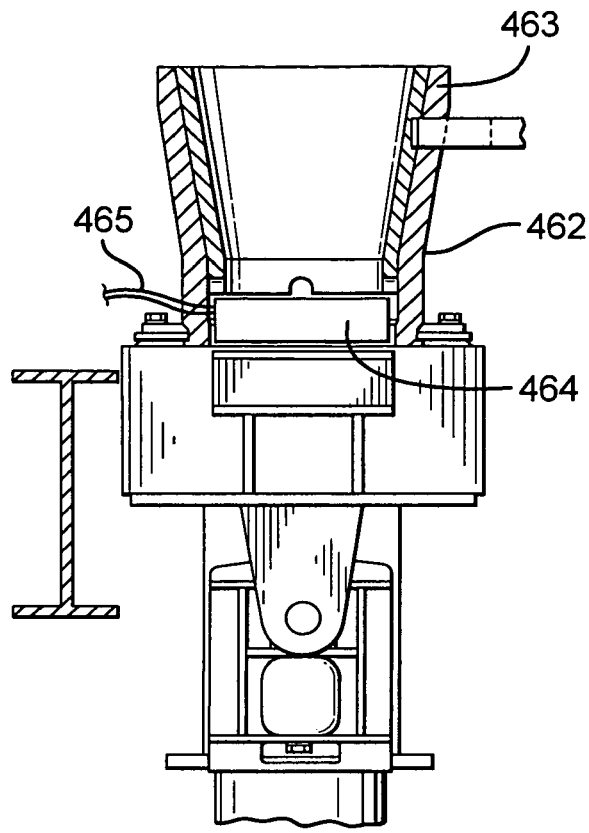
FIG. 14C is a cross-section view of part of the powered mouse hole of FIGS. 14A and B.

Various prior art systems employ apparatuses known as "powered mouse holes" or "rotating mouse hole tools". It is within the scope of the present invention to improve such systems with an RFIDT reader apparatus for identifying a tubular within the powered mouse hole. FIGS. 14A-14C show a system 460 according to the present invention which includes a rig system 461 and a powered mouse hole 462. The powered mouse hole 462 is like the powered mouse hole disclosed in U.S. Pat. No. 5,351,767 (incorporated fully herein for all purposes) with the addition of an RFIDT reader apparatus. The powered mouse hole 462 has a receptacle 463 for receiving an end of a tubular member. An RFIDT reader apparatus 464 is located at the bottom of the receptacle 463 (which may be like any RFIDT reader apparatus disclosed or referred to herein). A line or cable 465 connects the RFIDT reader apparatus 464 to control apparatus (not shown; like any disclosed or referred to herein). Optionally as shown in FIG. 14B, an RFIDT reader apparatus 466 in communication with control apparatus 467 is located adjacent the top of the receptacle 463.

Figure 14D:
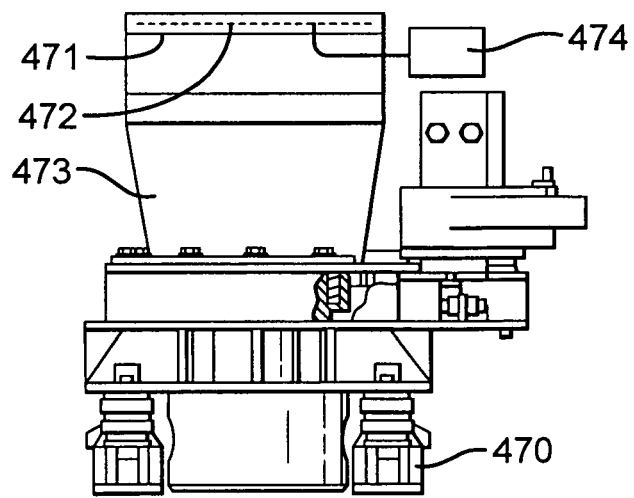
FIG. 14D is a side view of a powered mouse hole tool according to the present invention.

FIG. 14D shows a rotating mouse hole tool 470 which is like the PHANTOM MOUSE™ tool commercially-available from Varco International (and which is co-owned with the present invention), but the tool 470 has an upper ring 471 on a circular receptacle 473 (like the receptacle 463, FIG. 14C). The upper ring 471 has an energizing antenna 472 for energizing an RFIDT on a tubular or in an end of a tubular placed into the receptacle 473. The antenna 472 encircles the top of the receptacle 473. The antenna 472 is connected to reader apparatus 474 (like any disclosed or referred to herein) which may be mounted on the tool 470 or adjacent thereto.

The prior art discloses a wide variety of top drive units (see, e.g., U.S. Pat. Nos. 4,421,179; 4,529,045; 6,257,349; 6,024,181; 5,921,329; 5,794,723; 5,755,296; 5,501,286; 5,388,651; 5,368,112; and 5,107,940 and the references cited therein). The present invention discloses improved top drives which have one, two, or more RFIDT readers and/or antenna energizers. It is within the scope of the present invention to locate an RFIDT reader and/or antenna energizer at any convenient place on a top drive from which an RFIDT in a tubular can be energized and/or read and/or written to. Such locations are, in certain aspects, at a point past which a tubular or a part thereof with an RFIDT moves. FIGS. 15A and 15B show a top drive system 500 according to the present invention which is like the top drives of U.S. Pat. No. 6,679,333 (incorporated fully herein), but with an RFIDT reader 501 located within a top drive assembly portion 502. The reader 501 is located for reading an RFIDT 503 on or in a tubular 504 which is being held within the top drive assembly portion 502. Alternatively, or in addition to the reader 501, an RFIDT reader 507 is located in a gripper section 505 which can energize and read the RFIDT 503 as the gripper section moves into the tubular 504. In particular aspects, the tubular is a piece of drill pipe or a piece of casing. Appropriate cables or lines 508, 509, respectively connect the readers 501, 507 to control apparatus (not shown, as any described or referred to herein).

It is within the scope of the present invention to provide a cementing plug (or pipeline pig) with one or more RFIDT's with an antenna that encircles a generally circular part or portion of the plug or pig and with an IC embedded in a body part of the plug or pig and/or with an IC and/or antenna in a recess (as any recess described or referred to herein) and/or with one or more RFIDT's affixed exteriorly of the plug or pig. FIG. 16A shows a cementing plug 510 according to the present invention with a generally cylindrical body 512 and exterior wipers 513 (there may be any desired number of wipers). An RFIDT 514 is encased in the body 512. An antenna 515 encircles part of the body 512. The body 512 (as may be any plug according to the present invention) may be made of any known material used for plugs, as may be the wipers 513. An IC 516 of the RFIDT 514 is like any IC disclosed or referred to herein. Optionally a cap ring (not shown) may e used over the recess 515 as may be filler material within the recess. Optionally, or in addition to the RFIDT 514, one or more RFIDT's 514a is affixed exteriorly to the plug 510 under wrap layers 514b (see, e.g. FIGS. 25, 26). One or more such RFIDT's may be affixed to the plug 520.

FIG. 16B shows a cementing plug 520 according to the present invention which has a generally cylindrical body 522 with a bore 523 therethrough from top to bottom. A plurality of wipers 524 are on the exterior of the body 522. An RFIDT 525 has an IC 526 encased in the body 522 and an antenna 527 that encircles part of the body 522. Both antennas 515 and 527 are circular as viewed from above and extend around and within the entire circumference of their respective bodies. It is within the scope of the present invention to have the RFIDT 514 and/or the RFIDT 525 within recesses in their respective bodies (as any recess disclosed herein or referred to herein) with or without a cap ring or filler.

FIGS. 17A-17D show a portable ring 530 which has a flexible body 532 made, e.g. from rubber, plastic, fiberglass, and/or composite which has two ends 531a, 531b. The end 531a has a recess 536 sized and configured for receiving and holding with a friction fit a correspondingly sized and configured pin 533 projecting out from the end 531b. The two ends 531a, 531b may be held together with any suitable locking mechanism, latch apparatus, and/or adhesive. As shown, each end 531a, 531b has a piece of releasably cooperating hook-and-loop fastener material 534a, 534b, respectively thereon (e.g. VELCRO™ material) and a corresponding piece of such material 535 is releasably connected to the pieces 534a, 534b (FIG. 17C) to hold the two ends 531a, 531b together. The body 532 encases an RFIDT 537 which has an IC 538 and an antenna 539. Ends of the antenna 539 meet at the projection 533-recess 536 interface and/or the projection 533 is made of antenna material and the recess 536 is lined with such material which is connected to an antenna end. Optionally, as shown in FIG. 17D the ring 530 may include one or more (one shown) protective layers 532a, e.g. made of a durable material, e.g., but not limited to metal, KEVLAR™ material or ARAMID™ material. A hole 532b formed when the two ends 531a, 531b are connected together can be any desired size to accommodate any item or tubular to be encompassed by the ring 530. The ring 530 may have one, two or more RFIDT's therein one or both of which are read-only; or one or both of which are read-write. Such a ring may be emplaced around a member, e.g., but not limited to, part of a screen or a solid or hollow generally cylindrical member. Any ring or torus herein according to the present invention may have an RFIDT with an antenna that has any desired number of loops (e.g., but not limited to, five, ten, fifteen, twenty, thirty or fifty loops), as may be the case with any antenna of any RFIDT in any embodiment disclosed herein.

FIG. 17E shows a portable ring 530a, like the ring 530 but without two separable ends. The ring 530a has a body 530b made of either rigid or flexible material and with a center opening 530f so it is releasably emplaceable around another member. An RFIDT 530c within the body 530b has an IC 530e and an antenna 530d.

Figures 18A, 18B, 19:
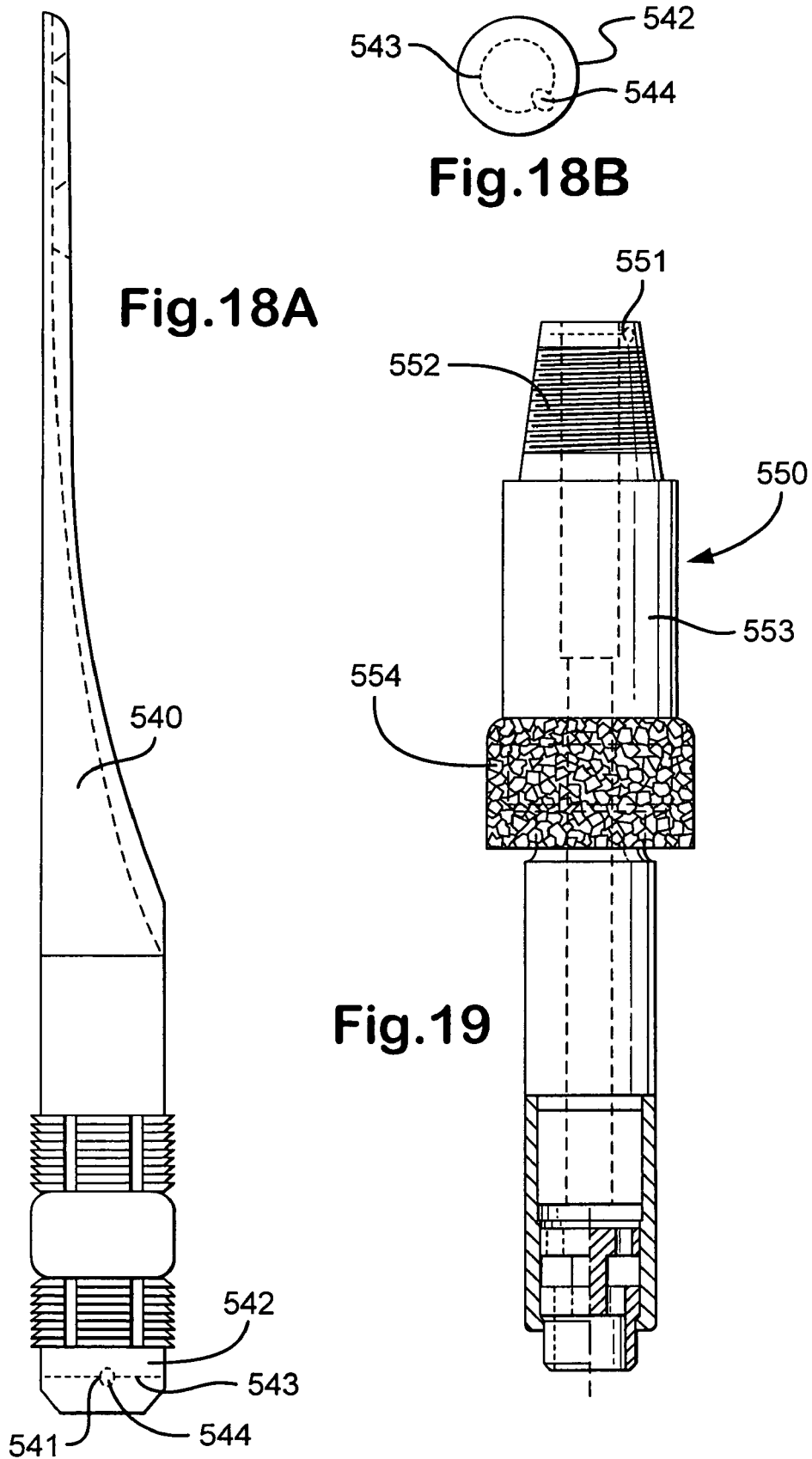
FIG. 18A is a side view of a whipstock according to the present invention.
FIG. 18B is a bottom view of the whipstock of FIG. 18A.
FIG. 19 is a side view of a mill according to the present invention.

It is within the scope of the present invention to provide a whipstock with one or more RFIDT's with an RFIDT circular antenna that encircles a generally circular part of a generally cylindrical part of a whipstock. FIGS. 18A and 18B show a whipstock 540 like a whipstock disclosed in U.S. Pat. No. 6,105,675 (incorporated fully herein for all purposes), but with an RFIDT 541 in a lower part 542 of the whipstock 540.

The RFIDT 541 has an antenna 543 and an IC 544 (each like any as disclosed or referred to herein). Optionally, or in addition to the RFIDT 541, one or more RFIDT's 541*a* is affixed exteriorly to the whipstock 540 under wrap layers 541*b* (see, e.g., FIGS. 25, 26).

An RFIDT 551 (as any disclosed herein) may, according to the present invention, be provided in a generally cylindrical part of a mill or milling tool used in downhole milling operations. Also with respect to certain mills that have a tubular portion, one or both ends of such a mill may have one or more RFIDT's therein according to the present invention. FIG. 19 shows a mill 550 which is like the mill disclosed in U.S. Pat. No. 5,620,051 (incorporated fully herein), but with an RFIDT 551 in a threaded pin end 552 of a body 553 of the mill 550. The RFIDT 551 may be emplaced and/or mounted in the pin end 552 as is any similar RFIDT disclosed herein. Optionally an RFIDT may be emplaced within a milling section 554. Optionally, or in addition to the RFIDT 551, one or more RFIDT's 551*a* may be affixed exteriorly of the mill 550 under wrap layers 551*b* (see, e.g., FIGS. 25, 26).

Figure 20:
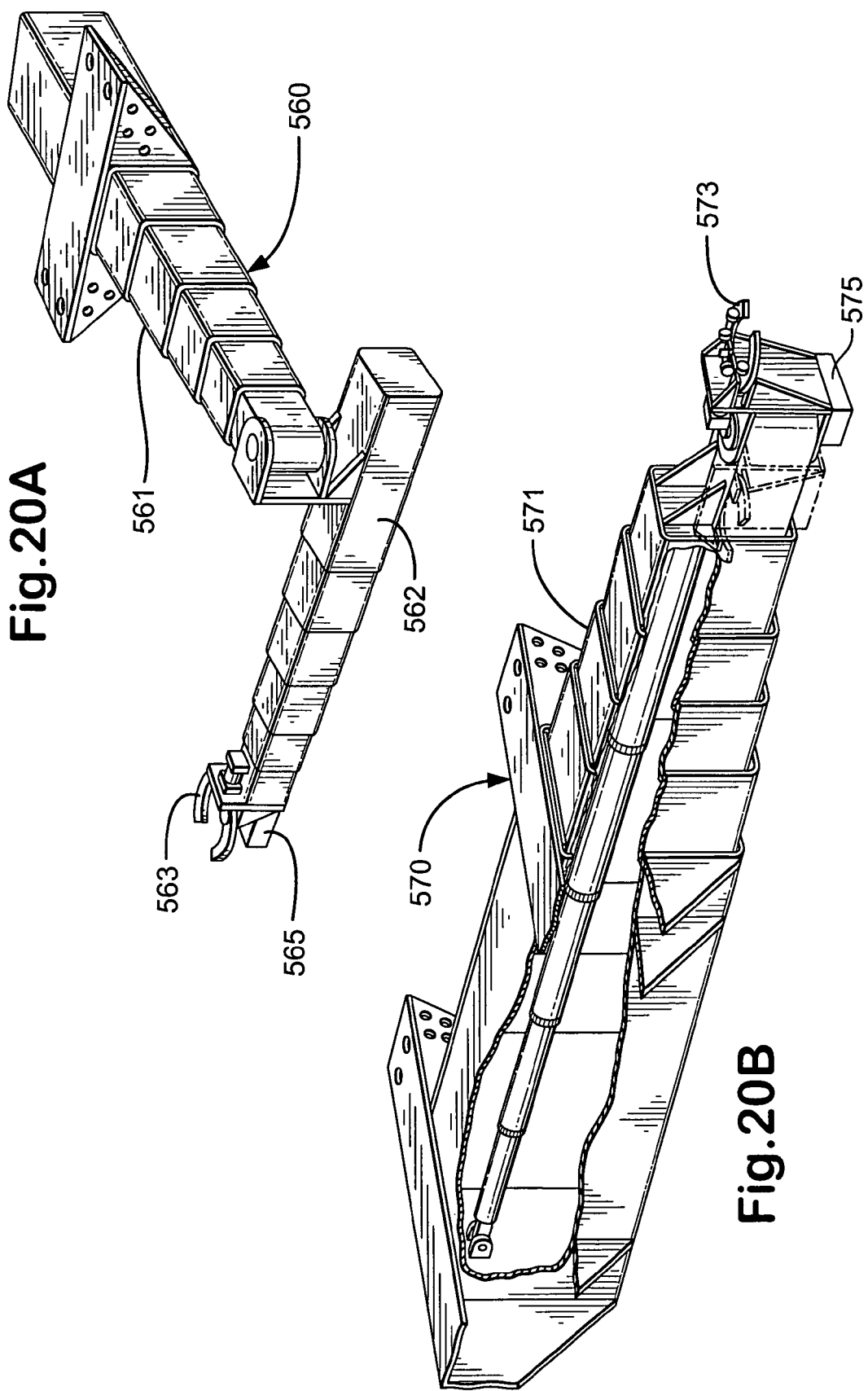
FIGS. 20A and 20B are perspective views of pipe manipulators according to the present invention.

The prior art discloses a variety of pipe handlers and pipe manipulators, some with gripping mechanisms for gripping pipe. It is within the scope of the present invention to provide a pipe handler with an RFIDT reader for reading an RFIDT in a tubular member which is located in one of the embodiments of the present invention as described herein. Often an end of a tubular is near, adjacent, or passing by a part of a pipe handler. An RFIDT on or in a tubular according to the present invention can be sensed by an RFIDT reader apparatus and a signal can e transmitted therefrom to control apparatus regarding the tubular's identity or other information stored in the RFIDT. FIGS. 20A and 20B show pipe manipulators 560 and 570 (which are like pipe manipulators disclosed in U.S. Pat. No. 4,077,525, incorporated fully herein, but with improvements according to the present invention) which have movable arms 561, 562, (pipe manipulator 560) and movable arm 571 (pipe manipulator 570). Each manipulator has a pipe gripper 563, 573. Each manipulator has an RFIDT reader apparatus—apparatus 565 on manipulator 560 and apparatus 575 on manipulator 570. Optionally, such a reader apparatus is located on a gripper mechanism.

Figure 21:
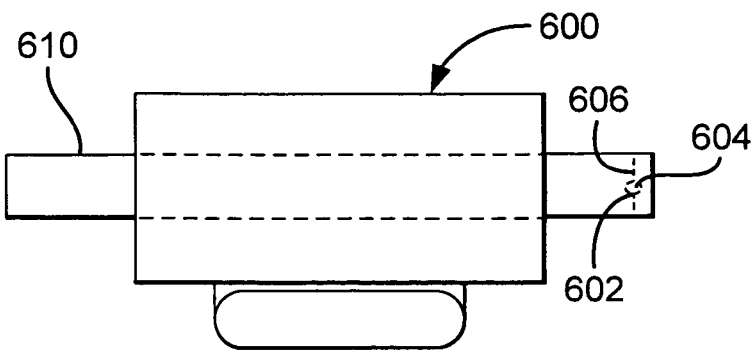
FIG. 21 is a schematic view of a system according to the present invention.

FIG. 21 shows a tubular inspection system 600 (which may be any known tubular inspection system, including those which move with respect to a tubular and those with respect to which a tubular moves, including, but not limited to those disclosed in U.S. Pat. Nos. 6,622,561; 6,578,422; 5,534,775; 5,043,663; 5,030,911; 4,792,756; 4,710,712; 4,636,727; 4,629,985; 4,718,277; 5,914,596; 5,585,565; 5,600,069; 5,303,592; 5,291,272; and Int'l Patent Application WO 98/16842 published Apr. 23, 1998 and in the references cited therein) which is used to inspect a tubular 610 (e.g., but not limited to pipe, casing, tubing, collar).which has at least one RFIDT 602 with an IC 604 and an antenna 606 and/or at least one RFIDT 602*a* affixed exteriorly thereof according to the present invention. The tubular 610 may be any tubular disclosed herein and it may have any RFIDT, RFIDT's, recess, recesses, cap ring, and/or sensible material and/or indicia disclosed herein.

Figure 22:
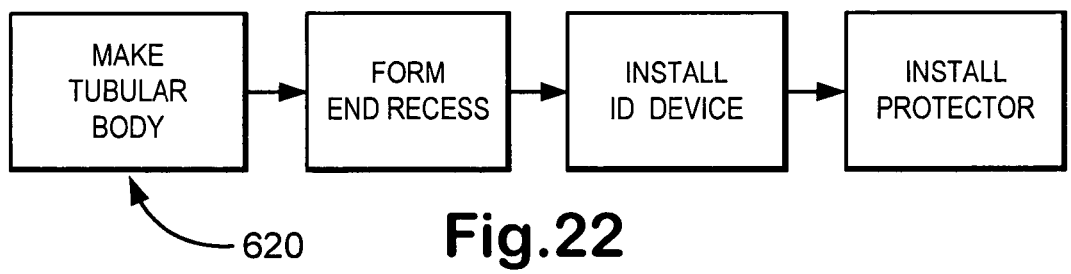
FIGS. 22 and 23 are schematic views of systems according to the present invention.

FIG. 22 shows schematically a method 620 for making a tubular member according to the present invention. A tubular body is made—"MAKE TUBULAR BODY"—using any suitable known process for making a tubular body, including, but not limited to, known methods for making pipe, drill pipe, casing, risers, and tubing. An end recess is formed—"FORM END RECESS"—in one or both ends of the tubular member. An identification device is installed in the recess—"INSTALL ID DEVICE" (which may be any identification apparatus, device, torus ring or cap ring according to the present invention). Optionally, a protector is installed in the recess—"INSTALL PROTECTOR" (which may be any protector according to the present invention).

Figure 23:
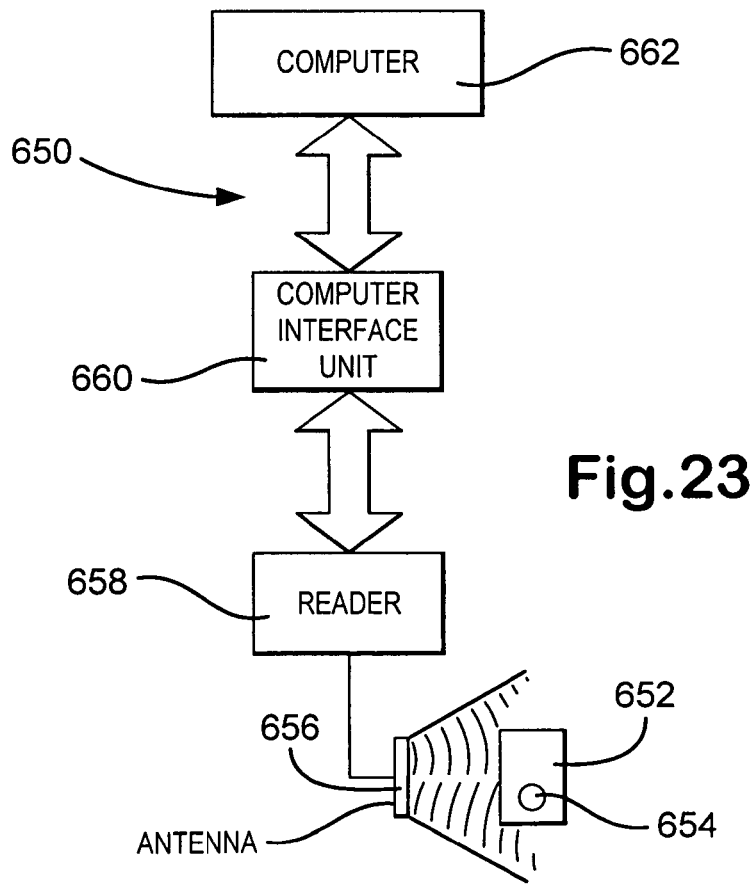

FIG. 23 shows schematically a system 650 according to the present invention which is like the systems described in U.S. Pat. No. 4,698,631 but which is for identifying an item 652 according to the present invention which has at least one end recess (as any end recess disclosed herein) and/or within a ring or torus according to the present invention with at least one SAW tag identification apparatus 654 in the recess(es) and/or ring(s) or torus(es) and/or with an exteriorly affixed RFIDT according to the present invention.

The system 650 (as systems in U.S. Pat. No. 4,698,631) has an energizing antenna apparatus 656 connected to a reader 658 which provides radio frequency pulses or bursts which are beamed through the antenna apparatus 656 to the SAW tag identification apparatus 654. The reader 658 senses responsive signals from the apparatus 654. In one aspect the responsive signals are phase modulated in accord with code encoded in the apparatus 654. The reader 658 sends received signals to a computer interface unit 660 which processes the signals and sends them to a computer system 662.

Figure 24:
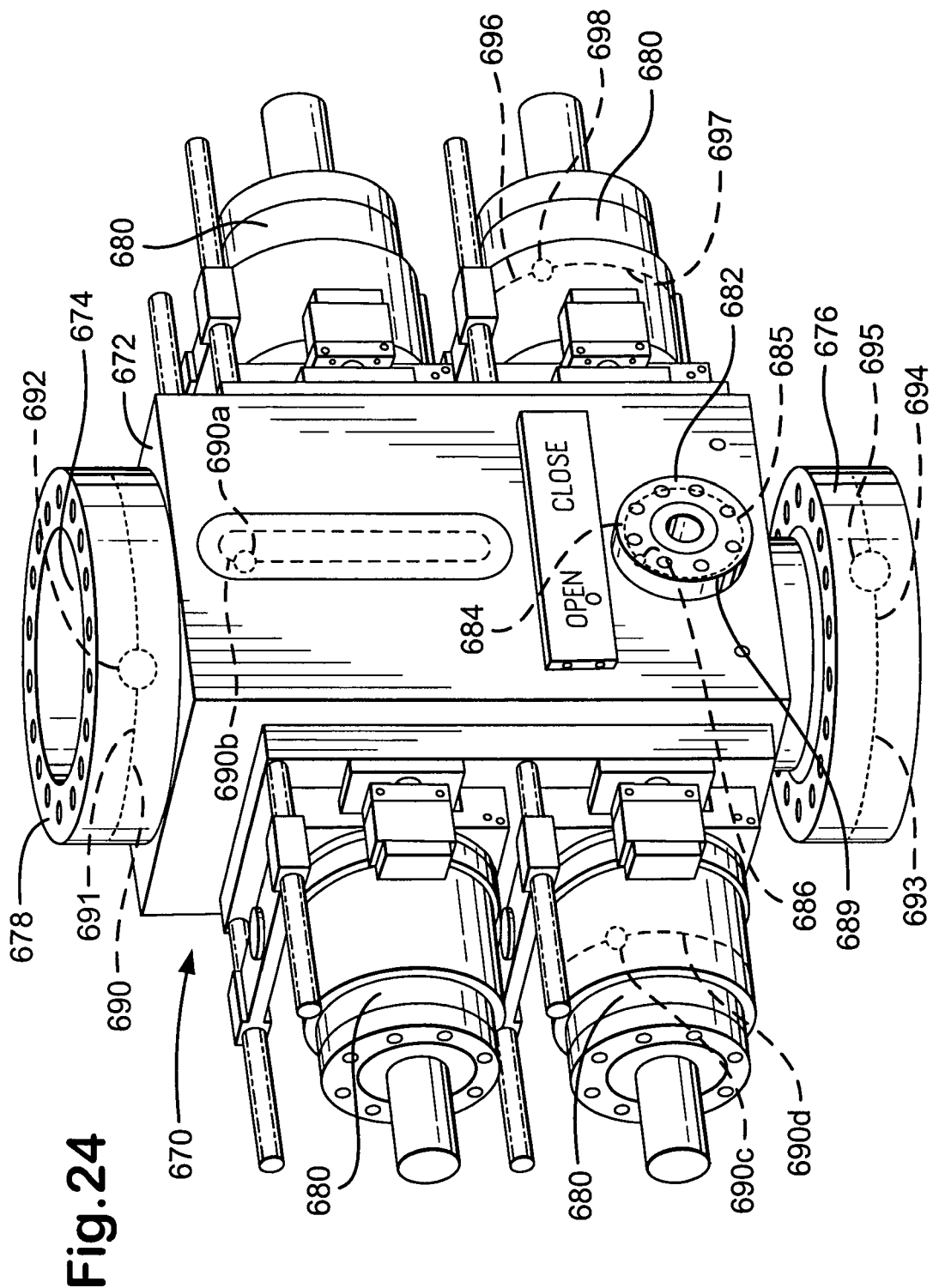
FIG. 24 is a perspective view of a blowout preventer according to the present invention.

It is within the scope of the present invention to provide a blowout preventer according to the present invention with one or more wave energizable identification apparatuses, e.g. in a flange, side outlet, and/or door or bonnet or a blowout preventer. FIG. 24 shows a blowout preventer 670 according to the present invention which has a main body 672, a flow bore 674 therethrough from top to bottom, a bottom flange 676, a top flange 678, a side outlet 682, and four ram-enclosing bonnets 680. An RFIDT 690 (like any disclosed herein) has an antenna 691 encircling and within the top flange 678 with an IC 692 connected thereto. An RFIDT 692 (like any disclosed herein) has an antenna 694 encircling and within the bottom flange 676 with an IC 695. An RFIDT 696 (like any disclosed herein) has an antenna 697 encircling and within a bonnet 680 with an IC 698. An RFIDT 684 (like any disclosed herein) has an antenna 685 encircling and within a flange 689 of the side outlet 682, with an IC 686. Optionally, or in addition to the other RFIDT's at least one RFIDT 690*a* is affixed exteriorly to the blowout preventer 670 under wrap layers 690*b* (see, e.g., FIG. 25, 26) and/or at least one RFIDT 690*c* is affixed exteriorly to the blowout preventer 270 under wrap layers 690*d* (see, e.g., FIG. 25, 26).

Figure 25:
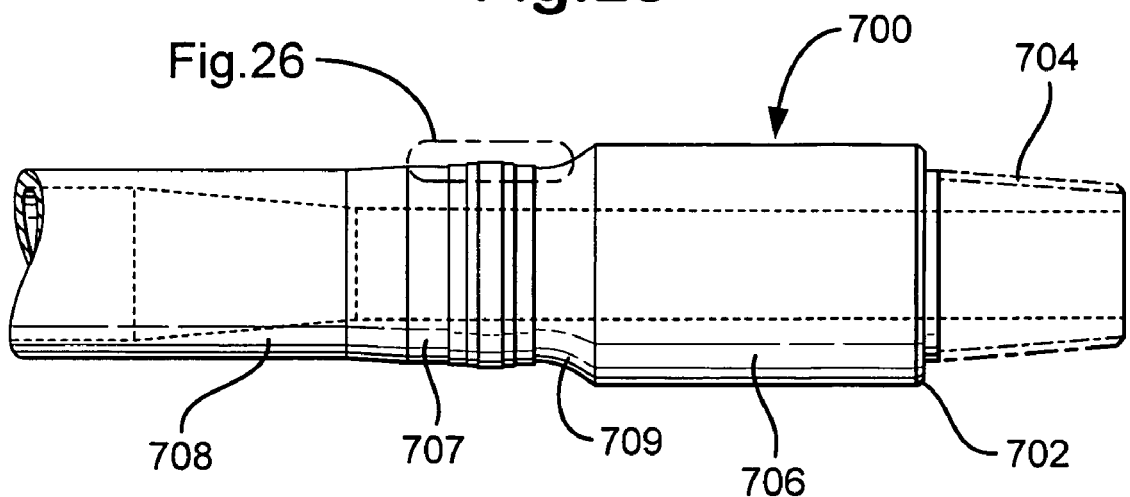
FIG. 25 is a side view of a tubular according to the present invention.
Figure 26:
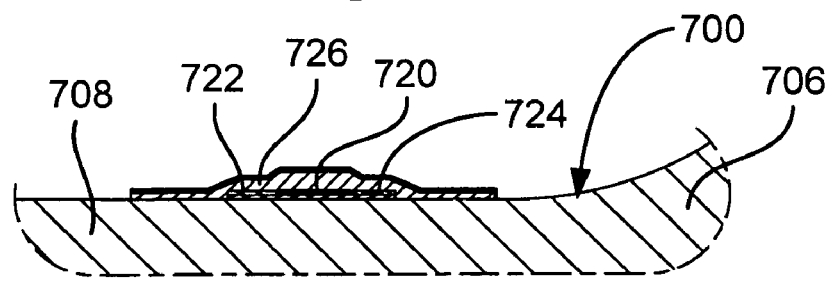
FIG. 26 is an enlargement of part of FIG. 25.

FIGS. 25 and 26 show a tool joint 700 according to the present invention with RFIDT apparatus 720 according to the present invention applied exteriorly thereto. The tool joint 700 has a pin end 702 with a threaded pin 704, a joint body portion 706, an upset area 707 and a tube body portion 708. The joint body portion 706 has a larger OD than the tube body portion 708. The "WELDLINE" is an area in which the tool joint is welded (e.g. inertia welded) by the manufacturer to the upset area.

Although RFIDT's encased in a non-conductor or otherwise enclosed or protected can be emplaced directly on a tubular (or other item or apparatus according to the present invention), as shown in FIGS. 25 and 26 the RFIDT's to be applied to the tool joint 700 are first enclosed within non-conducting material, e.g. any suitable heat-resistant material, e.g., but not limited to, RYTON™ fabric membrane wrapping material, prior to emplacing them on the tool joint 700. In one particular aspect, one, two, three, or four wraps, folds, or layers of commercially available RYT-WRAP™ material commercially from Tuboscope, Inc. a related company of the owner of the present invention is used which, in one particular aspect, includes three layers of RYT-WRAP™ fabric membrane material adhered together and encased in epoxy. As shown, three RFIDT's 720 are wrapped three times in the RYT-WRAP™ material 722 so that no part of any of them will contact the metal of the tool joint 700. In one aspect such a wrapping of RYT-WRAP™ material includes RYTON™ fabric membrane material with cured epoxy wrapped around a tubular body (initially the material is saturated in place with liquid epoxy that is allowed to cure).

Prior to emplacing the wrapped RFIDT's 720 on the tool joint 700, the area to which they are to be affixed is, preferably, cleaned using suitable cleaning materials, by buffing, and/or by sandblasting as shown in FIG. 27. Any desired number of RFIDT's 720 may be used. As shown in FIG. 29A, in this embodiment three RFIDT's 720 are equally spaced apart around the exterior of the tool joint 700.

According to the present invention, RFIDT's may be applied exteriorly to any item, apparatus, or tubular at any exterior location thereon with any or all of the layers and/or wraps disclosed herein. In the particular tool joint 700 as disclosed in FIG. 25, the RFIDT's 720 are applied about two to three inches from a thirty-five degree taper 709 of the joint body portion 706 to reduce the likelihood of the RFIDT's contacting other items, handling tools, grippers, or structures that may contact the portion 706.

Optionally, as shown in FIG. 26, either in the initial layers or wraps which enclose the RFIDT's 720 or in any other layer or wrap, an identification tag 724 is included with the RFIDT's, either a single such tag or one tag for each RFIDT. In one aspect the tag(s) 724 are plastic or fiberglass. In another aspect the tag(s) 724 are metal, e.g. steel, stainless steel, aluminum, aluminum alloy, zinc, zinc alloy, bronze, or brass. If metal is used, the tag(s) 724 are not in contact with an RFIDT.

As shown in FIG. 28, an adhesive may be applied to the tool joint 700 to assist in securing a layer 723, "FOLDED MEMBRANE," (e.g., a double layer of RYT-WRAP™ wrap material.

Figure 29:
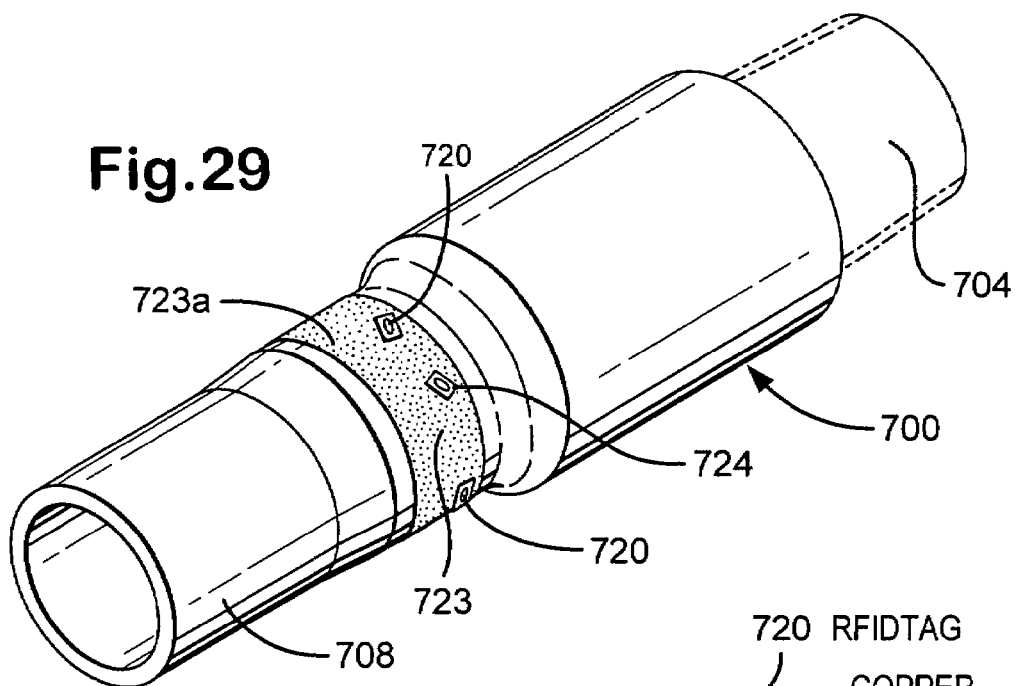
Figure 29A:
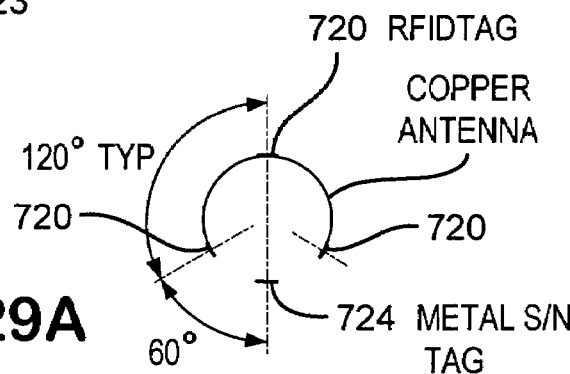
FIG. 29A is a schematic of part of the tubular of FIG. 29.

As shown in FIG. 29, the three RFIDT's 720 are emplaced on the layer 723 and, optionally, the identification tag or tags 724.

Figure 30:
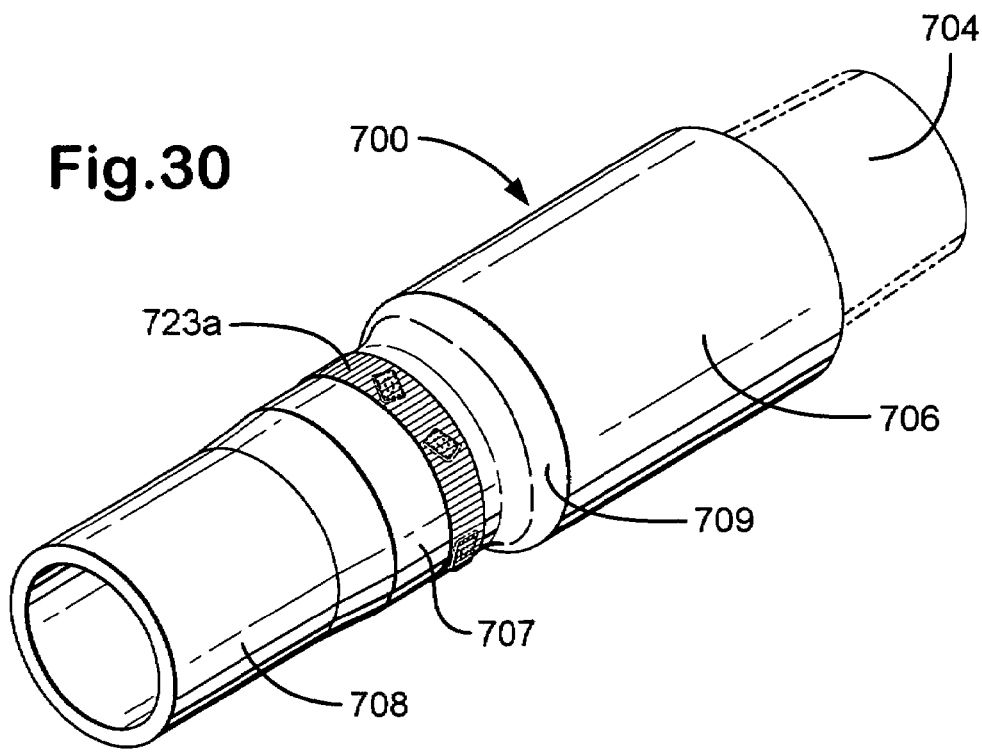

Optionally, as shown in FIG. 30, part 723a of the layer 723 is folded over to cover the RFIDT's 720 and the tag(s) 724. If this folding is done, no adhesive is applied to the tool joint under the portion of the layer 723 which is to be folded over. Optionally, prior to folding adhesive is applied on top of the portion of the layer 723 to be folded over. Optionally, prior to folding the part 723a over on the RFIDT's 720 and the tag(s) 724 an adhesive (e.g. two part epoxy) is applied over the RFIDT's 720 and over the tag(s) 724.

Figure 31:
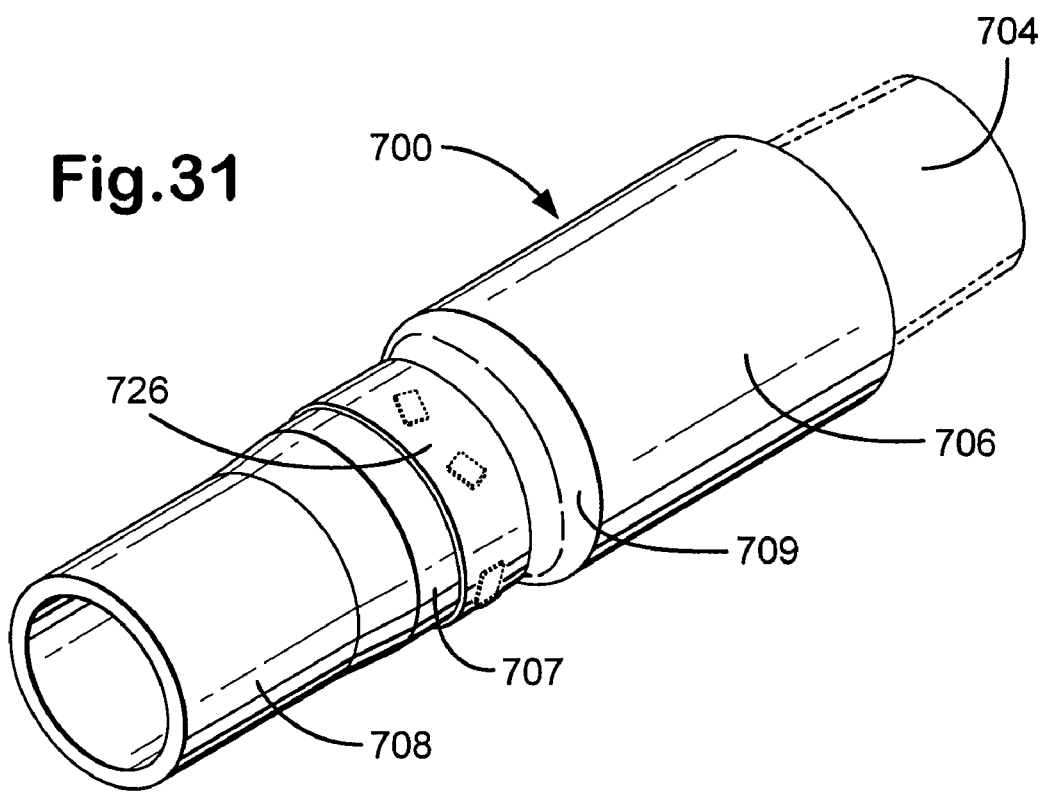

After allowing the structure of layer 723a as shown in FIG. 30 to dry (e.g., for forty minutes to one hour), as shown in FIG. 31 the folded layer 723 with the RFIDT's 720 and tag(s) 724 is, optionally, wrapped in a layer 726 of heat shrink material and/or impact resistant material (heat resistant material may also be impact resistant). In one particular optional aspect, commercially available RAYCHEM™ heat shrink material or commercially available RCANUSA™ heat shrink material is used, centered over the folded layer 723, with, preferably, a small end-to-end overlap to enhance secure bonding as the material is heated.

Figure 32:
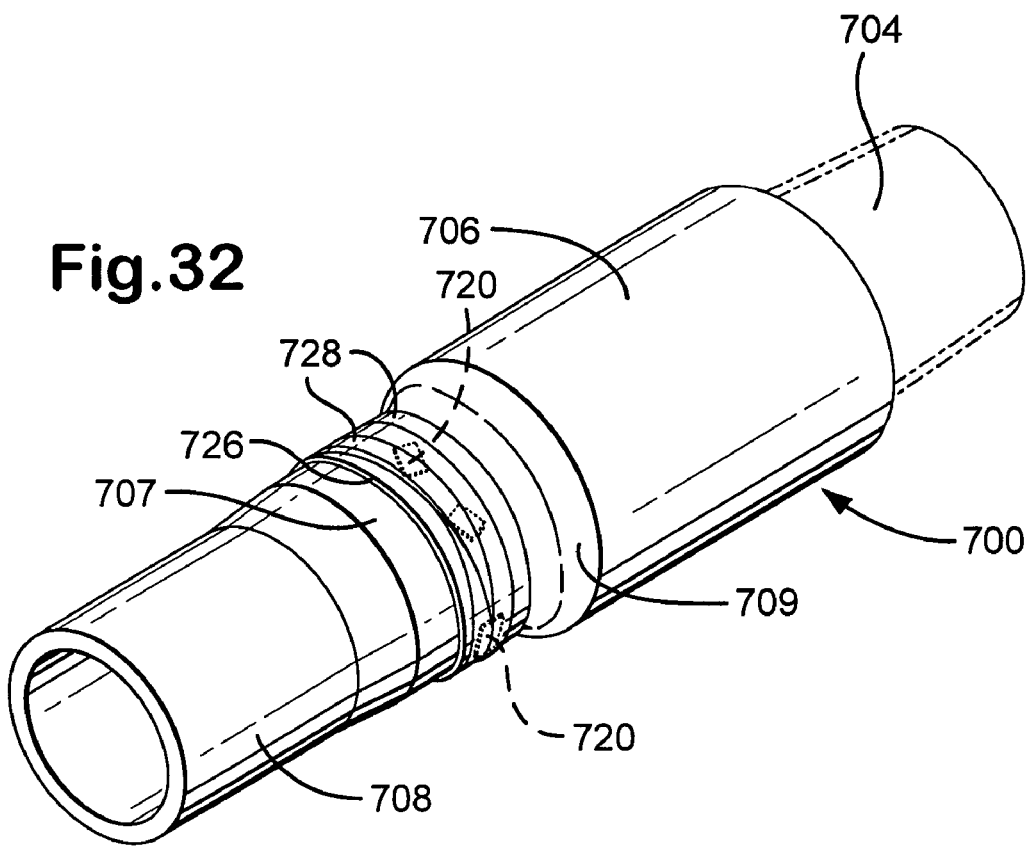

As shown in FIG. 32, optionally, the layer 726 is wrapped with layers 728 of material (e.g. RYT-WRAP™ material) (e.g. with two to five layers). In one particular aspect the layer(s) 728 completely cover the layer 726 and extend for one-half inch on both extremities of the layer 726. Preferably, the final wrap layer of the layers 728 does not exceed the OD of the joint body portion 706 so that movement of and handling of the tool joint 700 is not impeded.

Curing can be done in ambient temperature and/or with fan-assisted dryers.

Any known wave energizable apparatus may be substituted for any RFIDT herein.

The present invention, therefore, in at least certain aspects, provides a member having a body, the body having at least a portion thereof with a generally cylindrical portion, the generally cylindrical portion having a circumference, radio frequency identification apparatus with integrated circuit apparatus and antenna apparatus within the generally cylindrical portion of the body, and the antenna apparatus encircling the circumference of the cylindrical portion of the body. Such a member may include one or some (in any possible combination) of the following: the body having a first end spaced-apart from a second end, and the radio frequency identification apparatus positioned within the first end of the body; the first end of the body having a recess in the first end, and the radio frequency identification apparatus is within the recess; a protector in the recess covering the radio frequency identification apparatus; the body comprising a pipe; wherein the first end is a pin end of the pipe; wherein an end of the pipe has an exterior shoulder and the radio frequency identification apparatus is within the shoulder; wherein the second end is a box end of the pipe; wherein the first end is threaded externally and the second end is threaded internally; wherein the member is a piece of drill pipe with an externally threaded pin end spaced-apart from an internally threaded box end, and the body is generally cylindrical and hollow with a flow channel therethrough from the pin end to the box end, the pin end having a pin end portion with a pin end recess therearound, and the radio frequency identification apparatus within the pin end recess and the antenna apparatus encircling the pin end portion; wherein a protector in the pin end recess covers the radio frequency identification apparatus therein; wherein the protector is a cap ring within the pin end recess which covers the radio frequency identification apparatus; wherein the protector is an amount of protective material in the recess which covers the radio frequency identification apparatus; the member having a box end having a box end portion having a box end recess therein, a box end radio frequency identification apparatus within the box end recess, the box end radio frequency identification apparatus having antenna apparatus and integrated circuit apparatus, the antenna encircling the box end portion; wherein a protector in the box end covers the radio frequency identification apparatus therein; wherein the recess has a cross-section shape from the group consisting of square, rectangular, semi-triangular, rhomboidal, triangular, trapezoidal, circular, and semi-circular; wherein the generally cylindrical portion is part of an item from the group consisting of pipe, drill pipe, casing, drill bit, tubing, stabilizer, centralizer, cementing plug, buoyant tubular, thread protector, downhole motor, whipstock, blowout preventer, mill, and torus; a piece of pipe with a pin end, the pin end having a recess therein, and sensible indicia in the recess; wherein the sensible indicia is from the group consisting of raised portions, indented portions, visually sensible indicia, spaced-apart indicia, numeral indicia, letter indicia, and colored indicia; the member including the body having a side wall with an exterior surface and a wall recess in the side wall, the wall recess extending inwardly from the exterior surface, and secondary radio frequency identification apparatus within the wall recess; and/or wherein the radio frequency identification apparatus is a plurality of radio frequency identification tag devices.

The present invention, therefore, in at least certain aspects, provides a tubular member with a body with a first end spaced-apart from a second end, the first end having a pin end having a pin end recess in the first end and identification apparatus in the pin end recess, and a protector in the pin end recess protecting the identification apparatus therein.

The present invention, therefore, in at least certain aspects, provides a method for sensing a radio frequency identification apparatus in a member, the member having a body, the body having at least a portion thereof with a generally cylindrical portion, the generally cylindrical portion having a circumference, wave energizable identification apparatus with antenna apparatus within the generally cylindrical portion of the body, and the antenna apparatus encircling the circumference of the cylindrical portion of the body, the method including energizing the wave energizable identification apparatus by directing energizing energy to the antenna apparatus, the wave energizable identification apparatus upon being energized producing a signal, positioning the member adjacent sensing apparatus, and sensing with the sensing apparatus the signal produced by the wave energizable identification apparatus. Such a method may include one or some (in any possible combination) of the following: wherein the sensing apparatus is on an item from the group consisting of rig, elevator, spider, derrick, tubular handler, tubular manipulator, tubular rotator, top drive, mouse hole, powered mouse hole, or floor; wherein the sensing apparatus is in communication with and is controlled by computer apparatus (e.g. including but not limited to, computer system(s), programmable logic controller(s) and/or microprocessor system(s)), the method further including controlling the sensing apparatus with the computer apparatus; wherein the energizing is effected by energizing apparatus in communication with and controlled by computer apparatus, the method further including controlling the energizing apparatus with the computer apparatus; wherein the signal is an identification signal identifying the member and the sensing apparatus produces and conveys a corresponding signal to computer apparatus, the computer apparatus including a programmable portion programmed to receive and analyze the corresponding signal, and the computer apparatus for producing an analysis signal indicative of accepting or rejecting the member based on said analysis, the method further including the wave energizable identification apparatus and producing an identification signal received by the sensing apparatus, the sensing apparatus producing a corresponding signal indicative of identification of the member and conveying the corresponding signal to the computer apparatus, and the computer apparatus analyzing the corresponding signal and producing the analysis signal; wherein the computer apparatus conveys the analysis signal to handling apparatus for handling the member, the handling apparatus operable to accept or reject the member based on the analysis signal; wherein the member is a tubular member for use in well operations and the handling apparatus is a tubular member handling apparatus; wherein the tubular member handling apparatus is from the group consisting of tubular manipulator, tubular rotator, top drive, tong, spinner, downhole motor, elevator, spider, powered mouse hole, and pipe handler; wherein the handling apparatus has handling sensing apparatus thereon for sensing a signal from the wave energizable identification apparatus, and wherein the handling apparatus includes communication apparatus in communication with computer apparatus, the method further including sending a handling signal from the communication apparatus to the computer apparatus corresponding to the signal produced by the wave energizable identification apparatus; wherein the computer apparatus controls the handling apparatus; wherein the member is a tubular member and wherein the sensing apparatus is connected to and in communication with a tubular inspection system, the method further including conveying a secondary signal from the sensing apparatus to the tubular inspection system, the secondary signal corresponding to the signal produced by the wave energizable identification apparatus; and/or wherein the signal produced by the wave energizable identification apparatus identifies the tubular member.

The present invention, therefore, in at least certain aspects, provides a method for handling drill pipe on a drilling rig, the drill pipe comprising a plurality of pieces of drill pipe, each piece of drill pipe comprising a body with an externally threaded pin end spaced-apart from an internally threaded box end, the body having a flow channel therethrough from the pin end to the box end, radio frequency identification apparatus with integrated circuit apparatus and antenna apparatus within the pin end of the body, and the antenna apparatus encircling the pin end, the method including energizing the radio frequency identification apparatus by directing energizing energy to the antenna apparatus, the radio frequency identification apparatus upon being energized producing a signal, positioning each piece of drill pipe adjacent sensing apparatus, and sensing with the sensing apparatus a signal produced by each piece of drill pipe's radio frequency identification apparatus. Such a method may include one or some (in any possible combination) of the following: wherein the sensing apparatus is in communication and is controlled by computer apparatus and wherein the radio frequency identification apparatus produces an identification signal receivable by the sensing apparatus, and wherein the sensing apparatus produces a corresponding signal indicative of the identification of the particular piece of drill pipe, the corresponding signal conveyable from the sensing apparatus to the computer apparatus, the method further including controlling the sensing apparatus with the computer apparatus; wherein the energizing is effected by energizing apparatus in communication with and controlled by computer apparatus, the method further including controlling the energizing apparatus with the computer apparatus; wherein the signal is an identification signal identifying the particular piece of drill pipe and the sensing apparatus conveys a corresponding signal to computer apparatus, the computer apparatus including a programmable portion programmed to receive and analyze the corresponding signal; and/or the computer apparatus for producing an analysis signal indicative of accepting or rejecting the particular piece of drill pipe based on said analysis, the method further including the computer apparatus analyzing the corresponding signal and producing the analysis signal, and the computer apparatus conveying the analysis signal to handling apparatus for handling the member, the handling apparatus operable to accept or reject the member based on the analysis signal.

The present invention, therefore, in at least certain aspects, provides a system for handling a tubular member, the system including handling apparatus, and a tubular member in contact with the handling apparatus, the tubular member with a body with a first end spaced-apart from a second end, the first end being a pin end having a pin end recess in the first end and identification apparatus in the pin end recess, and a protector in the pin end recess protecting the identification apparatus therein; and such a system wherein the handling apparatus is from the group consisting of tubular manipulator, tubular rotator, top drive, tong, spinner, downhole motor, elevator, spider, powered mouse hole, and pipe handler.

The present invention, therefore, in at least certain aspects, provides a ring with a body with a central hole therethrough, the body having a generally circular shape, the body sized and configured for receipt within a circular recess in an end of a generally cylindrical member having a circumference, wave energizable identification apparatus within the body, the wave energizable identification apparatus having antenna apparatus, and the antenna apparatus extending around a portion of the body; and such a ring with sensible indicia on or in the body.

The present invention, therefore, in at least certain aspects, provides a ring with a body with a central hole therethrough, the body having a central hole therethrough the body sized and configured for receipt within a circular recess in an end of a generally cylindrical member having a circumference, identification apparatus within or on the body, and the identification apparatus being sensible indicia.

The present invention, therefore, in at least certain aspects, provides a method for making a tubular member, the method including making a body for a tubular member, the body having a first end spaced-apart from a second end, and forming a recess around the end of the body, the recess sized and shaped for receipt therein of wave energizable identification apparatus. Such a method may include one or some (in any possible combination) of the following: installing wave energizable identification apparatus in the recess; installing a protector in the recess over the wave energizable identification apparatus; and/or wherein the tubular member is a piece of drill pipe with an externally threaded pin end spaced-apart from an internally threaded box end, the recess is a recess encircling the pin end, and the wave energizable identification apparatus has antenna apparatus, the method further including positioning the antenna apparatus around and within the pin end recess.

The present invention, therefore, in at least certain aspects, provides a method for enhancing a tubular member, the tubular member having a generally cylindrical body with a first end spaced-apart from a second end, the method including forming a circular recess in an end of the tubular member, the recess sized and shaped for receipt therein of wave energizable identification apparatus, the wave energizable identification apparatus including antenna apparatus with antenna apparatus positionable around the circular recess.

The present invention, therefore, provides, in at least some embodiments, a member with a body, the body having two spaced-apart ends, wave energizable identification apparatus on the exterior of the body, and encasement structure encasing the wave energizable identification apparatus, Such a member may have one or some, in any possible combination, of the following: the encasement structure is at least one layer of heat resistant material; wherein the encasement structure is at least one layer of impact resistant material; wherein the wave energizable identification apparatus is radio frequency identification apparatus with integrated circuit apparatus and antenna apparatus; the body has a first end spaced-apart from a second end, and at least a portion comprising a generally cylindrical portion, the generally cylindrical portion having a circumference, and the radio frequency identification apparatus positioned exteriorly on the circumference of the body; wherein the body is a pipe; wherein the pipe is a tool joint with an upset portion and the wave energizable identification apparatus is adjacent said upset portion; wherein the body has a generally cylindrical portion which is part of an item from the group consisting of pipe, drill pipe, casing, drill bit, tubing, stabilizer, centralizer, cementing plug, buoyant tubular, thread protector, downhole motor, whipstock, mill, and torus; and/or wherein the wave energizable identification apparatus comprises a plurality of radio frequency identification tag devices;.

The present invention, therefore, provides in at least some, although not necessarily all, embodiments a method for sensing a wave energizable identification apparatus of a member, the member as any disclosed herein with a body having two spaced-apart ends and wave energizable identification apparatus on the body, and encasement structure encasing the wave energizable identification apparatus, the encasement structure having at least one layer of heat resistant material, the wave energizable identification apparatus with antenna apparatus on the body, the method including energizing the wave energizable identification apparatus by directing energizing energy to the antenna apparatus, the wave energizable identification apparatus upon being energized producing a signal, positioning the member adjacent sensing apparatus, and sensing with the sensing apparatus the signal produced by the wave energizable identification apparatus. Such a method may have one or some, in any possible combination, of the following: wherein the sensing apparatus is on an item from the group consisting of rig, elevator, spider, derrick, tubular handler, tubular manipulator, tubular rotator, top drive, mouse hole, powered mouse hole, or floor; wherein the sensing apparatus is in communication with and is controlled by computer apparatus, the method including controlling the sensing apparatus with the computer apparatus; wherein the energizing is effected by energizing apparatus in communication with and controlled by computer apparatus, the method including controlling the energizing apparatus with the computer apparatus; wherein the signal is an identification signal identifying the member and the sensing apparatus produces and conveys a corresponding signal to computer apparatus, the computer apparatus including a programmable portion programmed to receive and analyze the corresponding signal, and the computer apparatus for producing an analysis signal indicative of accepting or rejecting the member based on said analysis, the method further including the wave energizable identification apparatus producing an identification signal received by the sensing apparatus, the sensing apparatus producing a corresponding signal indicative of identification of the member and conveying the corresponding signal to the computer apparatus, and the computer apparatus analyzing the corresponding signal and producing the analysis signal; wherein the computer apparatus conveys the analysis signal to handling apparatus for handling the member, the handling apparatus operable to accept or reject the member based on the analysis signal; wherein the member is a tubular member for use in well operations and the handling apparatus is a tubular member handling apparatus; wherein the tubular member handling apparatus is from the group consisting of tubular manipulator, tubular rotator, top drive, tong, spinner, downhole motor, elevator, spider, powered mouse hole, and pipe handler; wherein the handling apparatus has handling sensing apparatus thereon for sensing a signal from the wave energizable identification apparatus, and wherein the handling apparatus includes communication apparatus in communication with computer apparatus, the method including sending a handling signal from the communication apparatus to the computer apparatus corresponding to the signal produced by the wave energizable identification apparatus; wherein the computer apparatus controls the handling apparatus; wherein the member is a tubular member and wherein the sensing apparatus is connected to and in communication with a tubular inspection system, the method including conveying a secondary signal from the sensing apparatus to the tubular inspection system, the secondary signal corresponding to the signal produced by the wave energizable identification apparatus; and/or wherein the signal produced by the wave energizable identification apparatus identifies the tubular member.

The present invention, therefore, provides in at least certain, if not all, embodiments a method for handling drill pipe on a drilling rig, the drill pipe comprising a plurality of pieces of drill pipe, each piece of drill pipe being a body with an externally threaded pin end spaced-apart from an internally threaded box end, the body having a flow channel therethrough from the pin end to the box end, radio frequency identification apparatus with integrated circuit apparatus and antenna apparatus on the body, and encased in heat resistant material, the method including energizing the radio frequency identification apparatus by directing energizing energy to the antenna apparatus, the radio frequency identification apparatus upon being energized producing a signal, positioning each piece of drill pipe adjacent sensing apparatus, and sensing with the sensing apparatus a signal produced by each piece of drill pipe's radio frequency identification apparatus. Such a method may include, wherein the sensing apparatus is in communication and is controlled by computer apparatus and wherein the radio frequency identification apparatus produces an identification signal receivable by the sensing apparatus, and wherein the sensing apparatus produces a corresponding signal indicative of the identification of the particular piece of drill pipe, said corresponding signal conveyable from the sensing apparatus to the computer apparatus, controlling the sensing apparatus with the computer apparatus, and wherein the energizing is effected by energizing apparatus in communication with and controlled by computer apparatus, controlling the energizing apparatus with the computer apparatus, and wherein the signal is an identification signal identifying the particular piece of drill pipe and the sensing apparatus conveys a corresponding signal to computer apparatus, the computer apparatus including a programmable portion programmed to receive and analyze the corresponding signal, the computer apparatus for producing an analysis signal indicative of accepting or rejecting the particular piece of drill pipe based on said analysis, the computer apparatus analyzing the corresponding signal and producing the analysis signal, and the computer apparatus conveying the analysis signal to handling apparatus for handling the member, the handling apparatus operable to accept or reject the member based on the analysis signal.

The present invention, therefore, in at least certain aspects, provides a tool joint with a body having a pin end spaced-apart from a tube body, an upset portion, a tool joint portion between the upset portion and the pin end, and wave energizable identification apparatus on the tube body adjacent the upset portion, the wave energizable identification apparatus encased in heat resistant material.

FIGS. 33-35 show a shale shaker 810 according to the present invention which has a screen-mounting basket 812 and a bridge 814 on which are mounted two vibrating apparatuses 820. The basket 12 has brackets 816 to which are secured helical springs 818. Each spring 18 is secured to a base member 822. As shown in FIG. 35, an optional housing 824 may be used on sides of and beneath the shale shaker 810. Optionally (and as may be the case with any shale shaker disclosed herein according to the present invention or with any known prior art shaker or vibratory separator) an electronic tracking apparatus 829 is on the housing 24, but may, according to the present invention, be within any suitable member or part of a shale shaker; and, optionally, such a tracking apparatus has a container or housing made of composite material and/or is encased within or coated with composite material. Any known tracking device, apparatus, or system may be used, including, but not limited to known satellite tracking systems.

The brackets 816 are made, preferably, of composite material, as are the base members 822 and the housing 824. Optionally, the basket 812 (side walls 812a, 812b; ends 812c, 812d) is made of composite material. Alternatively one, some, or all of these components are made of steel encased in composite or steel coated with composite. A coating of composite may have the thickness of a layer of paint or of two, three, four or more layers of paint. A shale shaker similar to the shale shaker 810, but with no teaching, motivation, or suggestion of using such composite material for a shale shaker or parts of it, is disclosed in U.S. Pat. No. 6,155,428 incorporated fully herein for all purposes.

Figure 36:
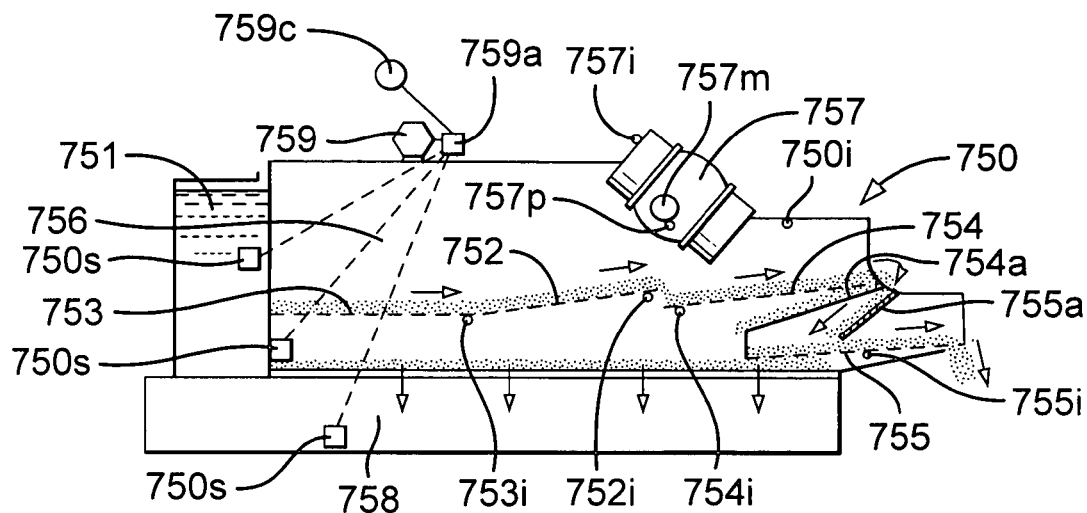
FIG. 36 is a side view of a shaker according to the present invention.

FIG. 36 shows a shaker 750 according to the present invention. Material to be treated (e.g. drilling fluid with solids) by the shaker 750 is introduced from a tank 751. Material and fluid flows onto screening apparatuses 752-755 which are mounted in a shaker basket 756. Any of the screening apparatuses 753-755 may be horizontal (see the screening apparatus 753 FIG. 36) or inclined uphill (see the screening apparatuses 752, 754, 755). Vibratory apparatus 757 vibrates the basket 756 and the screen apparatus 752-755. A flowback pan 754a under the screening apparatus 754 receives fluid flowing through the screening apparatus 754 which flows down to a container 758 and a flowback pan 755a directs material to the screening apparatus 755.

Material and/or fluid flowing through the screening apparatuses 753-755 flows down into a sump, tank or container 758. The basket 756 is mounted on a frame with springs (not shown). Material not flowing through the screening apparatuses, e.g. separated out solids, flows off the end of the screening apparatus 754 down onto the screening apparatus 755. Material separated out by the screening apparatus 755 flows on top thereof and off the end thereof.

The screen apparatuses 753-755 may be any known screens or screen assemblies used with vibratory separators or shale shakers.

Each screen apparatus 753-755 has an energizable identification apparatus or apparatuses 753i-755i, respectively, therein or thereon and/or the shaker 750 has an energizable identification apparatus or apparatuses 750i therein and/or thereon. Any energizable identification apparatus disclosed herein may be used for the screen apparatuses, vibratory apparatus, and/or for the shaker (including, e.g. RFIDT's and/or SAW's). Optionally, the vibratory apparatus 757 has an energizable identification apparatus 757i therein or thereon and/or motor weights 757m have an energizable identification apparatus 757p.

As is the case with several screens on various shale shakers, the screens 752, 754, and 755 are inclined so that materials thereon must climb "uphill" to exit off the end of the screen. It is within the scope of the present invention to use an energizable identification apparatus (any disclosed herein) with any such inclined screen and with any inclined screen on any vibratory separator or shale shaker.

Optionally the shaker 750 is provided with a reader apparatus 759 (e.g. as any disclosed herein or in the prior art) to read and monitor the energizable identification apparatuses on screens mounted on the shaker 750 and/or on other parts of the shaker 750. Optionally, the reader apparatus communicates with a control system 759a (on site or remote). The control system 759a can monitor all the energizable identification apparatuses. With respect to a particular screen assembly, the control system 759a receives signals, including identification signals, from the screen assembly and it (or any interconnected computer system 759c, on site or remote) determines whether that particular screen assembly is suitable for use on the shaker 750. If via sensors 750s the control system determines that the particular screen assembly is not suitable for the material being processed and/or flow rates, the control system and/or computer system can send a signal and/or an alarm and/or can automatically shut the shaker down. Signals from the energizable identification apparatus 757i can indicate, e.g., motor manufacturing date, last service date, motor refurbishment date, etc. Signals from the energizable identification apparatus 757p can indicate nominal rated motor force so the control system can ensure correct motor force (operation at correct frequency and operation with correct weight((s)) ).

Figure 37:
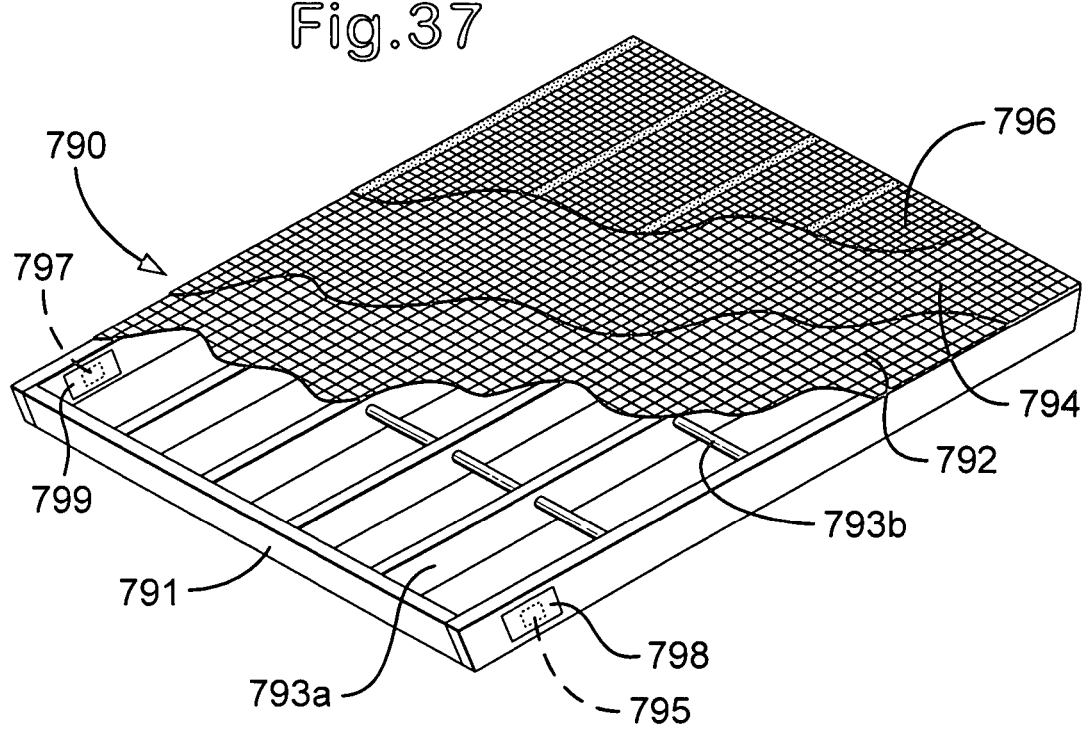
FIG. 37 is a perspective view of a screen assembly according to the present invention.
Figure 38A:
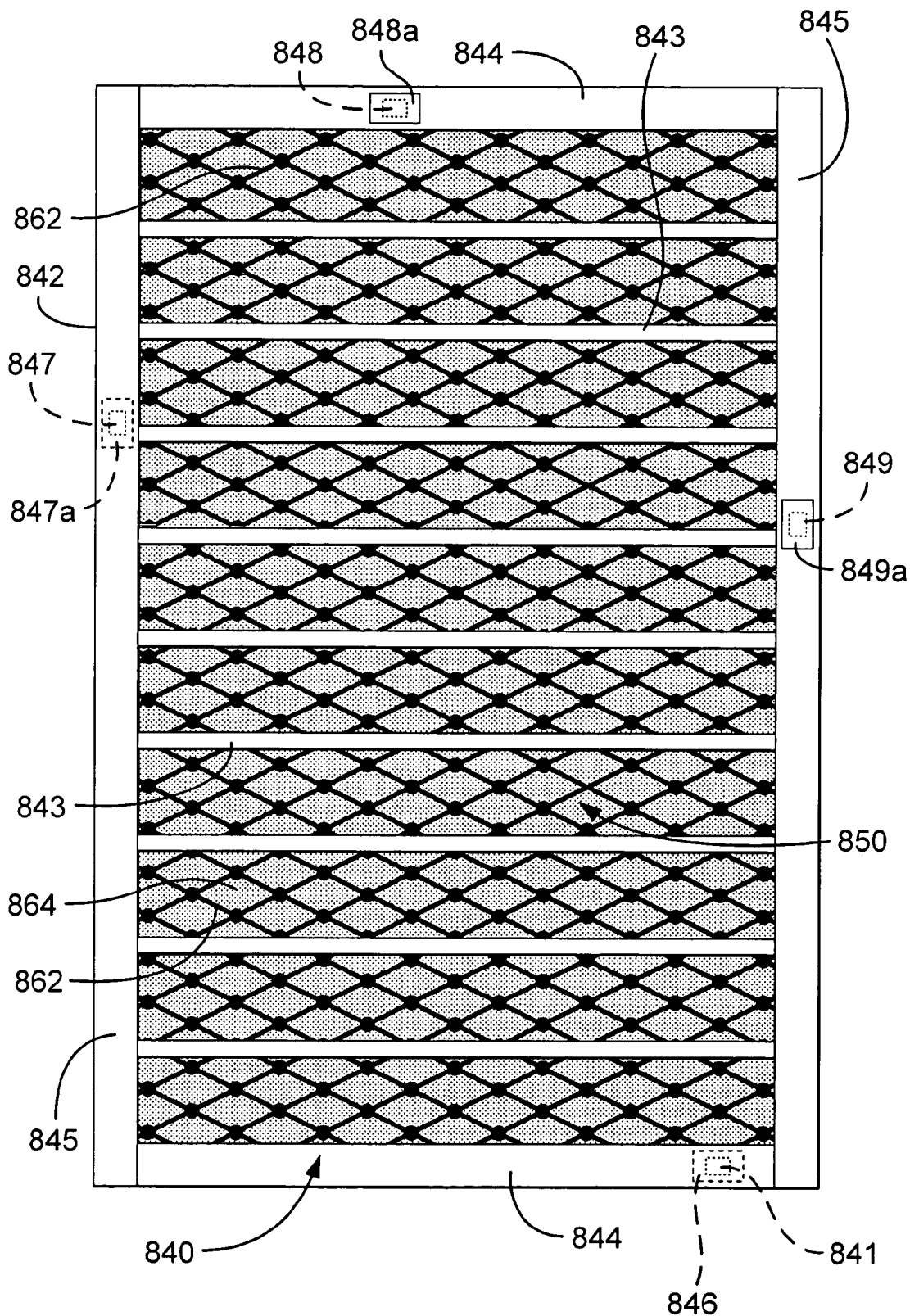
FIG. 38A is a top view of a screen assembly according to the present invention.
Figure 38B:
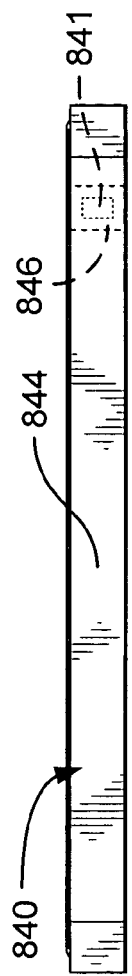
FIG. 38B is an end view of the screen assembly of FIG. 38A.
Figure 38C:
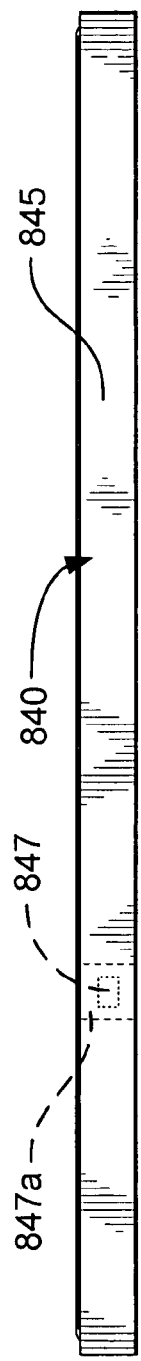
FIG. 38C is a side view of the screen assembly of FIG. 38A.
Figure 38D:
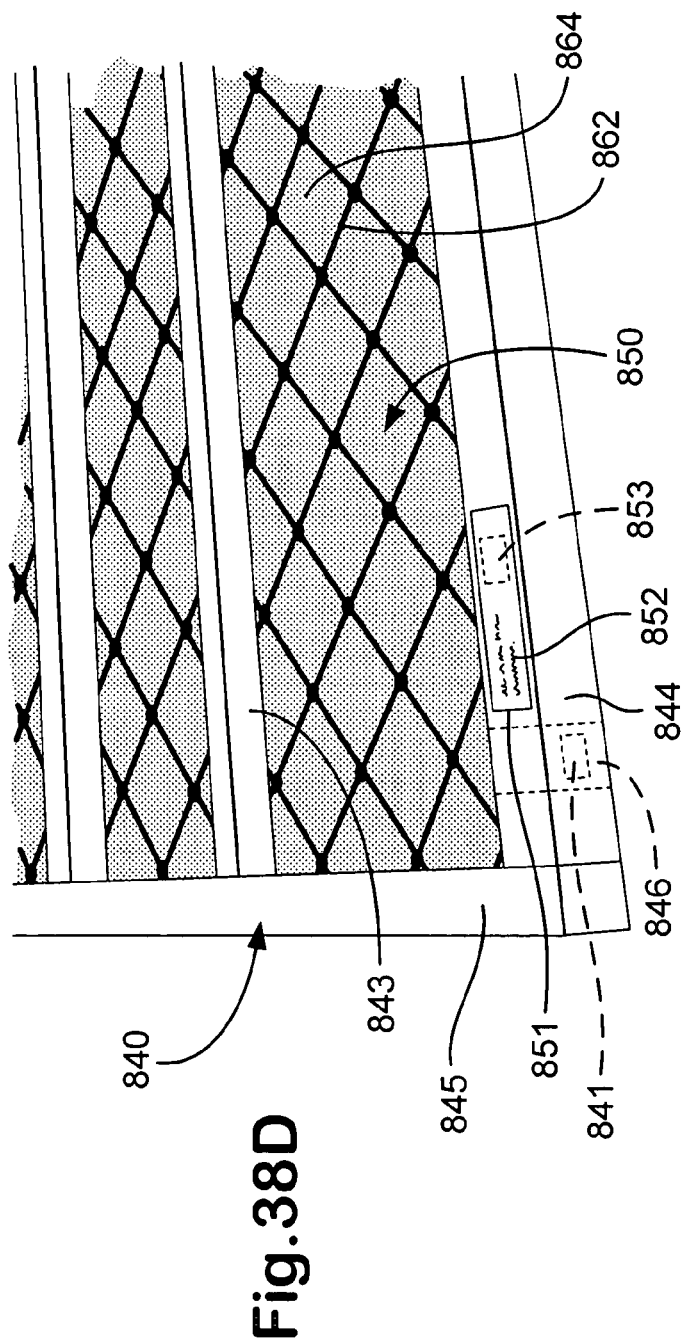
FIG. 38D is a perspective view of part of the screen assembly of FIG. 38A.

FIG. 37 shows a screen assembly 790 according to the present invention which has a frame 791 with crossmembers 793a and cross rods 793b with multiple screen mesh layers 792, 794, 796. Epoxy material connects the mesh layers to the frame 791.

An energizable identification apparatus 795 on an exterior portion of the frame 791 with a protective tape, covering or encasement 798 (which may be encasement, layer(s), mass of material, tape(s), and/or wraps disclosed herein). Optionally, a protective covering, etc., encircles the portion of the frame 791 adjacent the apparatus 795. Optionally, or instead of the apparatus 795, an energizable identification apparatus 797 is on an inner portion of the frame 791 and is protected by an encasement, tape, or protective covering 797 (which may be any encasement, tape(s), mass of material, layer(s) and/or wrap(s) disclosed). It is within the scope of the present invention to provide one or more apparatuses 795 and/or one or more apparatuses 797 on or in any portion of any screen or screen assembly used with a vibratory separator or shale shaker, including but not limited to, on frames, plates, supports, lips, ledges, crossmembers, rods, structural parts, and seal structures of such screens or screen assemblies.

FIGS. 38A-38D show a screen assembly 840 according to the present invention which has a tubular frame 842 made of hollow tubulars with ends 844 and interconnected sides 845. A screening material layer or combination of layers 850 is secured to the tubular frame 842 with suitable glue and/or adhesives. A plurality of spaced-apart crossmembers 843 extend between and have ends 844 connected to the sides 845. The screen assembly 840 may, in one particular aspect, have a multi-layer combination 850 of layers of screening material adhered together with adhesive or epoxy or glued together with moisture curing hot melt glue in a glue pattern 862. The multi-layer combination 860 is secured to the tubular frame 842, e.g. with cured epoxy.

It is within the scope of the present invention to position and/or mount an energizable identification apparatus within any part of a screen or screen assembly for a vibratory separator or shaker, including, but not limited to, within a hollow frame member or tubular, within a hole or recess, or within a side mounting structure of a screen or screen assembly. The screen assembly 840 has an energizable identification apparatus 841 secured in an amount of material 846 (e.g., plastic, epoxy, fiberglass, gel, aerogel, silica aerogel, wood, metal, composite) within an end 844 of the screen assembly 840 and an energizable identification apparatus 847 in an amount of material 847a within a side 845. Energizable identification apparatus 848 and 849 are adhesively secured exteriorly to parts of the frame 842 and/or have a layer or layers of encasement or tape 848a, 849a over them.

Often identification tags or labels, e.g. made of plastic or metal, are used on screens and screen assemblies to convey information about the screen or screen assembly. It is within the scope of the present invention to include on or within such labels or tags one or more energizable identification apparatuses. For example, a label or tag 851 on the frame 842 (FIG. 38D) has information 852 about the screen 840 and on or embedded within the label or tag 851 is an energizable identification apparatus 853.

FIGS. 39A-39D show a screen assembly 910 according to the present invention which has layers 912 of screening material and side mounts 914. In one particular aspect there are three layers 912 of stainless steel screening material with a lowermost layer with mesh of 20×20, a middle layer of 105×64 mesh, and a top layer of 170×105 mesh. It is within the scope of this invention for the layers 912 to be any known screening material separate and unconnected to each other or with layers bonded, connected, fused, sintered, glued together, and/or sewn together in any known manner and the screening material may be made of any known material used for such screen assemblies.

In certain aspects, the layers 912 of screening material are glued together with cured hot melt glue producing glued-together screening material that is flexible. In some aspects a screen assembly according to the present invention with flexible material can be folded on itself or rolled up.

Each side mount 914 has a bottom part 921, a side part 922, a top part 923, a top lip 924, and a top lip 925. The layers 912 pass between and are secured between the bottom part 921 and the top lip 924. An end of the layers 912 is held between opposed parts 925a and 925b of the top lip 925. The top lip 924 may, optionally, be adhesively secured together and/or welded to the bottom part 921 with multiple spaced-apart welds 926 along the length of the side amounts 914. Similar adhesive material and/or welds may be, optionally, used along the top lip 925. In other aspects, the welds 926 are deleted or are supplemented with glued areas along the mounts 914. Alternatively, or in addition, inwardly projecting teeth or humps on the top lip 924 and/or bottom part 921 may be used to hold screening material. The bottom part 921 has a plurality of spaced-apart holes 929 for receiving corresponding upwardly-directed projections of a screen mounting structure or apparatus of a shale shaker or vibratory separator. Optionally ends 916 of the side mounts 914 are sealed with any suitable seal material or seal structure. As shown in FIG. 39D, a solid plug or an amount of hardened adhesive or hot melt glue 927 is applied at the end opening 916. An energizable identification apparatus 928 is encased within the plug 927. Optionally, such material may encapsulate the edge of screening material layers 912. In certain aspects the side mounts and/or the plug 927 are made of plastic, epoxy, acrylic, steel, stainless steel, fiberglass, composite, aluminum, aluminum alloy, zinc, zinc alloy, brass or bronze. Optionally the top part 923 is deleted and a generally "L" shaped side mount is provided and it is within the scope of this invention to provide such a side mount with any seal or handling apparatus described herein.

Optionally, a plurality of screws 931 secure a seal member 930 to the side part 922. In one aspect the seal member 930 is (as may be the case for any seal or seal member according to the present invention) made of neoprene, but it may be made of nitrile rubber, rubber, plastic, gasket material, polyurethane, or any suitable seal material. The seal member 930 has an upper portion 932 of generally circular cross-section (but, according to the present invention, this cross-section may be any desired shape, including, but not limited to, square, oval, and rectangular). Optionally, the upper portion 932 is hollow and, e.g. may have a space 933 of a generally circular (or of any desired shape) cross-section. An elongated part 934 of the seal member 930 extends down from the upper portion 932.

The seal member 930 is, in one aspect, positioned so that when the screen assembly 910 is in place on a shale shaker or vibratory separator, the seal member 930 is trapped between the screen assembly 910 and the side wall of a basket or other screen holding structure. In another aspect the seal member 930 is positioned so that the upper portion 932 is above a top edge of the top lip 925. The seal member 930 may be adhesively secured to a side mount. An energizable identification apparatus may, according to the present invention, be in or on the seal member 930 or in the hollow part of the end 932.

FIG. 40 shows a screen assembly 940 according to the present invention which has side mounts 944 (like the side mounts 914, FIG. 39D); one or more layers 942 of screening material (like the layer or layers 912 of the screen assembly 910); and one, two, three or more layer(s) 946 of ridged or undulating screening material on and/or connected to the layer(s) 942. The screening material layer(s) 946 may be any known undulating or ridged screening material, including, but not limited to, that disclosed in U.S. Pat. Nos. 6,450,345; 5,868,929; 5,720,881; 5,958,236; 5,876,552; 5,636,749; 5,417,858; 5,417,793; 5,417,859; and 5,944,993, all fully incorporated herein fully for all purposes. In the screen assembly 940 a portion of the layers 946 may pass with the layer(s) 942 between the bottom part and lower lip of the side mounts 944 and, if desired, into the top lip. Alternatively only the layer(s) 942 are secured within the side mounts 944. The side mounts 944 may have an energizable identification apparatus 944a like the energizable identification apparatuses shown and/or described for the embodiment of FIG. 39D.

Figure 41C:
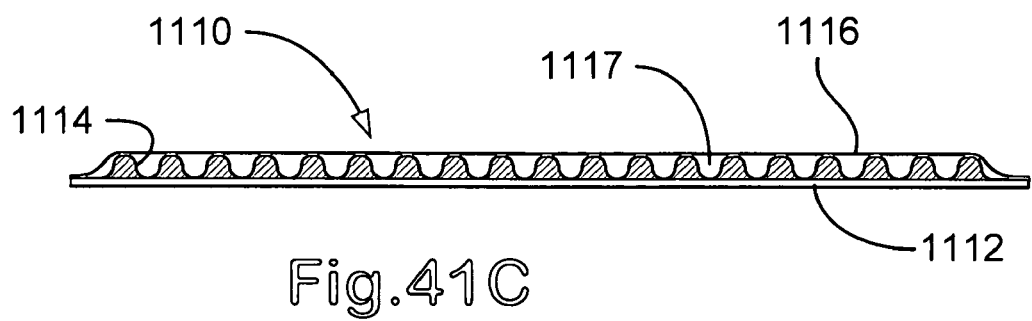
FIG. 41C is an end view of a screen assembly of FIG. 41A.

FIG. 41A shows a screen 1110 according to the present invention with a lower base, support or frame 1112, three undulating mesh screens 1114 (any two of which may be deleted) on and/or bonded or connected to the frame 1112, and, optionally, an upper mesh or screen 1116. The screens 1114 may themselves be sewn, bonded or glued together, e.g. with epoxy, glue, welding, and/or sintering. Rubber strips, plastic strips tape, cushion or cushions 1118 are positioned between the screen 1114 and the upper screen 1116. The strip(s) or cushion(s) 1118 are optional. As shown the strip(s), tape(s), or cushion(s) 1118 are secured to the screen 1114 (or to crests thereof), but it is within the scope of this invention to secure them (or some of them) to the screen 1116. To effect such securement any suitable glue, epoxy, weld, and/or sintering may be employed. The frame 1112 may be any suitable known base, frame or support.

It is within the scope of this invention for the screen 1114 to be any known screen, mesh, screens, meshes, or combination thereof, bonded together, unbonded, or bonded at only certain locations and with any known shape as viewed either from above or on end (as in FIG. 41A). It is within the scope of this invention for the upper screen 1116, which is optional, to be any known screen, mesh, screens, meshes, or combination thereof, bonded together or unbonded, and with any known shape. As shown in FIG. 41B, the screen 1114 is three mesh screens bonded together with coarser mesh on the bottom, medium mesh in the middle, and finer mesh on top. The screen 1116 as shown may be a scalping screen of a mesh coarser than the finest mesh of the screen 1114 or of a multi-layer coarser mesh. In another aspect the screen 1114 is a single screen of closely woven mesh made of any suitable material, e.g. stainless steel and/or plastic material and the screen 1116 is a single screen of coarser mesh made of any suitable material (e.g. but not limited to stainless steel and/or plastic), with the screen 1114 on a metal or plastic frame or support. Alternatively or additionally, instead of the frame 1112 any known perforated plate, strip, support, or series of straps or strips may be used.

In one aspect the strips 1118 are fused plastic strips aligned with peaks of the undulating fine mesh. Such strips may be made of rubber (e.g. nitrile) or plastic, e.g. polypropylene, to inhibit or prevent abrasion of the finer meshes. Such strips can be glued to the bottom of the screen 1116 and/or the screen 1114. Also the screen 1116 can be glued to the screen 1114.

Figure 41D:
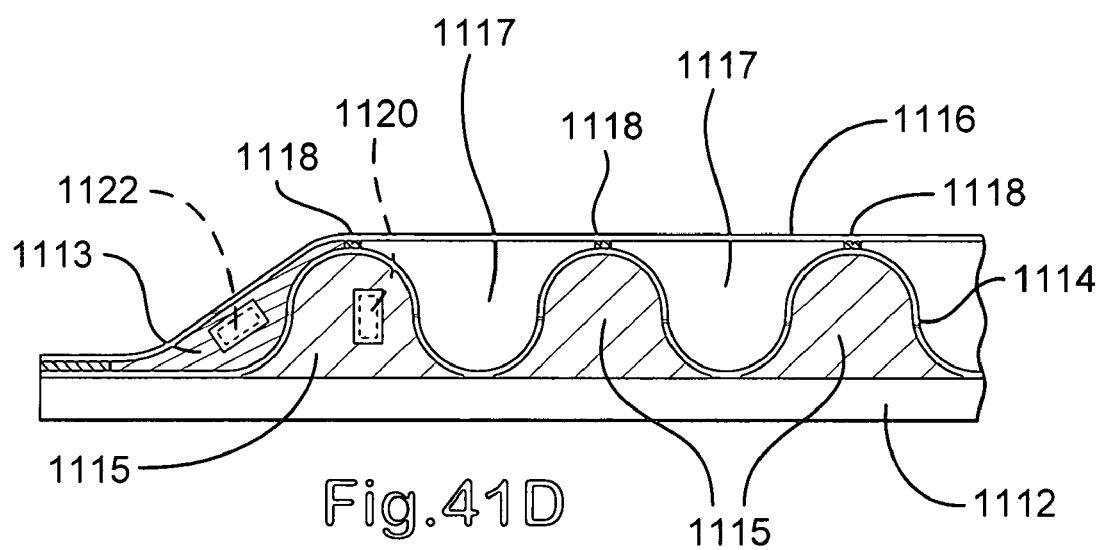
FIG. 41D is an enlargement of part of the screen assembly of FIG. 41C.

End plugs 1113 and 1115 (FIG. 41D) sealingly close off open ends of the screen 1110. These end plugs may be made of rubber, metal, wood, plastic, Teflon™ material, or urethane. The plugs 1113 extend along two sides of the screen along crests of the screening material to completely seal the sides. The plugs are held in place by friction fit, glue, epoxy, welding and/or sintering. Alternatively, the ends may be covered with screen material.

Fluid flow on the screen 1110 from either end may be from top-to-bottom as viewed in FIG. 41A, bottom-to-top, or from one side to the other.

In one aspect the screen 1116 is a scalping screen of woven steel mesh. In another aspect, it is woven plastic or synthetic or composite mesh; and in another aspect it is a combination of woven steel and woven plastic or synthetic or composite mesh. The screen 1116 may be the same mesh or coarser mesh than that of the screen 1114 or of any layer thereof.

In one embodiment the areas 1117 between the screen 1116 and the screen 1114 are open. The screen 1116 protects the mesh of the screen 1114 from abrasive particles. When the screen 1116 is of a coarser mesh than that of the screen 1114, relatively larger particles retained on the screen 1116 are prevented from damaging and/or hindering flow through the screen 1114.

With the screen 1110 as shown and with the optional screen 1116 liquid flow through the screen is increased by reducing the thickness of the solids bed of the finer mesh screens by the separation of larger particles with the screen 1116.

Figure 41E:
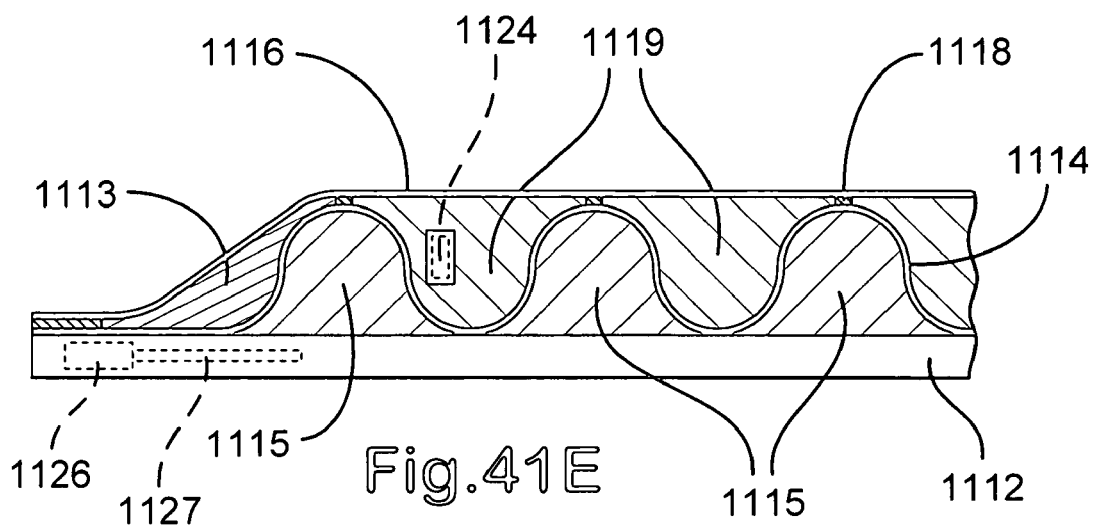
FIG. 41E is an end view of a screen assembly according to the present invention.

FIG. 41E shows an alternative embodiment of the screen 1110 with identical parts (indicated by the same numerals) but with additional end plugs 1119 between the upper screen 1116 and the screen 1114. Such "double plugging" may be used on either or both screen ends. A fluid and/or particles introduced to the screen 1110 first encounters the screen 1116 and then material flowing through the screen 1116 flows to the screen 1114. The plugs 1119 may be made of the materials described for the plugs 1113, 1115 and the plugs 1119 may be similarly installed and/or secured in place. Any of the plugs 1113, 1115, 1119 may be deleted in certain embodiments.

As has been described previously, any previously-disclosed energizable identification apparatus may be applied to any part of the screen 1110. An energizable identification apparatus 1120 is embedded within a plug 1115 and/or an energizable identification apparatus 1122 is embedded within a plug 1113. Optionally, an energizable identification apparatus 1124 is embedded within a plug 1119 (FIG. 41E).

Optionally, an energizable identification apparatus 1126 with an antenna 1127 extending therefrom is located within the frame 1112. It is within the scope of the present invention when an energizable identification apparatus being used has an antenna extending therefrom, to adhere the antenna to part of the screen or screen assembly and/or to locate the antenna within part of the screen or screen assembly (e.g. within a frame member, hookstrip, or side mount) and/or to locate such an antenna in a mass of material.

FIGS. 42A and 42B show a screen assembly 950 according to the present invention which has a lower support plate 952 and one, two, three, four or more layers of screening material on the plate 952 (three layers 953, 954, 955 shown). Side hookstrips 956 on sides of the plate 952 facilitate mounting of the screen assembly 950 to a deck or mount structure of a vibratory separator or shaker. An energizable identification apparatus 957 is secured to an exterior portion of a hookstrip 956 and/or an energizable identification apparatus 958 is secured to an interior portion of a hookstrip 956. In one particular aspect the screen assembly 950 is like a screen assembly disclosed in U.S. Pat. No. 4,575,421 (incorporated fully herein) modified in accord with the present invention.

According to the present invention an energizable identification apparatus can be applied to, connected to, or disposed within a screen assembly using a solid mass within which is located the energizable identification apparatus. FIG. 42C shows a mass 951 of material within which is an energizable identification apparatus 959. The mass 951 is sized and configured for insertion into a recess, notch, hollow, channel or opening of a screen assembly (or other apparatus) to facilitate installation of the energizable identification apparatus 959. The mass 951 can be held in place with a friction fit and/or adhesive, glue, welding, and/or tape. The material of the mass 951 can be metal, plastic, composite, wood, ceramic, cermet, gel, aerogel, silica aerogel, fiberglass, nonmagnetic metal, or polytetrafluoroethylene. The material can be rigid and relatively unbending or it can be soft and/or flexible. An enlarged end 951a of the mass 951 is optional.

FIG. 42D shows a mass 1151 (made, e.g. of any material mentioned for the mass 951) with an energizable identification apparatus 1159 therein. The energizable identification apparatus 1159 has an antenna 1158 extending from the energizable identification apparatus 1159 and disposed within the mass 1551. With a flexible or sufficiently non-rigid mass 1151 (and with the mass 951) a slit or recess 1157 of any desired length within the mass 1151 may be provided for inserting the energizable identification apparatus 1159 and antenna 1158 into the mass 1151 and/or for removable emplacement of the energizable identification apparatus 1159.

FIG. 42E shows a mass 1141 (e.g. like the masses 951, 1151 and made of the materials mentioned above) with an energizable identification apparatus 1142 therein (or it may, according to the present invention, be thereon). The mass 1141 has a recess 1143 sized, located, and configured for receipt therein of a part or a portion of a screen or screen assembly so that the mass 1141 is easily installable on the screen or screen assembly. A friction fit between the mass 1141 and the part or portion of the screen assembly can hold the mass 1141 in place (e.g. on a frame, plate, mount, hookstrip, or support of a screen or screen assembly) and/or connectors, fasteners and/or adhesive may be used to hold the mass 1141 in place.

The present invention, therefore, provides in certain, but not necessarily all embodiments, a screen apparatus for use on a vibratory separator (e.g., but not limited to, a shale shaker for processing drilling fluid material), the screen apparatus including a support, screening material on the support, and energizable identification apparatus contacting the support for identifying the screen apparatus. Such a system may have one or some, in any possible combination, of the following: wherein the energizable identification apparatus is within the support; wherein the support is a frame; wherein the frame includes a plurality of interconnected hollow members and the energizable identification apparatus is within a hollow member; wherein the frame has an exterior and an interior and the energizable identification apparatus is on the interior; wherein the support is connected to side mounting structure and the energizable identification apparatus is contacting the side mounting structure; wherein the energizable identification apparatus is within the side mounting structure; wherein the screening material is non-flat (e.g. three-dimensional, e.g. with ridges and valleys) and the energizable identification apparatus is under screening material; wherein the screening material has open ends, a plug plugs off each open end, and the energizable identification apparatus is in a plug; wherein the energizable identification apparatus is taped to the support; wherein the energizable identification apparatus is adhered to the support; wherein the energizable identification apparatus is within a mass of material; wherein the mass is opaque, translucent or transparent and/or is rigid or flexible; wherein the mass is shaped for receipt within a space within the screen apparatus; wherein the mass has an opening for insertion of the energizable identification apparatus into the mass; wherein the mass is made from material from the group consisting of plastic, epoxy, fiberglass, gel, aerogel, silica aerogel, wood, metal, composite; encasement structure encasing the energizable identification apparatus, the encasement structure comprising at least one layer of heat resistant material; wherein the encasement structure includes at least one layer of impact resistant material; wherein the energizable identification apparatus is radio frequency identification apparatus with integrated circuit apparatus and antenna apparatus; and/or wherein the vibratory separator is a shale shaker.

The present invention, therefore, provides in certain, but not necessarily all embodiments, a method for sensing an energizable identification apparatus of a screen assembly, the screen assembly having a support, screening material on the support, energizable identification apparatus contacting the support for identifying the screen apparatus, the method including energizing the energizable identification apparatus by directing energizing energy thereto, the energizable identification apparatus upon being energized producing a signal, positioning the screen assembly adjacent sensing apparatus, and sensing with the sensing apparatus the signal produced by the energizable identification apparatus. Such a system may have one or some, in any possible combination, of the following: wherein the sensing apparatus is in communication with and is controlled by control apparatus, the method including controlling the sensing apparatus with the control apparatus; wherein the signal is an identification signal identifying the screen assembly and the sensing apparatus produces and conveys a corresponding signal to computer apparatus, the computer apparatus including a programmable portion programmed to receive and analyze the corresponding signal, and the computer apparatus for producing an analysis signal indicative of accepting or rejecting the screen assembly based on said analysis, the method including the energizable identification apparatus producing an identification signal received by the sensing apparatus, the sensing apparatus producing a corresponding signal indicative of identification of the screen assembly and conveying the corresponding signal to the computer apparatus, and the computer apparatus analyzing the corresponding signal and producing the analysis signal; and/or producing the analysis signal prior to vibrating the screen assembly.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventors may rely on the Doctrine of Equivalents to determine and assess the scope of their invention and of the claims that follow as they may pertain to apparatus not materially departing from, but outside of, the literal scope of the invention as set forth in the following claims. Any patent or patent application mentioned herein is incorporated fully herein for all purposes.

What is claimed is:

1. A screen apparatus for use on a vibratory separator, the screen apparatus for screening material introduced to the vibratory separator, the screen apparatus comprising
    a support mountable on a vibratory separator, the support comprising a body,
    the body having an exterior surface and two spaced-apart ends,
    wave energizable identification apparatus on the exterior surface of the body, the wave energizable identification apparatus wrapped in fabric material, the fabric material comprising heat-resistant non-conducting material, and
    the wave energizable identification apparatus wrapped and positioned on the body so that the wave energizable identification apparatus does not contact the body
    screening material on the support, the screening material having a top and a bottom, fluid with solids therein for treatment introducible to the vibratory separator onto the top of the screening material so that fluid from the fluid with solids therein is flowable down through the screening material, and
    the wave energizable identification apparatus for identifying the screen apparatus.

2. The screen apparatus of claim 1 further comprising
    the screening material having an exit end from which solids separated from the fluid with solids therein are flowable off the screening material.

3. The screen apparatus of claim 1 wherein the support is a frame.

4. The screen apparatus of claim 3 wherein the frame includes a plurality of interconnected hollow members and the energizable identification apparatus is within a hollow member.

5. The screen apparatus of claim 1 wherein the wave energizable identification apparatus is radio frequency identification apparatus with integrated circuit apparatus and antenna apparatus.

6. The screen apparatus of claim 1 wherein the vibratory separator is a shale shaker and the fluid with solids therein is drilling fluid with solids therein.

7. A method for sensing an energizable identification apparatus of a screen assembly, the screen assembly for use in a vibratory separator and comprising a support mountable on a vibratory separator, the support comprising a body,
    the body having an exterior surface and two spaced-apart ends,
    wave energizable identification apparatus on the exterior surface of the body, the wave energizable identification apparatus wrapped in fabric material, the fabric material comprising heat-resistant non-conducting material, and
    the wave energizable identification apparatus wrapped and positioned on the body so that the wave energizable identification apparatus does not contact the body
    screening material on the support, the screening material having a top and a bottom, fluid with solids therein for treatment introducible to the vibratory separator onto the top of the screening material so that fluid from the fluid with solids therein is flowable down through the screening material, and
    the wave energizable identification apparatus for identifying the screen apparatus,
    the method including
    wave energizing the energizable identification apparatus by directing energizing energy thereto,
    the wave energizable identification apparatus upon being energized producing a signal,
    positioning the screen assembly adjacent sensing apparatus, and
    sensing with the sensing apparatus the signal produced by the wave energizable identification apparatus.

8. The method of claim 7 wherein the sensing apparatus is in communication with and is controlled by control apparatus, the method further comprising
    controlling the sensing apparatus with the control apparatus.

9. The method of claim 8 wherein the signal is an identification signal identifying the screen assembly and the sensing apparatus produces and conveys a corresponding signal to computer apparatus, the computer apparatus including a programmable portion programmed to receive and analyze the corresponding signal, and the computer apparatus for producing an analysis signal indicative of accepting or rejecting the screen assembly based on said analysis, the method further comprising
    the wave energizable identification apparatus producing an identification signal received by the sensing apparatus,
    the sensing apparatus producing a corresponding signal indicative of identification of the screen assembly and conveying the corresponding signal to the computer apparatus, and
    the computer apparatus analyzing the corresponding signal and producing the analysis signal.

10. The method of claim 9 further comprising
    producing the analysis signal prior to vibrating the screen assembly.

* * * * *